US007584247B2

(12) United States Patent  
Ochiai et al.

(10) Patent No.: US 7,584,247 B2
(45) Date of Patent: Sep. 1, 2009

(54) SERVER CONSTRUCTION SUPPORT TECHNIQUE

(75) Inventors: Katsuhiro Ochiai, Tokyo (JP); Yuichi Koike, Tokyo (JP); Masahiro Tabuchi, Tokyo (JP)

(73) Assignee: NEC Corporation, Tokyo (JP)

( * ) Notice: Subject to any disclaimer, the term of this patent is extended or adjusted under 35 U.S.C. 154(b) by 16 days.

(21) Appl. No.: 11/892,342

(22) Filed: Aug. 22, 2007

(65) Prior Publication Data

US 2008/0005308 A1 Jan. 3, 2008

Related U.S. Application Data

(63) Continuation of application No. 10/327,955, filed on Dec. 26, 2002, now abandoned.

(30) Foreign Application Priority Data

Dec. 27, 2001 (JP) ............................. 2001-396909
Sep. 20, 2002 (JP) ............................. 2002-274681

(51) Int. Cl.
G06F 15/16 (2006.01)
(52) U.S. Cl. .................. 709/203; 709/217; 709/220; 709/223; 705/10
(58) Field of Classification Search ................ 709/203, 709/217, 219, 223, 220; 705/10
See application file for complete search history.

(56) References Cited

U.S. PATENT DOCUMENTS

| 5,845,116 | A | 12/1998 | Saito et al. |
| 5,893,098 | A * | 4/1999 | Peters et al. ............... 705/10 |
| 6,477,504 | B1 * | 11/2002 | Hamlin et al. ............. 709/217 |
| 6,578,064 | B1 | 6/2003 | Saito et al. |
| 6,591,248 | B1 | 7/2003 | Nakamura et al. |
| 6,957,434 | B2 | 10/2005 | Saito et al. |
| 6,999,987 | B1 * | 2/2006 | Billingsley et al. ......... 709/203 |
| 7,284,037 | B2 * | 10/2007 | Kamiya et al. ............. 709/217 |
| 2002/0052774 | A1 * | 5/2002 | Parker et al. ................. 705/10 |
| 2003/0078804 | A1 * | 4/2003 | Morrel-Samuels ............ 705/1 |
| 2004/0230609 | A1 * | 11/2004 | Watson ..................... 707/104.1 |
| 2005/0050544 | A1 | 3/2005 | Saito et al. |

FOREIGN PATENT DOCUMENTS

| JP | 2-259889 | 10/1990 |
| JP | 7-282013 | 10/1995 |
| JP | 8-272773 A | 10/1996 |
| JP | 10-187660 | 7/1998 |
| JP | 10-283002 | 10/1998 |
| JP | 11-066036 | 3/1999 |

(Continued)

Primary Examiner—Ramy Mohamed Osman
(74) Attorney, Agent, or Firm—Foley & Lardner LLP

(57) ABSTRACT

A system for supporting construction of a server having a plurality of constraints determined depending on an application area of the server is disclosed. A service method definition section defines a value of each of the plurality of constraints by defining a value of each of a group of constraints to thereby determine a value of each of the other group of constraints which are related to at least one constraint of the group of constraints. A program generator generates a server construction program using the defined constraints. The server operates according to the server construction program received from the system. A simultaneous multiple-access processing server used by the interactive program, WEB shopping, and the like can be easily constructed.

13 Claims, 41 Drawing Sheets

FOREIGN PATENT DOCUMENTS

| | | |
|---|---|---|
| JP | 11-085727 | 3/1999 |
| JP | 11-282828 | 10/1999 |
| JP | 2000-163477 A | 6/2000 |
| JP | 2000-231527 A | 8/2000 |
| JP | 2001-184273 A | 7/2001 |

* cited by examiner

FIG. 12

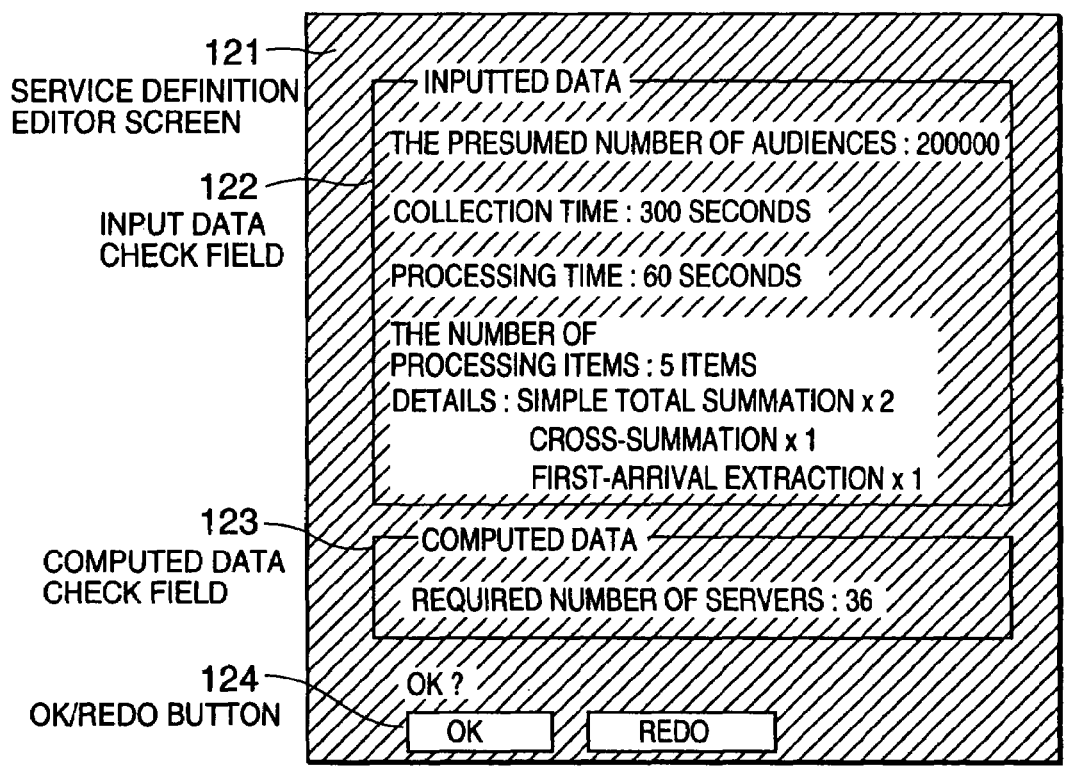

- 121 SERVICE DEFINITION EDITOR SCREEN
- 122 INPUT DATA CHECK FIELD
- 123 COMPUTED DATA CHECK FIELD
- 124 OK/REDO BUTTON

INPUTTED DATA
THE PRESUMED NUMBER OF AUDIENCES : 200000
COLLECTION TIME : 300 SECONDS
PROCESSING TIME : 60 SECONDS
THE NUMBER OF PROCESSING ITEMS : 5 ITEMS
DETAILS : SIMPLE TOTAL SUMMATION x 2
          CROSS-SUMMATION x 1
          FIRST-ARRIVAL EXTRACTION x 1

COMPUTED DATA
REQUIRED NUMBER OF SERVERS : 36

OK ?  [OK]  [REDO]

FIG. 13

```
<?xml version="1.0" encoding="Shift_JIS"?>
<REPORTMETHOD>

<FEDEFINITION>
    <TIME STARTDATE ="2001/10/01"STARTTIME="19:00:00"ENDDATE="2001/10/01"ENDTIME=20:00:00"/>
131—    <FENUMBER NUMBER="15"/>
</FEDEFINITION>

<BEDEFINITION>
132—    <TIME STARTDATE="2001/10/01"STARTTIME="20:00:00"ENDDATE="2001/10/01"ENDTIME=20:10:00"/>
</BEDEFINITION>

<REPORT NO="1"RTYPE="SUM-SINGLE"NOTE=SIMPLE TOTAL SUMMATION (HOW MANY REPLIES OF a,b)>
133—<QUESTION ID="1">
    </REPORT>

<REPORT NO="2"RTYPE="SUM-CROSS"NOTE="CROSS-SUMMATION"
134—    <QUESTION ID="1"/>
        <QUESTION ID="2"/>
    </REPORT>

<REPORT NO="3"RTYPE="SUM-SINGLE"
135—           NOTE="TOTAL SUMMATIO NFOR EACH GROUP (GENERATION )
               (AGES :15 OR LOWER,16 OR HIGHR, 35 OR HIGHER)">
    <QUESTION ID ="3"GROUP="-16,16-25,25-35,35-"/>
    </REPORT>

</REPORTMETHOD>
```

FIG. 22

```xml
<?xml version="1.0" encoding=Shift_JIS"?>
<QUESTIONNAIRE>
    <REGISTRY>
        <NAME>RD2001</NAME>
    </REGISTRY>
    <QUESTIONNAIRE-DATA>
        <QUESTION ID="00000" TYPE="SINGLE">
            <MESSAGE>Q1 TYP OF TERMINAL</MESSAGE>
            <ANSWER ID="000">
                <MESSAGE>A1.TV<MESSAGE>
            </ANSWER>
            <ANSWER ID="001">
                <MESSAGE>A2.Web</MESSAGE>
            </ANSWER>
            <ANSWER ID="002">
                <MESSAGE>A3.MOBILE TELEPHONE</MESSAGE>
            </ANSWER>
        </QUESTION >
        <QUESTION ID="00001" TYPE="SINGLE">
            <MESSAGE>Q2 RECOMMENDED MOVIES</MESSAGE>
            <ANSWER ID="000">
                <MESSAGE>A1.THE PLANET OF APES</MESSAGE>
            </ANSWER>
            <ANSWER ID="001">
                <MESSAGE>A2.JURASSIC PARK III</MESSAGE>
            </ANSWER>
            <ANSWER ID="002">
                <MESSAGE>A3.SPIRITED AWAY</MESSAGE>
            </ANSWER>
        </QUESTION >
    </QUESTIONNAIRE-DATA>
</QUESTIONNAIRE>
```

FIG. 44

```xml
<?xml version="1.0" encodig="Shift_JIS"?>

<PROMPTREPORT>

<REPORT NO="1"RTYPE="SUM-SINGLE">
 <QUESTION ID="1"TYPE="SINGLE">
  <NUMOFANSWER MESSAGE="a">
   5017
  </NUMOFANSWER>
  </NUMOFANSWER MESSAGE="b">
   3982
  </NUMOFANSWER>
 <QUESTION">
<REPORT>

<REPORT NO="2"RTYPE="SUM-CROSS">
 <QUESTION ID="1"TYPE="SINGLE">
  <NUMOFANSWER MESSAGE="a">
    <QUESTION ID="2"TYPE="MULTI">
     <NUMOFANSWER MESSAGE="a">
      2261
     </NUMOFANSWER>
     <NUMOFANSWER MESSAGE="b">
      510
     </NUMOFANSWER>
     <NUMOFANSWER MESSAGE="c">
      1339
     </NUMOFANSWER>
    <QUESTION>
  </NUMOFANSWER>
  <NUMOFANSWER MESSAGE="b">
    <QUESTION ID="2"TYPE="MULTI">
     <NUMOFANSWER MESSAGE="a">
      3098
     </NUMOFANSWER>
     <NUMOFANSWER MESSAGE="b">
      2003
     </NUMOFANSWER>
     <NUMOFANSWER MESSAGE="c">
      145
     </NUMOFANSWER>
    <QUESTION>
  </NUMOFANSWER>
 <QUESTION>
</REPORT>

</PROMPTREPORT>
```

SERVER CONSTRUCTION SUPPORT TECHNIQUE

CROSS-REFERENCE TO RELATED PATENT APPLICATIONS

This application is a continuation of application Ser. No. 10/327,955, filed Dec. 26, 2002, now pending, which claims priority from Japanese Patent Application No. 2001-396909, filed Dec. 27, 2001, and Japanese Patent Application No. 2002-274681, filed Sep. 20, 2002, by Katsuhiro OCHIAI, Yuichi KOIKE and Masahiro TABUCHI, both of which are incorporated herein by reference in their entirety.

BACKGROUND OF THE INVENTION

1. Field of the Invention

The present invention relates to a technique of supporting the construction of a server which collects and processes replies or information sent back from users through a network, and particularly relates to a server construction support technique which supports the construction of a simultaneous multiple-access processing server which is capable of collecting and processing a large number of replies sent back within a predetermined time period.

2. Description of the Related Art

A simultaneous multiple-access processing server is a server which collects and processes a large number of replies and information sent back from users within a predetermined time period. Such a server has been widely used for interactive television programs, Web shopping, and the like.

In constructing a simultaneous multiple-access processing server, various constraints are developed depending on its application area, or the knowledge of its application. For example, the simultaneous multiple-access processing server may be used for collecting and processing replies in the interactive program which poses a question such as a questionnaire, quiz, a request reception or the like to audiences (here, TV viewers) and requests answers from them to progress the program. In such a case, the constraints include reply collection time, reply summation time, the number of servers used for collecting replies, the number of respondents (the number of replies), the form of a reply, the number of questions, and an analysis and summation method. These constraints are related in such a way that the value of one constraint is determined depending on the values of some other constraints.

In order to allow an interactive program or the Web shopping to run smoothly, it is important to appropriately determine the values of various constraints described above. The values of various constraints are conventionally determined by manual working power. For example, when the reply collection time, the reply summation time, the number of audiences, and the like are determined in advance, the remaining constraints (for example, the number of servers used for collecting and processing) are manually determined depending on the predetermined values of constraints.

There have been known conventional techniques such that a server sends a questionnaire to many questionnaire respondents and, when receiving replies thereto, stores, analyzes and summarizes them. For example, see Japanese Patent Application Unexamined Publication Nos. 8-272773 and 2001-184273. However, these references do not refer to the constraints peculiar to a simultaneous multiple-access processing server used for an interactive program, WEB shopping and the like.

As described above, since the values of constraints peculiar to a simultaneous multiple-access processing server are manually set, it takes disadvantageously much time required for determining appropriate values thereof and, in some cases, appropriate values may not be determined. Also, when appropriate values are not determined, there also arises a problem that various adverse influences on management of interactive program, Web shopping and the like are involved therein.

For example, when the number of servers determined manually is smaller than the appropriate number of servers determined by the reply collection time, reply summation time, the number of audiences and the like, only some replies are collected. Contrarily, when the number of servers determined manually is greater than the appropriate number of servers, the use efficiency of servers is reduced.

SUMMARY OF THE INVENTION

An object of the present invention is to provide a server construction support system and method allowing appropriate values of constraints to be determined in a short time.

According to the present invention, a system for supporting construction of a server having a plurality of constraints determined depending on an application area of the server, or the knowledge of its application, includes: a service method definition section for defining a value of each of the plurality of constraints by defining a value of each of a group of constraints to thereby determine a value of each of the other group of constraints which are related to at least one constraint of the group of constraints; a program generator for generating a server construction program using the values of the constraints defined by the service method definition section; and a server program distributor for distributing the server construction program to the server.

The system may further include a constant detector for detecting at least one constant value dependent on the server, wherein the service method definition section uses said at least one constant value to determine the value of each of the other group of constraints.

The service method definition section may present the plurality of constraints so as to enter the value of each of the group of constraints.

The service method definition section may present at least one possible value of each of the other group of constraints so as to select an appropriate value thereof.

According to an aspect of the present invention, a system for supporting construction of a server, includes a service method definition section for defining a value of each of a plurality of types of constraints when the server collects replies received from respondents through a network, by defining a value of each of a portion of the constraints to obtain a value of each of the other portion of the constraints other than the defined constraints. A system for supporting construction of a server, includes service method definition section for defining a value of each of a plurality of types of constraints when the server collects and processes replies received from respondents through a network, by defining a value of each of a portion of the constraints to obtain a value of each of the other portion of the constraints other than the defined constraints.

A server construction supporting system according to the present invention includes an automatic program generating device which generates a server program which allows a server to collect the replies from the respondents and process collected replies based on values of a portion of a plurality of types of constraints and values of the other portion of the constraints other than the defined constraints when the server collects and processes replies received from respondents through a network, wherein a value of each of the portion of the constraints is defined to obtain a value of each of the other portion of the constraints.

Alternatively, the automatic program generating device generates operation definition information based on values of a portion of a plurality of types of constraints and values of the other portion of the constraints other than the defined constraints when the server collects and processes replies received from respondents through a network, to combine the operation definition information with a prepared server program to produce a server program, wherein the operation definition information allows a server to collect replies from the respondents and process collected replies.

As described above, according to the present invention, when the values of some constraints of multiple kinds of constraints have been defined, the values of the remaining constraints can be obtained. Accordingly, an appropriate set of values of the constraints can be obtained for a short time when constructing a simultaneous multiple-access processing server for use in interactive programs, WEB shopping, or the like.

In addition, the values of the remaining constraints are obtained using constant values which depends on an actually measuring server. Therefore, the appropriate values of constraints can be obtained.

Based on the values of the constraints determined as described above, server programs for reply collecting and processing and operation definition information are automatically generated by a program generator. Accordingly, reply collection and processing can be performed under appropriate conditions meeting expected reply situations.

BRIEF DESCRIPTION OF THE DRAWINGS

FIG. 12 is a diagram showing an example of a service definition editor screen;

FIG. 13 is a diagram showing a content of a service definition file;

FIG. 22 is a diagram showing a content of the questionnaire item file;

FIG. 44 is a diagram showing an example of XML document outputted by the report service section;

DESCRIPTION OF THE PREFERRED EMBODIMENTS

Figure 1:
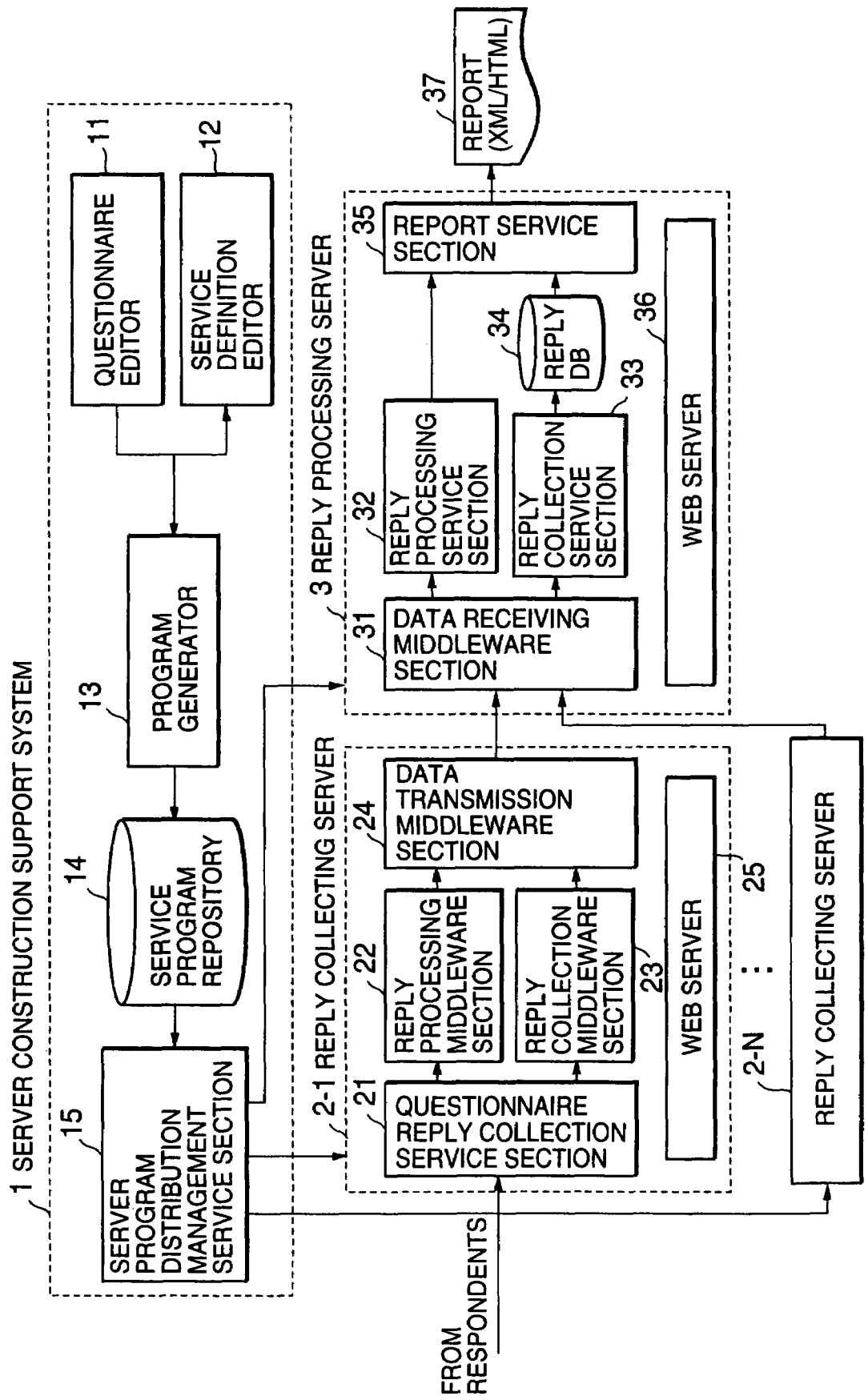
FIG. 1 is a block diagram showing a server system employing a server construction support system according to a first embodiment of the present invention.

Referring to FIG. 1, a server construction support system 1 according to a first embodiment of the present invention supports construction of a plurality of reply collecting servers 2-1 to 2-N and a reply processing server 3. The server construction support system 1 can support construction of various kinds of simultaneous multiple-access processing servers for interactive program, Web shopping, or the like. Taking a supporting system of a simultaneous multiple-access processing server for interactive program as an example, details will be described hereinafter.

The server construction support system 1 is a system which supports the construction of a simultaneous multiple-access processing server used for an interactive program which poses questions such as a questionnaire or quiz to audiences therein to progress the program while using replies thereto from audiences. This server construction support system 1 includes questionnaire editor 11, service definition editor 12, program generator 13, service program repository 14, and a server program distribution management service section 15.

The interactive program is a program provided by at least one of channels such as broadcast, communication, or package distribution. And replies to a question are collected from audiences through a network such as the Internet.

A server construction support system 1 may be implemented in a computer. The computer reads programs on a recording media such as a disk or a semiconductor memory, as referred to herein as a computer readable medium, and runs them to realize the questionnaire editor 11, the service definition editor 12, the program generator 13, and the server program distribution management service section 15 on the computer.

The questionnaire editor 11 functions as a reply field definition section, which defines a question and a reply form to the question in a questionnaire, quiz, a purchase application and the like.

The service definition editor 12 functions as a service method definition section. More specifically, when values of some of plural kinds of constraints related to each other are inputted, the service definition editor 12 calculates the values of the remaining constraints. For example, the constraints include: reply collection time which is a permissible time period in the replay collection; processing time which is a permissible time period in reply processing such as statistics and extraction processing; the expected number of replies; reply processing method; reply form over questions; and the number of servers used for reply collection.

The program generator 13 automatically generates operation defining files for the reply collecting servers 2-1 to 2-N (hereinafter, collection operation defining file) and operation defining file for a reply processing server 3 (hereinafter, processing operation defining file) based on a reply form defined in the questionnaire editor 11, values of some constraints inputted in service definition editor 12, and values of the remaining constraints obtained by the service definition editor 12. The respective collection operation defining file and processing operation defining file define the operations of previously prepared server programs for reply collection and processing.

The service program repository 14 stores correspondingly the previously prepared collection and processing server programs, and the collection operation defining files and the processing operation defining file which are generated in the program generator 13.

The server program distribution management service section 15 manages the schedule information indicating when to distribute the collection and processing server programs, and the collection operation defining files and the processing operation defining file which are stored in the service program repository 14. And when the aforementioned distribution timing comes, the server program distribution management service section 15 reads out the collection and processing server programs, and the collection operation defining files and the processing operation defining file from the service program repository 14 and distributes them to the reply collecting servers 2-1 to 2-N and the reply processing server 3.

The respective reply collecting servers 2-1 to 2-N operate according to the collection server programs and the operation defining file received from the server program distribution management service section 15, and is composed of a questionnaire collection service section 21, a reply processing middleware section 22, a reply collection middleware section 23, a data transmission middleware section 24, and a WEB server 25.

The questionnaire collection service section 21, the reply processing middleware section 22, the reply collection middleware section 23, and the data transmitting middleware section 24 are realized by the collection server program and the collection operation defining file received from the server program distribution management service section 15. Accordingly, the configuration of each of the reply collecting servers 2-1 to 2-N may become different from that shown in FIG. 1 depending on the contents of the collection operation defining file.

Figure 2:
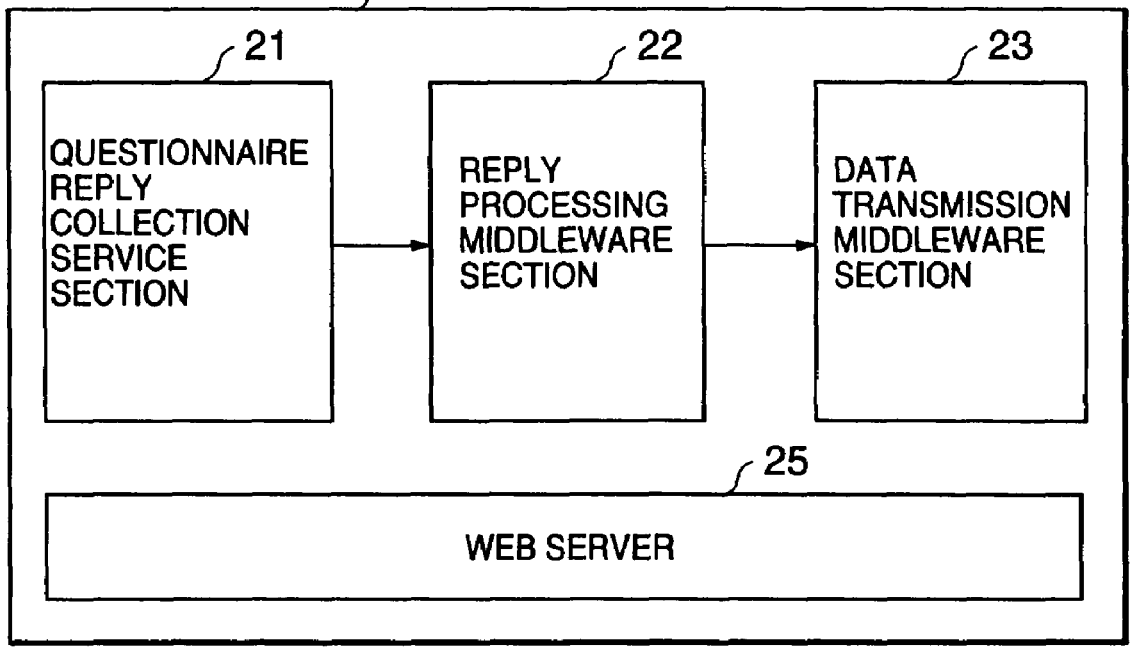
FIG. 2 is a block diagram showing an example of a reply collecting server of the first embodiment.
Figure 3:
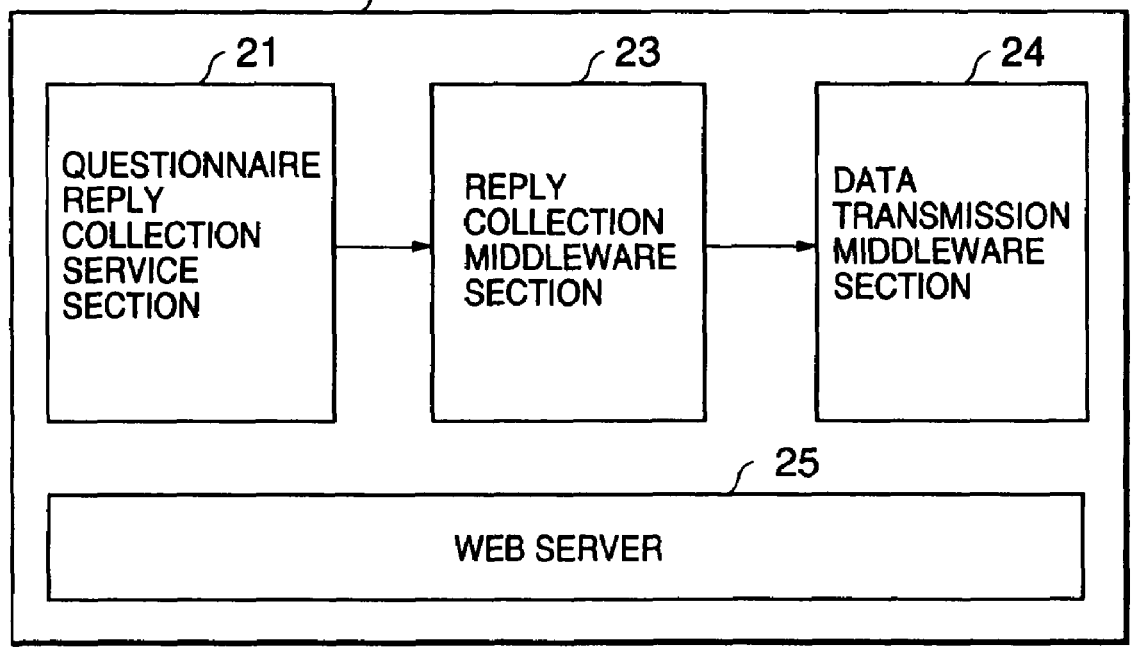
FIG. 3 is a block diagram showing another example of a reply collecting server of the first embodiment

In this embodiment, the configuration shown in FIG. 2 or FIG. 3 may be adopted as needed. FIG. 2 shows the configuration such that the reply collection middleware section 23 is removed from the configuration shown in FIG. 1, and FIG. 3 shows the configuration such that the reply processing middleware section 22 is removed from the configuration shown in FIG. 1.

Figure 4:
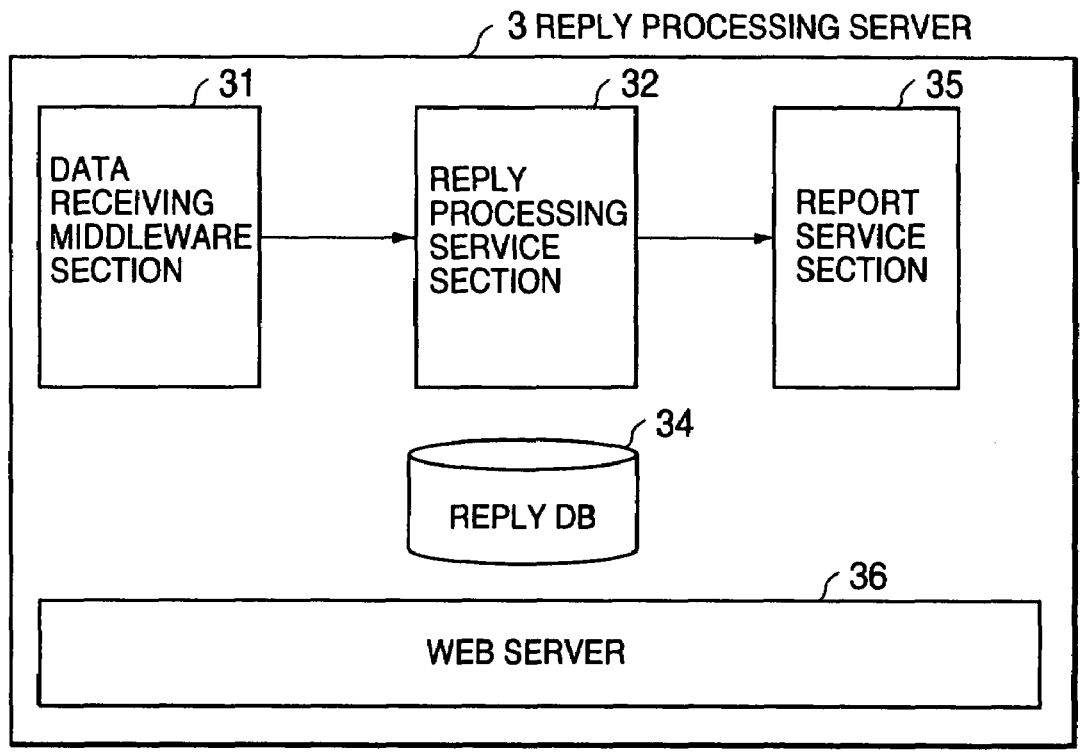
FIG. 4 is a block diagram showing an example of a reply processing server of the first embodiment.
Figure 5:
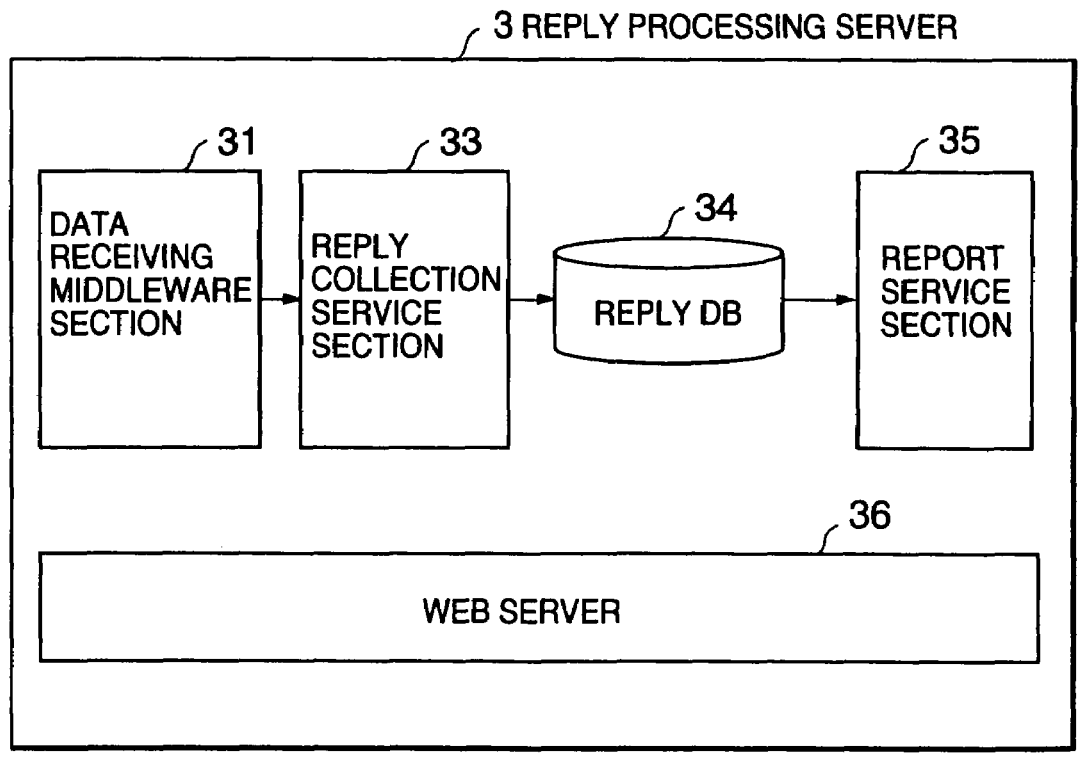
FIG. 5 is a block diagram showing another example of the reply processing server of the first embodiment.

The reply processing server 3 operates according to the processing server program and the processing operation defining file received from the server program distribution management service section 15, and is composed of a data receiving middleware section 31, a reply processing service section 32, a collection service section 33, a reply database (reply DB) 34, a report service section 35, and a Web server 36. Here, the data receiving middleware section 31, the reply processing service section 32, the collection service section 33, and the report service section 35 are realized by the processing server program and the processing operation defining file received from the server program distribution management service section 15. Accordingly, the configuration of the reply processing server 3 may become different from that shown in FIG. 1 depending on the contents of the processing operation defining file. In this embodiment, the configuration as shown in FIG. 4 or FIG. 5 may be adopted as needed. FIG. 4 shows the configuration such that the collection service section 33 is removed from the configuration shown in FIG. 1, and FIG. 5 shows the configuration such that the reply processing service section 32 is removed from the configuration shown in FIG. 1.

Figure 6:
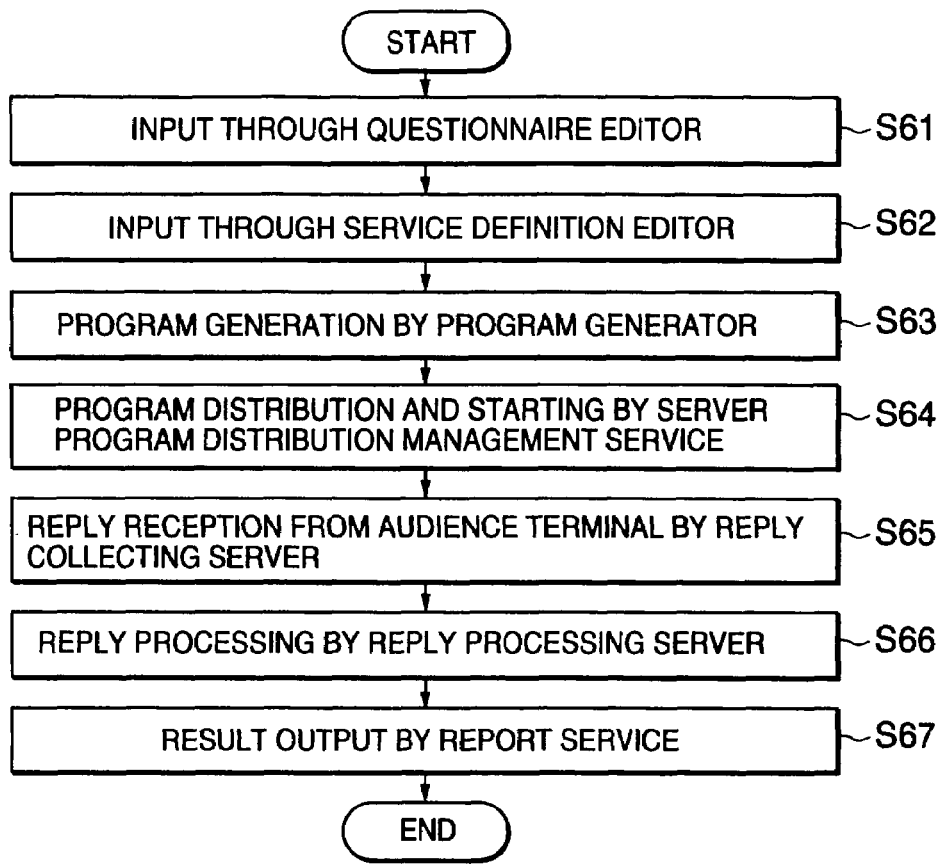
FIG. 6 is a flow chart schematically showing a processing operation of the first embodiment.

Referring to FIG. 6, the outline of an operation of the present embodiment will be described hereinafter.

Step S61: Questionnaire Edition

Figure 7:
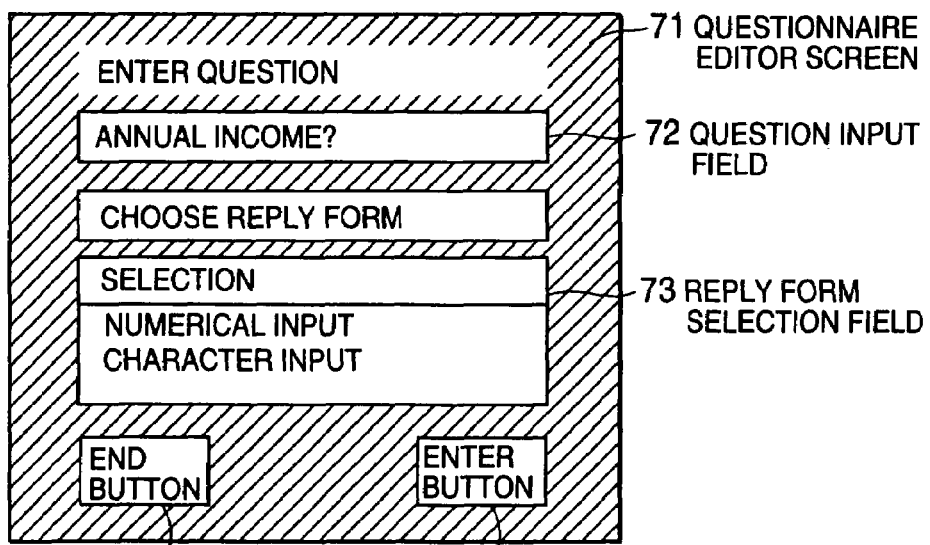
FIG. 7 is a diagram showing an example of a questionnaire editor screen.

In step S61, first, the input processing through the questionnaire editor 11 is performed. Processing of this step S61 starts by a program producer activating the questionnaire editor 11. The questionnaire editor 11 displays a questionnaire editor screen 71 as shown in FIG. 7 when activated. This questionnaire editor screen 71 includes a question-input field 72, a reply form selection field 73, an enter button 74, and an end button 75.

When the questionnaire editor screen 71 is displayed, the program producer uses a keyboard to enter a question in the question-input field 72 to be posed on audiences during the interactive program. In FIG. 7, a question "annual income?" is inputted as one example. Then, the program producer uses a pointing device such as a mouse to choose one of the reply forms displayed on the reply form selection field 73. In the example shown in FIG. 7, "selection" is chosen as a reply form for the question "annual income?" When the information is completed, the program producer clicks the enter button 74. When "selection" is chosen in the reply form selection field 73, the questionnaire editor 11 displays another questionnaire editor screen so that the program producer may make a choice.

In this manner, the questionnaire editor 11 generates a questionnaire item file including the contents inputted into the question input field 72, and the contents chosen in the reply form selection field 73 (further including a menu of choices when "selection" is chosen as a reply form). A file ID is uniquely assigned to the generated questionnaire item file. Thereafter, the questionnaire editor 11 changes the question input field 72 back to an initial state (blank state) and the reply form selection field 73 back to an initial state (no—selection state). When other questions are left in the interactive program, the program producer repeats the same operation as described above, and otherwise clicks the end button 75.

When the end button 75 is clicked, the questionnaire editor 11 outputs all the generated questionnaire item files. The above operations are performed in the step S61. The program producer may use predetermined templates to create a question and select a desired reply form, instead of using the keyboard and mouse to input the question and select the reply form. Since a template previously has a fixed sentence included in the question and a predetermined reply form to the question, the input operation of question and reply form is made easier.

Step S62: Service Definition

Figure 8:
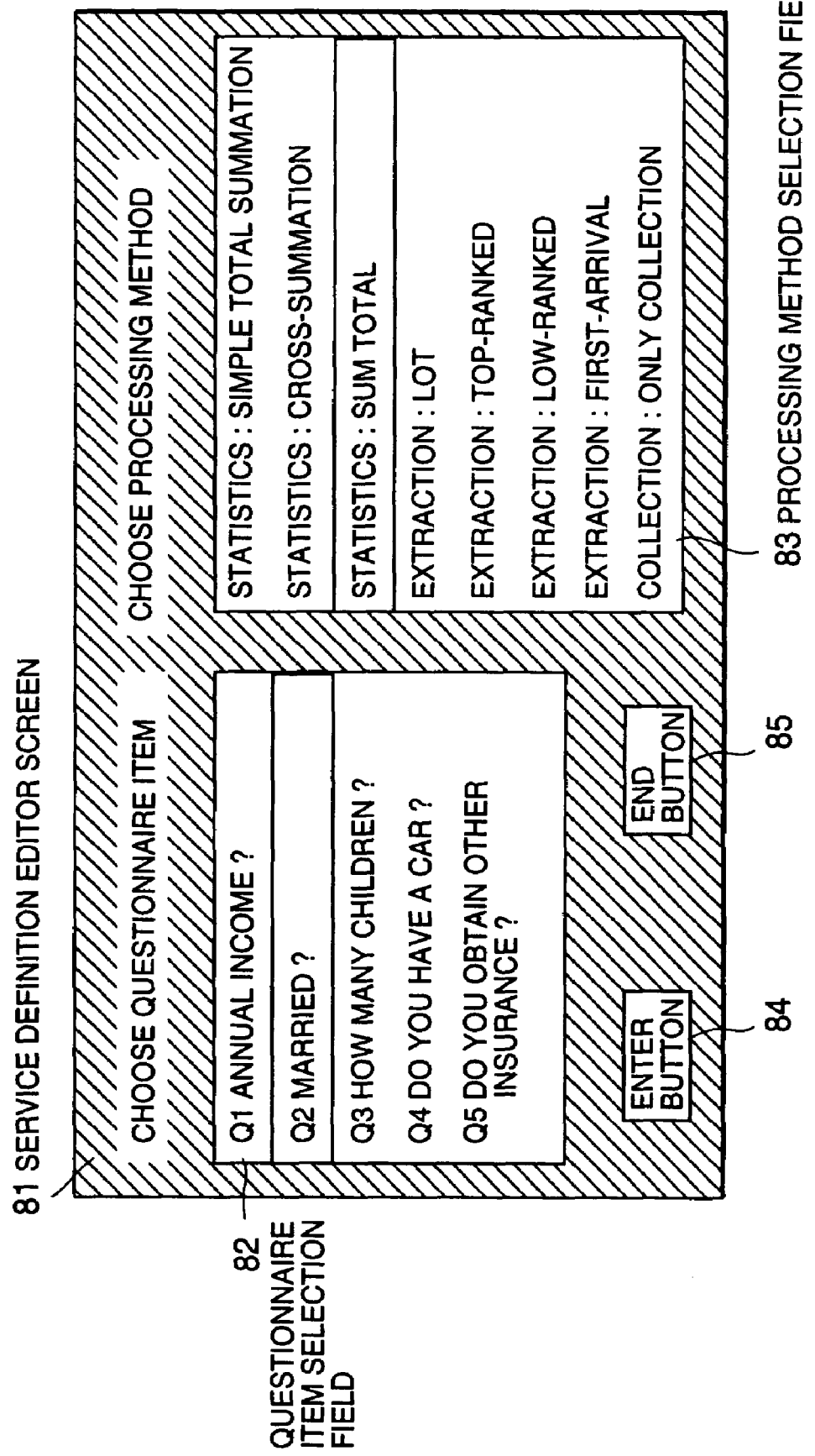
FIG. 8 is a diagram showing an example of a service definition editor screen.

After the step S61 in FIG. 6, a step S62 of input processing through the service definition editor 12 is performed. In the step S62, the service definition editor 12 reads first all the questionnaire item files from the questionnaire editor 11, and then, displays a service definition editor screen 81 as shown in FIG. 8.

The service definition editor screen 81 includes the questionnaire item selection field 82, a processing method selection field 83, an enter button 84, and an end button 85. The question included in each questionnaire item file from the questionnaire editor 11 is displayed on the questionnaire item selection field 82. Also, a plurality of processing methods of replies to a question are displayed on the processing method selection field 83. In this embodiment, "simple total summation", "cross-summation", "sum total", "lot", "top-ranked audiences extraction", "low-ranked audiences extraction", "first-arrival audiences extraction", and "collection only" are displayed as the processing methods. However, the processing method is not construed as being limited thereto, but can adopt a statistical processing such as sampling, frequency distribution, averaging, standard deviation, and a correlation coefficient, or a processing other than the statistical processing such as partial data extraction, encryption, decryption, authentication, comparison, document alteration, information offer, and a menu display.

Each processing method displayed on the processing method selection field 83 means as followed:

Simple total summation: Processing which performs total summation of the number of replies for every choice concerning one question.

Cross-summation: Processing which performs total summation of the number of replies each of which chooses a predetermined combination of choices among multiple questions (for example, the number of replies such that choice A is chosen in question 1 and choice B is chosen in question 2).

Sum total: Processing which totals the number of replies to a certain question, which meet a predetermined condition.

Lot: Processing which chooses at random a predetermined number of replies out of the replies returned from respondents.

Top-ranked audiences extraction: Processing which chooses only a predetermined number of replies top-ranked in terms of the answer value of a certain question.

Low-ranked audiences extraction: Processing which chooses only a predetermined number of replies low-ranked in terms of the answer value of a certain question.

Only collection: Processing which saves the replies received from respondents.

When the service definition editor screen 81 as shown in FIG. 8 is displayed, the program producer chooses one question to be used in an interactive program from a plurality of questions displayed on the questionnaire item selection field 82, and further chooses one processing method of replies to the chosen question from a plurality of choices displayed in the processing method selection field 83. In the example of FIG. 8, a question "Q2. Are you married?" and a processing method "Sum total" are chosen. Then, the program producer clicks the enter button 84 and thereby the service definition editor 12 memorizes the pair of the chosen question and processing method. When the program producer has other questions to be posed on audiences in the interactive program, the same operation as described above is repeated, and otherwise the end button 85 is clicked.

Figure 9:
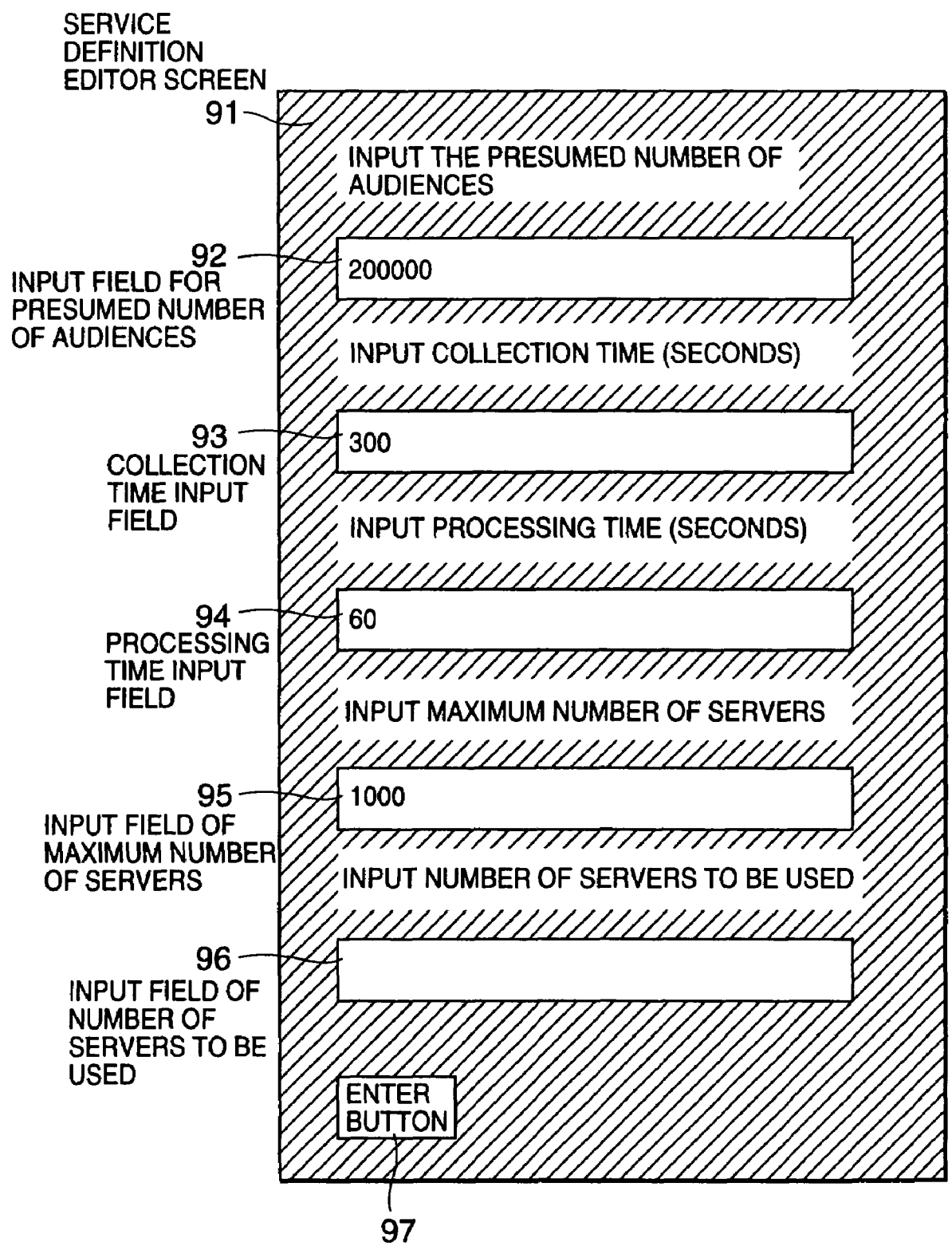
FIG. 9 is a diagram showing an example of another service definition editor screen.

When the end button 85 is clicked, the service definition editor 12 displays a service definition editor screen 91 as shown in FIG. 9. This service definition editor screen 91 includes an input field 92 for the presumed number of audiences (the presumed number of replies); a collection time input field 93 for the time required for collection of replies, a processing time input field 94 for the time required for processing, an input field 95 for the maximum number of servers, an input field 96 for the number of servers to be used, and an enter button 97.

When the service definition editor screen 91 is displayed as shown in FIG. 9, the program producer inputs the predetermined or presumed values of constraints into respective ones of corresponding input fields 92 to 96, whereas an input field corresponding to a constraint to be obtained is kept blank. In the example shown in FIG. 9, since the number of servers to be used is obtained, the input field 96 for the number of servers to be used is kept blank. The program producer clicks the enter button 97, when the aforementioned operation is completed. This causes the service definition editor 12 to calculate the value of a constraint corresponding to a blank input field of the input fields 92-96.

The calculation of values of constraints corresponding to blank input fields will be described hereafter under three cases A, B and C:

Case A: The case where a processing method other than "only collection" is chosen as a processing method in the service definition editor screen 81 as shown in FIG. 8.

Case B: The case where "only collection" is chosen as a processing method in the service definition editor screen 81 as shown in FIG. 8.

Case C: The case where both of the "only collection" and another processing method are chosen as processing methods in the service definition editor screen 81 as shown in FIG. 8.

I. Case A

Figure 10:
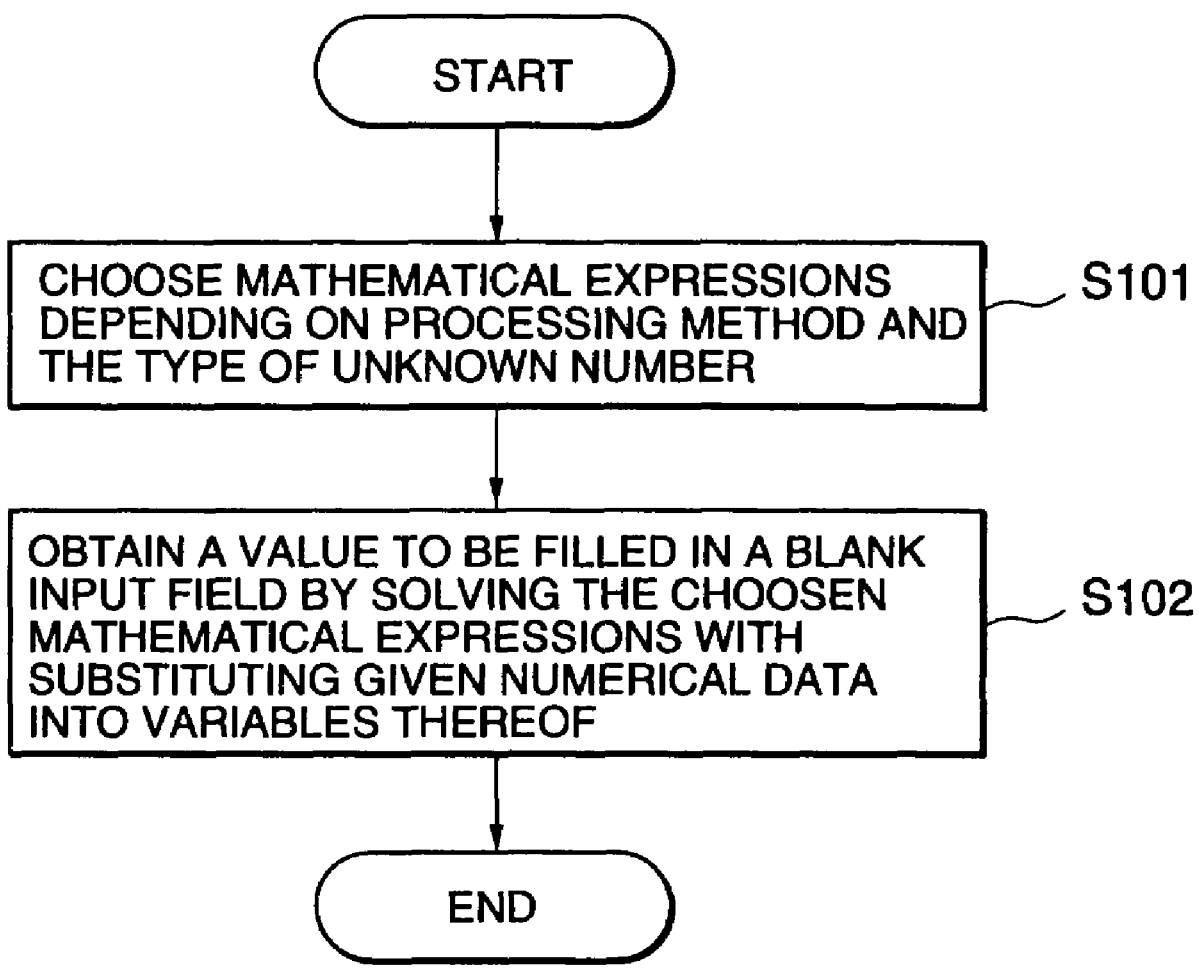
FIG. 10 is a flow chart schematically showing an example of the processing operation of a service definition editor.
Figure 11:
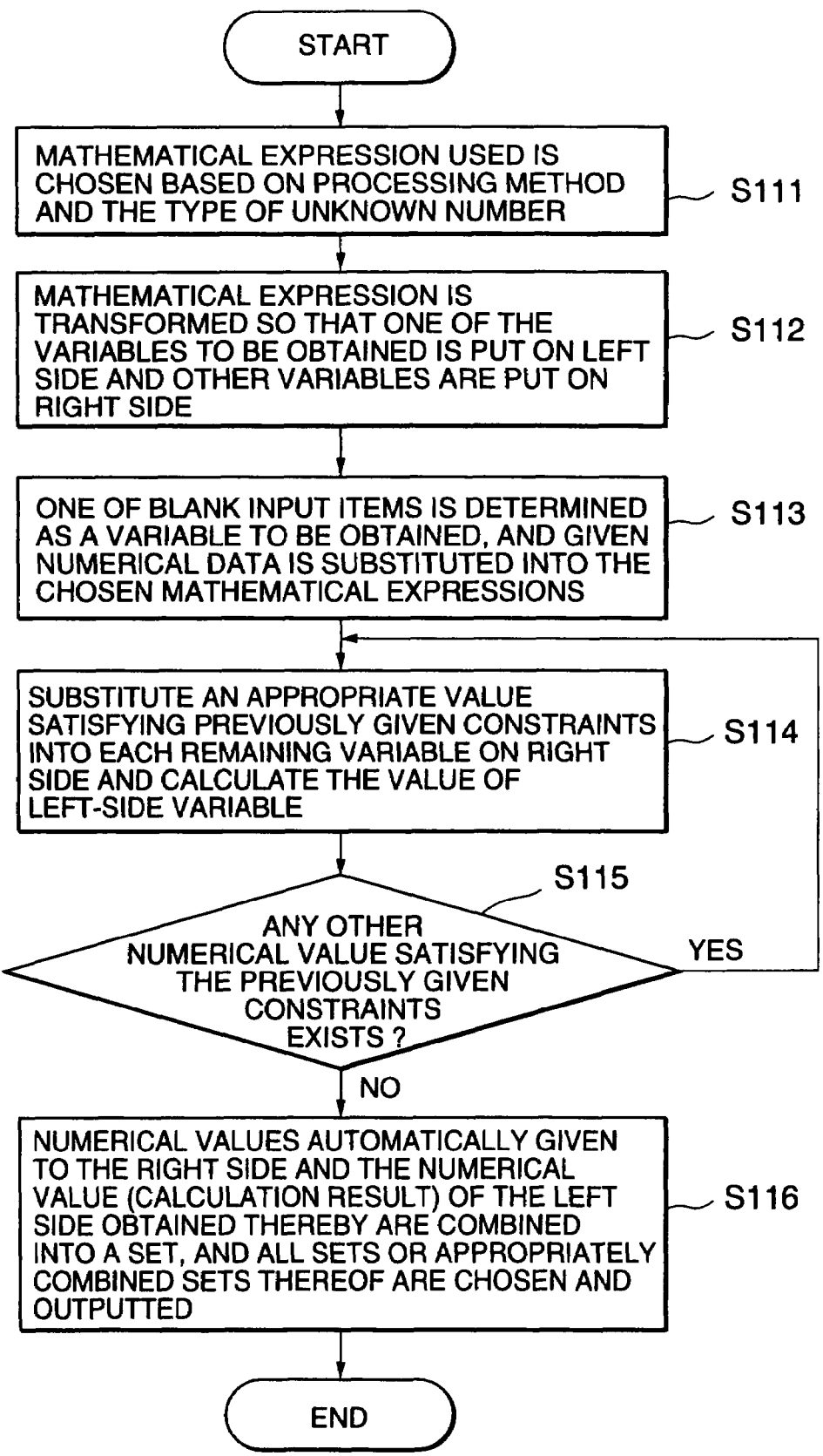
FIG. 11 is a flowchart schematically showing another example of the processing operation of the service definition editor.

In Case A, the value of the constraint of a blank input field in the service definition editor screen 91 is calculated using predetermined mathematical expressions according to the steps as shown in FIG. 10 or FIG. 11. In the case of a single blank input field to be obtained, the flow chart as shown in FIG. 10 is used. When a plurality of blank input fields should be obtained, the flow chart as shown in FIG. 11 is used.

The mathematical expressions are previously obtained using mathematical models of respective ones of the reply collecting server and the reply processing server. Accordingly, there are plural possible mathematical expressions depending on a combination of a processing method and a constraint. The respective mathematical models of the following expressions (1) and (2) are shown in FIG. 2 and FIG. 4.

$$Pt(Uf) + \sum_{k=1}^{Lr} Ps_k(Uf) \le Rr \tag{1}$$

$$Nc(M) + \sum_{k=1}^{Lr} Nt_k(M) + \sum_{k=1}^{Lr} Pb_k(M) \le Rs \tag{2}$$

In these expressions (1) and (2), Pt(x) is a time function required for collection per one reply in a reply collecting server, Uf is the number of audiences per one reply collecting server, Ps(x) is a time function required for processing per one reply collecting server, Rr is collection time permissible for collection, Lr is the number of processing items, Nc(x) is a network connection time function, M is the number of reply collecting servers to be used; Nt(x) is a network data transmission time function; Pb(x) is a time function required for processing by a reply processing server; and Rs is permissible time required for processing from the completion of collection registration to the completion of processing.

As described above, a mathematical expression such as the expressions (1) and (2) would exist for each combination of a processing method and the kind of a constraint (the kind of unknown value). Hereafter, for simplicity, the expression corresponding to a combination of the processing method "sum total" and the kind of unknown value "the number of servers to be used" will be described.

The number of audiences Uf which should be processed by each of M reply collecting servers ($1 \le M \le N$) is obtained by equally dividing the whole number Ua of audiences (anticipated audiences) by M, resulting in the following expression (3).

$$Uf = Ua/M \tag{3}$$

If the collection time is proportional only to the amount of reply data, then the time function Pt(x) is expressed by the following expression (4).

$$Pt(x) = (AaTa + Ca)x \tag{4}$$

where, Aa is the average amount of data per reply, Ta is a collection time required for collection per unit of collected data, and Ca is a collection overhead time per reply.

In the processing method "sum total", if the calculation time required for addition of each item is $F_1$ which is uniform regardless of an item, the following expression (5) is obtained.

$$Ps(x) = F_1 X \tag{5}$$

When the above expressions (3) to (5) are substituted into the expression (1), the following expression (6) is obtained.

$$(AaTa + Ca + F_1 Lr)Ua/M \le Rr \tag{6}$$

Further, the expression (6) can be changed as follows:

$$M \ge (AaTa + Ca + F_1 Lr)Ua/Rr \tag{7}$$

If the reply collecting servers are sequentially connected to the reply processing server 3 while waiting for data transmission for each network connection to be completed, the network connection time is ideally proportional to uniform connection overhead time. Therefore, the following expression (8) is obtained.

$$Nc(x)=Nox \quad (8),$$

where No is a connection overhead time per one connection between the reply collecting servers and the reply processing server 3.

Also, since the transmission time in ideal network transfer is proportional to the amount of data and the amount of overhead, the following expression (9) is obtained.

$$Nt(x)=Npx(Q+Cb) \quad (9),$$

where Np is a network transmission time per unit byte and Q is the amount of data for each processing item, and Cb is the amount of overhead data for each processing item.

Since the processing time in the reply processing server 3 is proportional to the number M of servers, the following expression (10) is obtained.

$$Pb(x)=B_1X \quad (10),$$

where $B_1$ is the processing time per reply collecting server in the reply processing server 3.

Here, if Q is identical in all processing items and Cb is uniform in all processing items, then the following expression (11) can be obtained by substituting the expressions (8) to (10) into the expression (2).

$$NoM+NpMLr(Q+Cb)+B_1MLr \leq Rs \quad (11)$$

When this expression (11) is further transformed to be put based on M, the following expression (12) is obtained.

$$M \leq Rs/\{No+NpLr(Q+Cb)+B_1Lr\} \quad (12)$$

The above-described expressions (7) and (12) are prepared corresponding to the combination of the processing method "sum total" and an unknown number "the number of servers to be used", and the service definition editor 12 holds the above-described expressions (7) and (12) and other expressions corresponding to other combinations of processing method and unknown number therein.

FIG. 10 shows an operation when a single blank input field exists in the service definition editor screen 91. In FIG. 10, mathematical expressions are chosen out of the mathematical expressions existing for combinations of the processing methods and the kinds of unknown number, based on the processing method chosen on the service definition editor screen 81 and the kind of the blank input field on the service definition editor screen 91 (step S101). Subsequently, the values of the corresponding constraints shown on the service definition editor screen 81 and 91 are substituted into corresponding variables each expression chosen in the step S101, and the minimum value of the unknown value which satisfies each above-described expression is calculated (step S102). This determines the values of the constraints currently showing blank.

For example, when the processing method "sum total" and an unknown value M "the number of servers to be used" are chosen on the service definition editor screens 81 and 91, the expression (7) and (12) are chosen in the Step S101. The value of each constraint such as the number of presumed audiences, collection time, and the like given on the service definition editor screens 81 and 91 is substituted into a corresponding one of variables other than M "the number of servers to be used" of the expressions (7) and (12). The minimum value of M satisfying both the expressions (7) and (12) is thus calculated as the value to be filled in the blank input field "the number of servers to be used".

When the minimum value of the unknown constraint has been obtained as described above, the service definition editor 12 displays a service definition editor screen 121 as shown in FIG. 12. An input data check field 122, a computed data check field 123, and a OK/REDO button 124 are displayed in this service definition editor screen 121. If the computed data (the number of required servers: 36 sets) is acceptable, then the program producer clicks "OK" in the OK/REDO button 124. Thereby, the service definition editor 12 creates a service definition file that defines the computed number of servers, collection time, processing time, processing method, and questionnaire items for collection and processing.

An example of the service definition file is shown in FIG. 13. This example includes: item 131 which defines the time of day starting and ending collection; item 132 which defines the time of day starting and ending processing; items 133 and 134 which define the processing method; and item 135 which defines objects to be processed. The time of day starting and ending collection and the time of day starting and ending processing are previously set into the service definition editor 12 by the program producer.

FIG. 11 shows an operation when a plurality of blank input fields exist in the service definition editor screen 91. In FIG. 11, required mathematical expressions are chosen from the expressions existing for every combination of the processing method and the kind of unknown number, based on the processing method chosen on the service definition editor screen 81 and the kind of the blank input field (the unknown number kind) on the service definition editor screen 91 (step S111).

Subsequently, as for each mathematical expression chosen in Step S111, transformation is made in such a way that one of the variables which requires a value is set to the left side and the remaining variables are set to the right side (Step S112). In this transformation of expression, the same variable is put on the left side in each expression. Then the values of variables given on the service definition editor screens 81 and 91 are substituted into each expression (Step S113).

Thereafter, an appropriate numerical value which satisfies a previously given constraint is substituted into a selected one of the variables which remains in the right side of each expression, to calculate a value of the variable to be obtained (Step S114). For example, the minimum value of all possible values of the variable to be obtained can be determined as a suitable value. It is then determined whether any other numerical value which satisfies the previously given constraint exists (step S115). The step S114 is repeatedly performed until no appropriate numerical value which satisfies the previously given constraint exists. When no appropriate numerical value exists (NO in Step S115), the numerical values given to the variables on the right side and the corresponding minimum values of the variable to be obtained on the left side are combined to produce sets, all or a portion of which are outputted (Step S116).

More specifically, consider the case where the input field 93 for collection time and the input field 96 for the number of required servers are blank on the service definition editor screen 91. In this case, transformation of each expression is made in such a way that a variable for the number of servers is in the left side and other variables are in the right-hand side. Next, data inputted in the service definition editor screens 81 and 91 (the number of presumed audiences, processing time, and the like) are substituted into each mathematical expression which was transformed in above-described way. In this example, since collection time remains in the right-hand side as a variable, there are used a predetermined restriction on collection time in the right side such that collection time is larger than 0 and a predetermined restriction on the number of servers in the left side such that the number of prepared servers is zero or more but not greater than 1000. In these restrictions, a relationship between collection time and the number of servers is obtained as a set of substituted values. Since the number of servers increases by one every time the collection time increases by a certain amount, the final combination is outputted in consideration of easy judgment of a program producer, for example, as shown in the following Table I.

TABLE I

| Collection time (seconds) | The number of servers |
|---|---|
| 0-100 | 1 |
| 100-200 | 2 |
| 200-300 | 3 |
| ... | ... |
| 9900-10000 | 100 |

Figure 14:
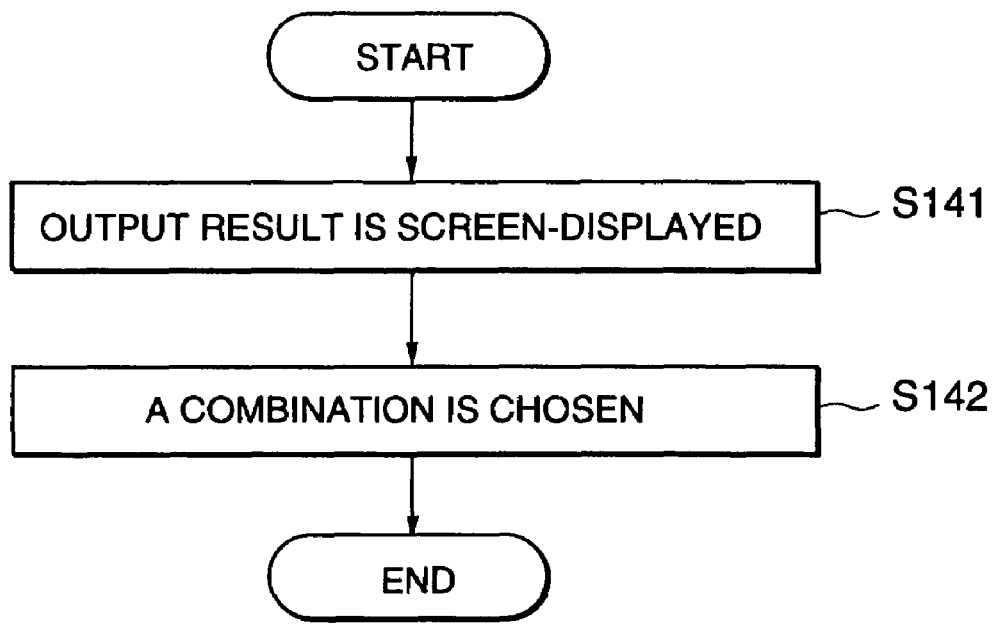
FIG. 14 is a flow chart showing an example of the processing operation of the service definition editor.

As shown in FIG. 14, after combinations of possible values of unknown constraints (here, the number of servers for use and the collection time) have been obtained as described before, the service definition editor 12 displays all the combinations on a screen and presents them to the program producer (Step S141). The program producer who looked at this display chooses one combination from the combinations displayed (Step S142). This causes the service definition editor 12 to generate and output a service definition file.

It should be noted that how to generate a service definition file is not limited to the above-mentioned method.

Figure 15:
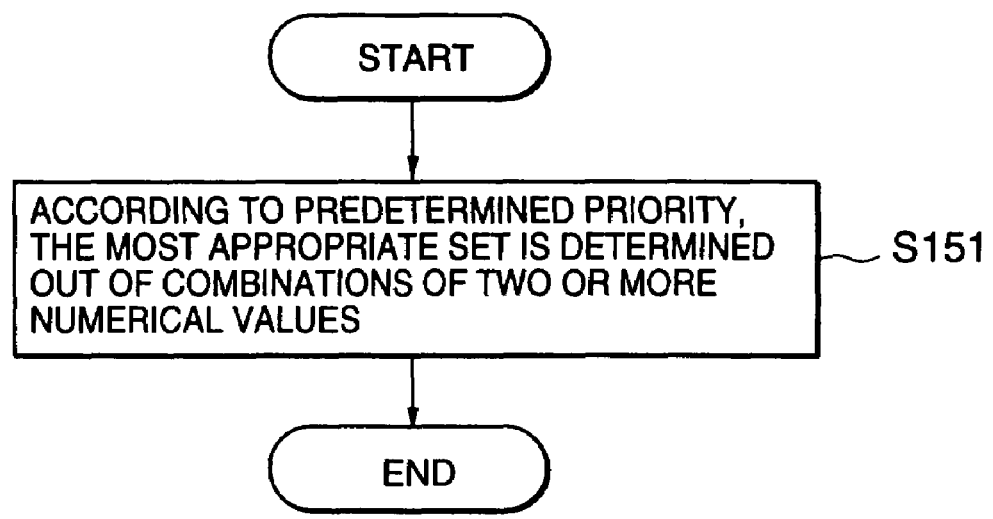
FIG. 15 is a flow chart showing another example of the processing operation of the service definition editor.

As shown in FIG. 15, it may be adapted in such a way that the most suitable combination may be determined out of all the combinations according to predetermined priority decided (Step S151). For example, when "higher priority is given to fewer number of servers" is predetermined as a priority, a combination providing the minimum number of servers will be chosen.

II. Case B

In Case B, the value of the constraint of a blank input field in the service definition editor screen 91 is calculated using predetermined mathematical expressions according to the steps as shown in FIG. 10 or FIG. 11.

The mathematical expressions are previously obtained using mathematical models of respective ones of the reply collecting server and the reply processing server. Accordingly, there are plural possible mathematical expressions depending on a combination of a processing method (here, "only collection") and a constraint. The respective mathematical models of the following expressions (13) and (14) are shown in FIG. 3 and FIG. 5.

$$Pt(Uf) + \sum_{k=1}^{Lr} Pm_k(Uf) \le Rr \quad (13)$$

$$Nc(M) + Nt(Uf, M) + Pw(Uf, M) \le Rs_2 \quad (14)$$

In these expressions (13) and (14), Pm(x) is a time function required for storing per one reply in a reply collecting server, Nt(x,y) is a network data transmission time function, Pw(x,y) is a time function required for storing at a reply processing server, and $Rs_2$ is permissible time required for processing from the completion of reception to the completion of storing.

As described above, a mathematical expression such as the expressions (13) and (14) would exist for each combination of a processing method and the kind of a constraint (the kind of unknown value). Hereafter, for simplicity, the expression corresponding to a combination of the processing method "only collection" and the kind of unknown value "the number of servers to be used" will be described.

The number of audiences Uf which should be processed by each of M reply collecting servers ($1 \le M \le N$) is obtained by equally dividing the whole number Ua of audiences (anticipated audiences) by M, resulting in the following expression (15).

$$Uf = Ua/M \quad (15)$$

If the collection time is proportional only to the amount of reply data, then the time function Pt(x) is expressed by the following expression (16).

$$Pt(x) = (AaTa + Ca)x \quad (16)$$

Moreover, if it is assumed that storing time is proportional to the average amount of data Pv per stored item, the storing time is proportional to the average amount of data and processing time Td per unit of byte and therefore Pm(x) is obtained by the following expression (17).

$$Pm(x) = PvTdx \quad (17)$$

Substituting the expressions (15) to (17) into the expression (13), the following expression (18) is obtained.

$$(AaTa + Ca + PvTdLr)Ua/M \le Rr \quad (18)$$

When this is transformed according to M (the number of servers for use), the following expression (19) is obtained.

$$M \ge (AaTa + Ca + PvTdLr)Ua/Rr \quad (19)$$

If the reply collecting servers are sequentially connected to the reply processing server 3 while waiting for data transmission for each network connection to be completed, the network connection time is ideally proportional to uniform connection overhead time. Therefore, the following expression (20) is obtained.

$$Nc(x) = Nox \quad (20),$$

where No is a connection overhead time per one connection between the reply collecting servers and the reply processing server 3.

Also, since the transmission time in ideal network transfer is proportional to the amount of data and the amount of overhead, the following expression (21) is obtained where Ab is the average amount of transfer data per reply.

$$Nt(x,y) = y\{x(AbTb + Cc) + Cd\} \quad (21),$$

where Tb is transfer time per unit data from a reply collecting server to the reply processing server; Cc is overhead processing time per one transfer from the reply collecting server to the reply processing server; and Cd is transfer overhead processing time per one reply collecting server from the reply collecting server to the reply processing server.

Assuming that the average amount of stored data per one reply to be stored by the reply processing server is set as Ac, the following expression (22) is obtained.

$$Pw(x,y) = y\{x(AcTc + Ce) + Cf\} \quad (22)$$

Here, Tc is storing time per unit of collection data at the reply processing server, Ce is overhead processing time per stored reply at the reply processing server, and Cf is overhead processing time per reply collecting server when stored in the reply processing server. The following expression (23) is obtained by substituting the expressions (20) to (22) into the expression (14).

$$NoM+M\{Ua(AbTb+Cc)/M+Cd\}+M\{Ua(AcTc+Ce)/M+Cf\} \le Rs_2 \quad (23)$$

When this is transformed according to M (the number of servers for use), the following expression (24) is obtained.

$$M \le \{RS_2-Ua(AbTb+Cc+AcTc+Ce)\}/(No+Cd+Cf) \quad (24)$$

A combination of the expressions (19) and (24) is the mathematical expression corresponding to the processing method "only collection" and an unknown number "number of servers for use". In addition to the expressions (19) and (24), the service definition editor 12 also holds the mathematical expression for every combination of the processing method "only collection" and other unknown numbers. Using these expressions, the processing shown in FIG. 10 or FIG. 11 is performed to obtain the values corresponding to blank constraints on the service definition editor screen 91.

III. Case C

In Case C, the value of the constraint of a blank input field in the service definition editor screen 91 is calculated using predetermined mathematical expressions according to the steps as shown in FIG. 10 or FIG. 11.

The mathematical expressions are previously obtained using mathematical models of respective ones of the reply collecting server and the reply processing server. Accordingly, there are plural possible mathematical expressions depending on a combination of a processing method and a constraint. The respective mathematical models of the following expressions (25) and (26) correspond to the reply collection server and the reply processing server 3 as shown in FIG. 1.

$$Pt(Uf) + \sum_{k=1}^{Lr} Ps_k(Uf) + Rr\sum_{k=1}^{Lr} Pm_k(Uf) \le Rr \quad (25)$$

$$2Nc(M) + \sum_{k=1}^{Lr} Nt_k(M) + \sum_{k=1}^{Lr} Pb_k(M) + Nt(Uf, M) + Pw(Uf, M) \le Rs_2 \quad (26)$$

In these expressions (25) and (26), for simplicity, the expression corresponding to a combination of the processing method "total summation" and the kind of unknown value "the number of servers to be used" will be described. In the Case C, the collection (storing) and processing (total summation and the like) are simultaneously performed provided that the processing (summation) previously completes calculation and thereafter the collection (storing) is performed.

Substituting the expressions (3) to (5) and (17) into the expression (25), the following expression (27) is obtained.

$$(AaTa+Ca+F_1Lr+PvTdLr)Ua/M \le Rr \quad (27)$$

Also, when this expression is transformed in terms of M (the number of servers for use), the following expression (28) can be obtained.

$$M \ge (AaTa+Ca+F_1Lr+PvTdLr)Ua/Rr \quad (28)$$

Further substituting the expressions (8) to (10), (21), and (22) into the expression (26), then the following expression (29) can be obtained.

$$2N_oM + NpLrM(Q+Cb) + B_1LrM + \quad (29)$$
$$\{Ua(AbTb+Cc)/M+Cd\}+M\{Ua(AcTc+Ce)/M+Cf\} \le Rs_2$$

When this expression is transformed in terms of M (the number of servers for use), the following expression (30) can be obtained.

$$M \le \{Rs_2 - Ua(AbTb+Cc+AcTc+Ce)\}/ \quad (30)$$
$$(2N_o + N_pLrQ + N_pLrCb + B_1Lr + Cd + Cf)$$

Step S63: Program Generation

Returning to FIG. 6, at step S63, the program generator 13 generates an operation defining file for reply collecting servers and an operation defining file for reply processing server when the questionnaire editor 11 and the service definition editor 12 produces the questionnaire item file and the service definition file, respectively. The reply collecting server operation defining file and the reply processing server operation defining file causes the collection server program and the reply processing server program to operate according to the contents of the questionnaire item file and the service definition file.

Figure 16:
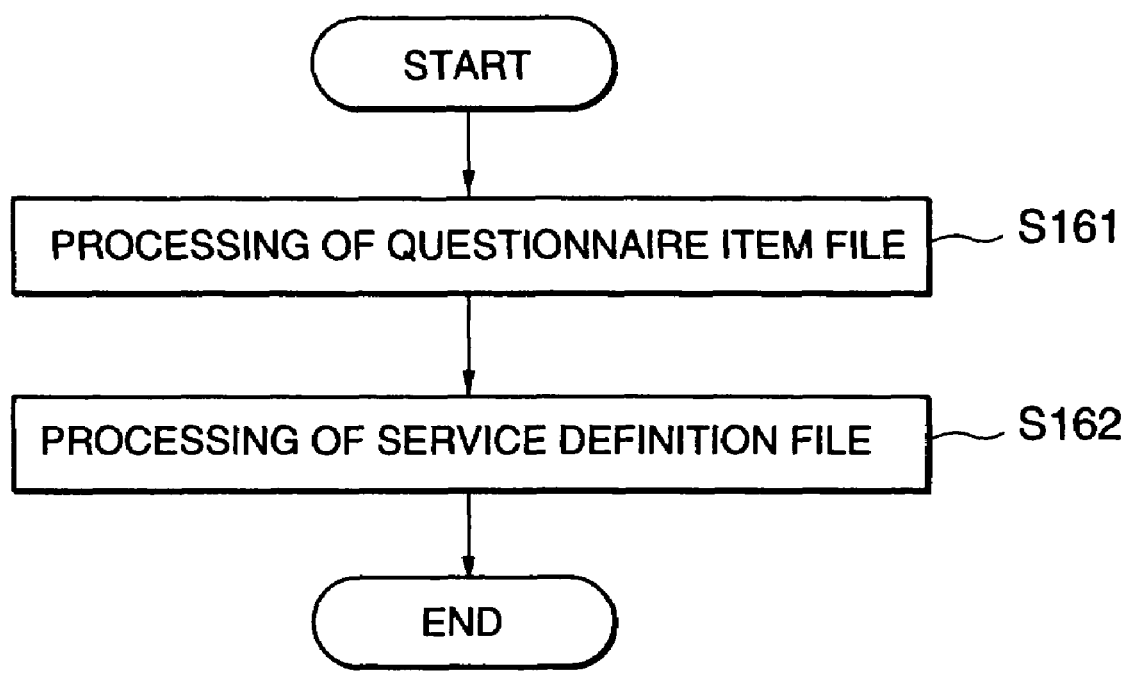
FIG. 16 is a flow chart showing an operation of generating an operation defining file for a summation server by a program generator.
Figure 17:
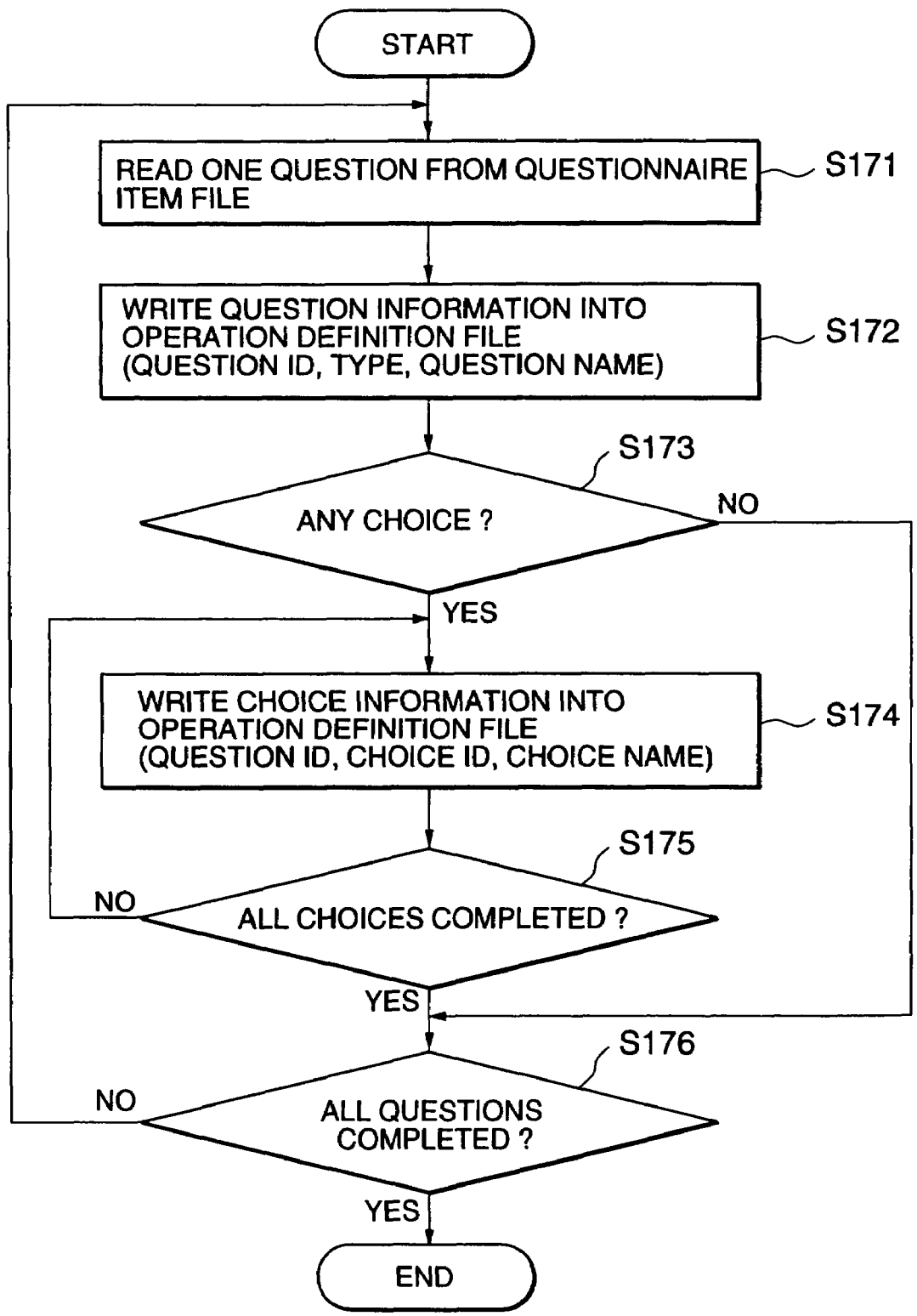
FIG. 17 is a flow chart showing an operation of processing an questionnaire item file in the step S161 of the FIG. 16.
Figure 18:
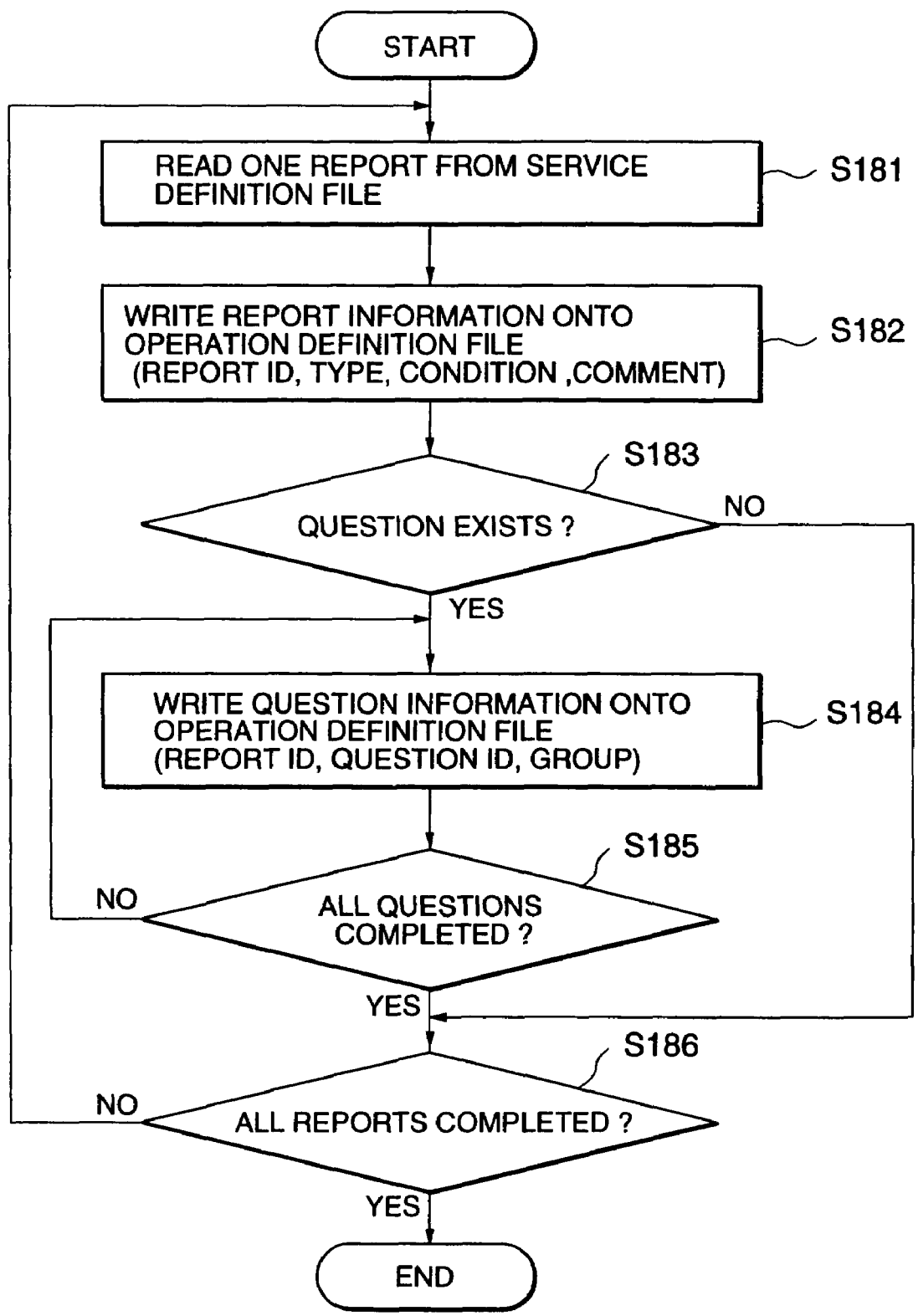
FIG. 18 is a flow chart showing an operation of processing a service definition file in the step S162 of the FIG. 16.

Referring to FIGS. 16-18, generation processing of the reply processing server operation defining file will be described.

As shown in FIG. 16, the program generator 13 generates the reply processing server operation defining file by performing the processing related to the questionnaire item file (step S161) and thereafter performing the processing related to the service definition file (step S162).

Referring to FIG. 17, details of the processing related to the questionnaire item file (step S161) will be described.

In step S171, one question is read out from the questionnaire item file. For example, assuming that the questionnaire item file has such content as shown in FIG. 22, the question identified by QUESTION ID="00000" is read from the questionnaire item file.

In step S172, question ID, the kind of a reply form and a question name are extracted from the question read at the step S171 and are written onto the reply processing server operation defining file with related to each other. As shown in FIG. 22, QUESTION ID="00000", the type of reply form: TYPE="SINGLE" and a question name "Q1. terminal type" are written onto the reply processing server operation defining file.

It step S173, it is determined whether the reply form provides a menu of choices. In the example as shown in FIG. 22, "SINGLE" in the reply form indicates that a user can make a choice among a plurality of alternatives. Accordingly, it is determined that the reply form provides a menu of choices (YES in step S173) and therefore a step S174 is performed. When it is determined that the reply form provides no choices (NO in step S173), a step S176 is performed.

In the step S174, Question ID, choice ID and a choice name are made related to each other and written onto the reply processing server operation defining file. In the example of FIG. 22, QUESTION ID="00000", ANSWER ID="000", and Choice name "A1. TV" are written thereon. The step S174 is repeatedly performed until all answer choices have been processed.

When the step S174 has been completed for all answer choices (YES in step S175), the steps S171-S175 as described above are performed carried out for the next question (QUESTION ID="00001" in the case of the example of FIG. 22). In this manner, the steps S171-S175 are repeatedly performed until all questions have been processed. When there is not left any question that is not processed yet (YES in step S176), the processing related to the questionnaire item file is terminated.

Then, the program generator 13 targets at the service definition file outputted from the service definition editor 12 to perform the processing as shown in FIG. 18.

Referring to FIG. 18, in Step S181, one report is read from the service definition file. In the case where the service definition file is as shown in FIG. 13, for example, the report 133 of a report number (REPORT NO="1") is read.

In the following step S182, Report ID, Type of processing method, Condition, and Comment are extracted from the report 133 read in Step S181, and written onto the reply processing server operation defining file. FIG. 13 shows an example such that Report ID: REPORT NO.="1", Type of processing method: RTYPE="SUM-SINGLE", Comment: NOTE="simple totalizing (e.g. how many persons for a, and how many persons for b)" are written onto the reply processing server operation defining file. In the case as shown in FIG. 13, the report 133 has no conditions.

In Step S183, it is determined whether the report 133 read in Step S181 has a description about question therein. In the example of FIG. 13, the report 133 includes a description about a question and therefore the following step S184 is performed (YES in step S183). If the report 133 includes no description about question (NO in step S183), the step S186 is performed.

In Step S184, report ID, question ID and group are written onto the reply processing server operation defining file. In the example of FIG. 13, REPORT NO="1" and QUESTION ID="1" are written onto the reply processing server operation defining file. In the example of FIG. 13, the report 133 has no group and only the report 135 has a group. The step S184 is repeatedly performed until all the questions have been processed.

When the processing for all questions included in the report has been completed (YES in step S185), it is determined whether all reports has been processed (step S186). If at least one report is left (NO in step S186), a subsequent report is read out from the service definition file (step S181). In this manner, the steps S181-S185 are repeatedly performed until all the reports have been processed. When the processing for all the reports have been completed (YES in step S186), then this processing is terminated.

Figure 19:
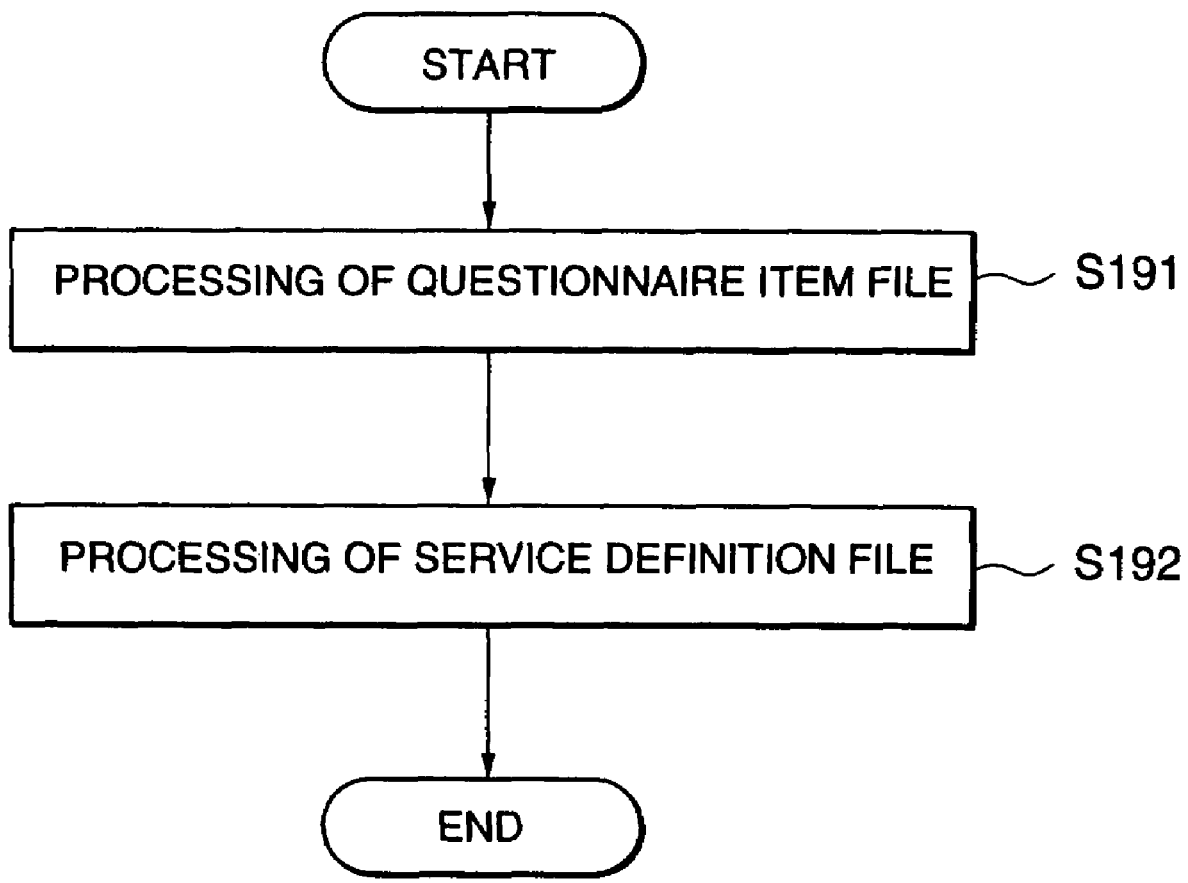
FIG. 19 is a flow chart showing an operation of generating an operation defining file for a reply collection server by the program generator.
Figure 20:
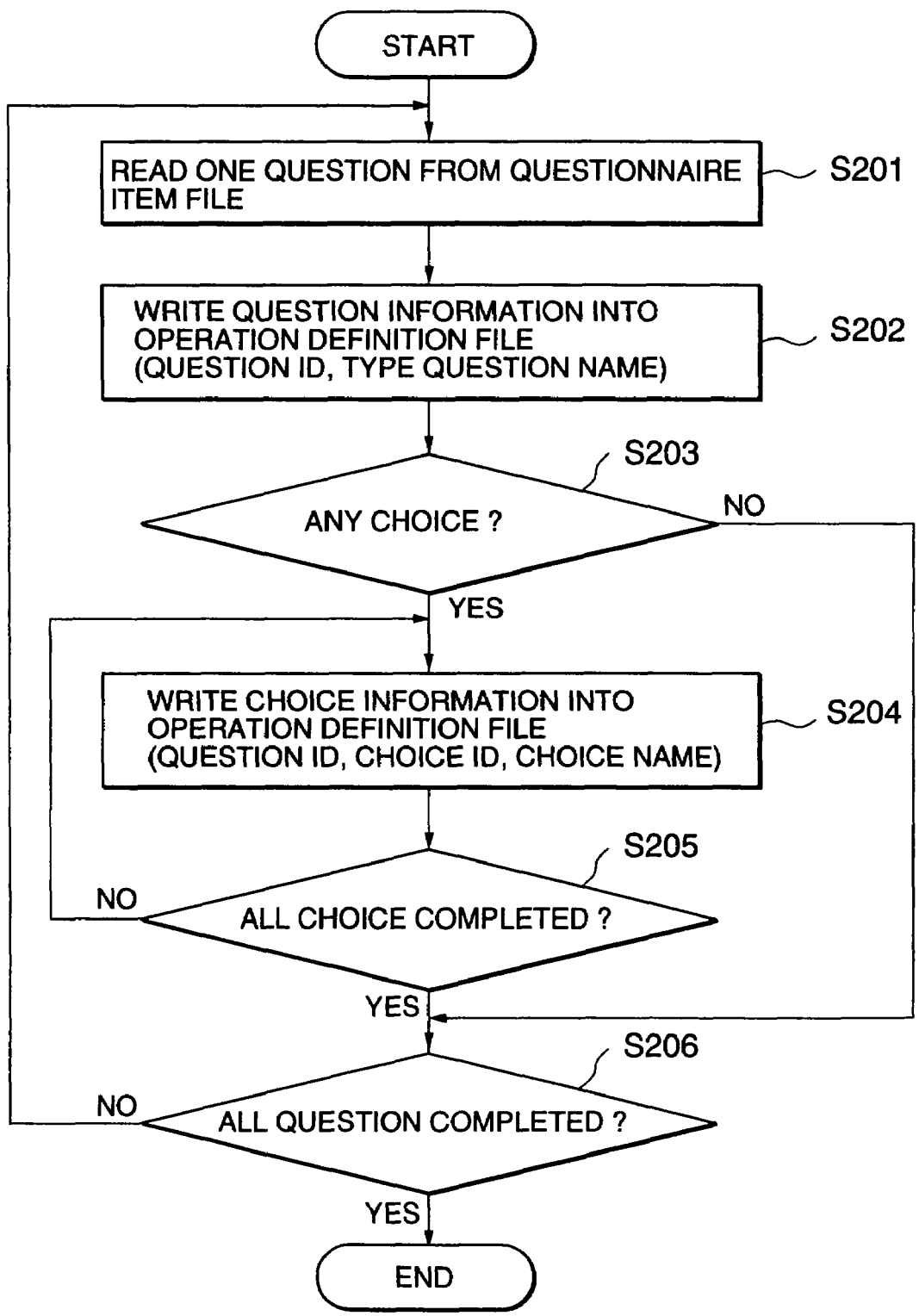
FIG. 20 is a flow chart showing an operation of processing an questionnaire item file in the step S191 of the FIG. 19.
Figure 21:
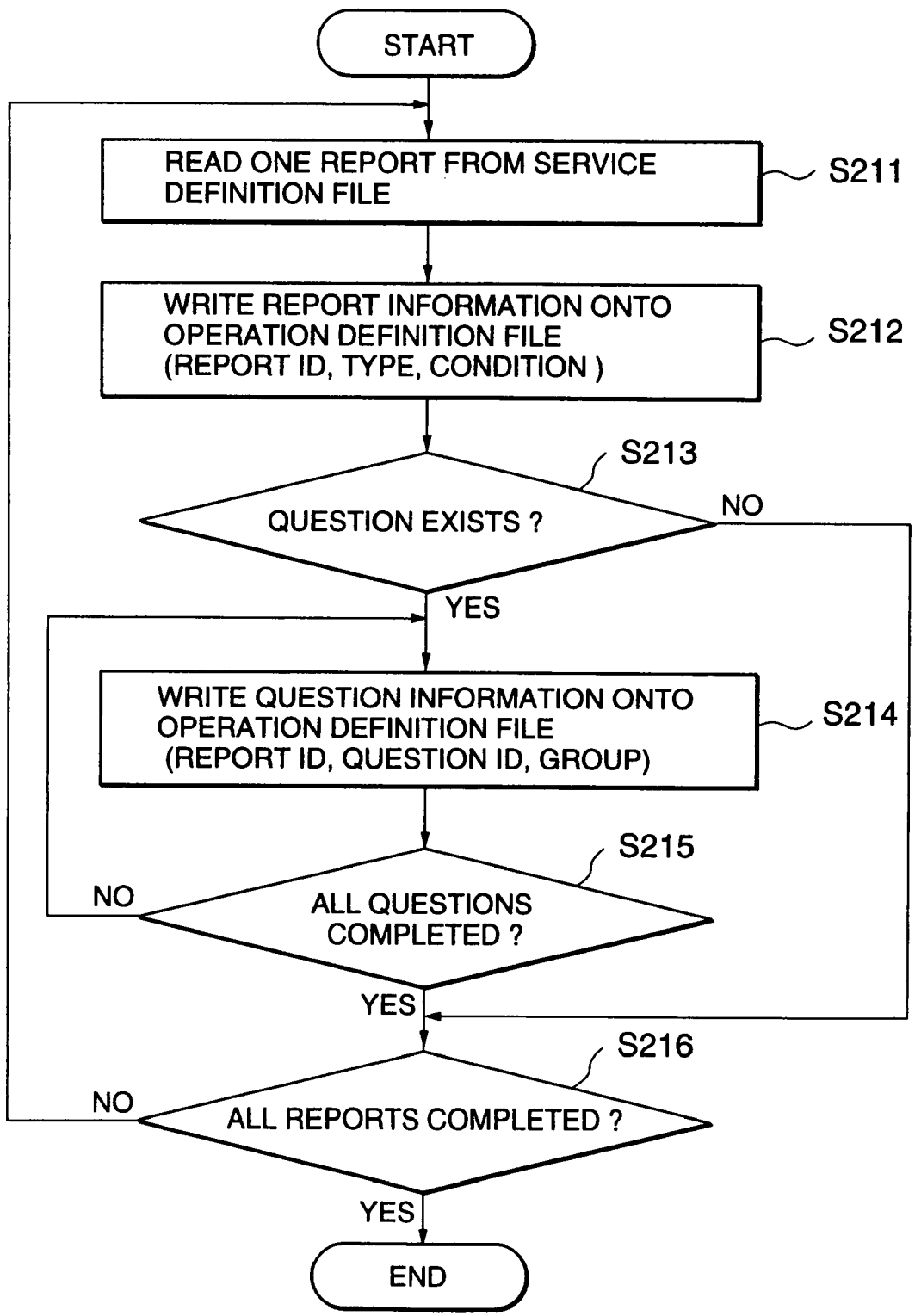
FIG. 21 is a flow chart showing an operation of processing a service definition file in the step S192 of the FIG. 19.

Referring to FIGS. 19-21, generation processing of the reply collecting server operation defining file will be described.

As shown in FIG. 19, the program generator 13 generates a reply collecting server operation defining file by performing the processing related to the questionnaire item file (step S191) and thereafter performing the processing related to the service definition file (step S192).

Referring to FIG. 20, the processing related to the questionnaire item file (step S191) is performed by steps S201-S206, which is the same as the processing of the steps S171-S176 as shown in FIG. 17, provided that information such as question ID is written onto the reply collecting server operation defining file.

Referring to FIG. 21, the processing related to the service definition file (step S192) is performed by steps S211-S216, in which the steps S211, S213-S216 are the same with the steps S181, S183 to S186 of FIG. 18, respectively, provided that information such as report ID is written onto the reply collecting server operation defining file. The step S212 is different from the step S182. In the step S182, comment is written onto the operation definition file, whereas no comment writing is performed in step S212.

The program generator 13 generates the reply collecting server operation defining file and the reply processing server operation defining file and stores them in the service program repository 14.

Alternatively, the program generator 13 can generate a reply collecting server program and a reply processing server program without the need of operation definition files. More specifically, necessary modules are selected from a plurality of predetermined program modules based on the inputted questionnaire item file and the service definition file. Subsequently, a driving program is generated to communicate with these selected modules and is combined to each selected module to produce the reply collecting server program and the reply processing server program without the need of operation definition files.

Step S64: Program Distribution

Returning to FIG. 6, at step S64, the server distribution management service section 15 performs server program distribution to the reply processing server 3 and M reply collecting servers selected from the N reply collecting servers 2-1 to 2-N. The server distribution management service section 15 detects the timing of collecting and processing replies based on the contents of the operation defining file stored in the service program repository 14 or an instruction of the operator. When the timing of collecting and processing is detected, the previously prepared reply processing server program and the reply processing server operation definition file are distributed to the reply processing server 3. At the same time, the server distribution management service section 15 selects M available ones from the N reply collecting servers 2-1 to 2-N to distribute the reply collecting server program and the reply collecting server operation definition file to the selected M reply collecting servers.

As described before, in the case where the program generator 13 generates the reply collecting server program and the reply processing server program which requires no operation defining files, the reply collecting server program is distributed to the M reply collecting servers and the reply processing server program is distributed to the reply processing server 3.

The reply collecting server implements the configuration as shown in FIG. 1, 2, or 3 thereon according to the reply collecting server program and the reply collecting server operation definition file which are received from the server distribution management service section 15. Similarly, the reply processing server 3 implements the configuration as shown in FIG. 1, 4, or 5 thereon when having received the reply processing server program and the reply processing server operation definition file.

Steps S65 and S66: Reply Reception and Processing

Returning to FIG. 6, the reply reception (step S65) and reply processing (step S66) are performed in the reply collecting servers and the reply processing server 3 which are configured as described above.

Hereinafter, it is assumed that the reply collecting servers and the reply processing server 3 are configured as shown in FIG. 1.

As shown in FIG. 1, in the reply collecting server (e.g. 2-1), the Web server 25 is activated to receive replies from audiences at the questionnaire collection service section 21 through the Web interface. The questionnaire collection service section 21 passes the questionnaire reply items instructed to be processed by the service definition editor 12 to the reply processing middleware section 22, and passes the questionnaire reply items instructed to be collected by the service definition editor 12 to the reply collection middleware section 23.

The reply processing middleware section 22 combines the replies passed by the questionnaire collection service section 21 with the replies already passed to perform the statistics processing such as total summation or the extraction processing. On the other hand, the reply collection middleware section 23 saves the replies in a saving form. At every constant timing, after the expiration of collection time, or according to a request of the reply processing server 3, processed or collected data is sent to the reply processing server 3 through the data transmission middleware section 24.

The reply processing server 3 uses the data receiving middleware section 31 to receive data from all the M reply collecting servers which have collected the replies to a questionnaire in the same interactive program. If the received data is processed data, it is passed to the reply processing service section 32, and if it is collected data, it is passed to the collection service section 33. The reply processing service section 32 further processes the processed data received from each reply collecting server. The collection service section 33 stores all collected data onto the reply data base 34.

Hereinafter, assuming that the reply collecting servers and the reply processing server 3 are configured as shown in FIG. 3 and FIG. 5, respectively, operations thereof will be described.

Figure 23:
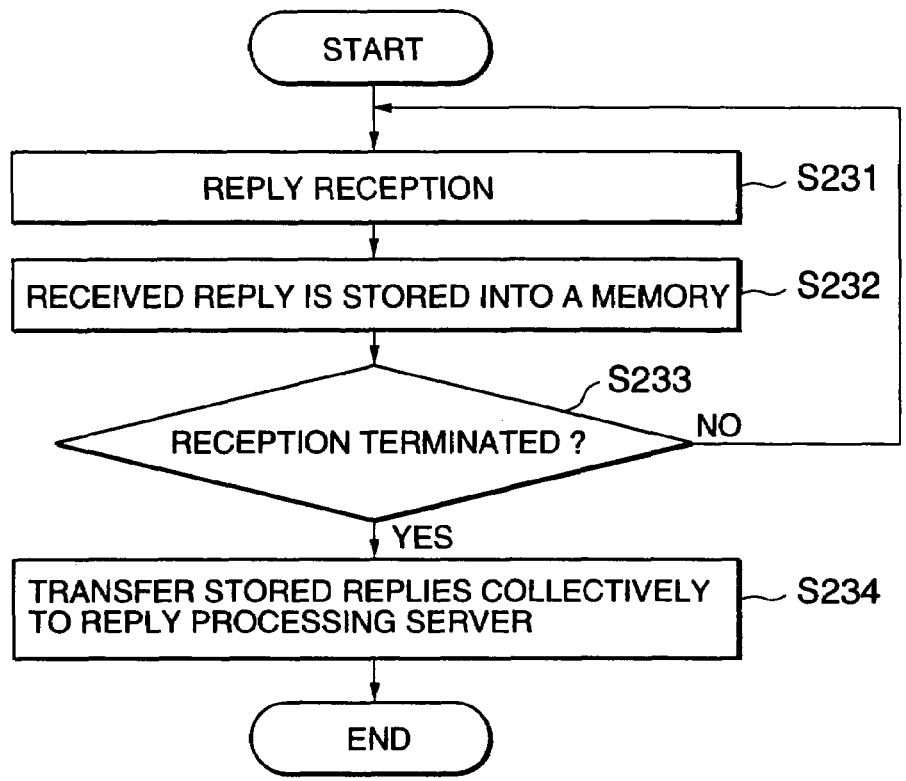
FIG. 23 is a flow chart showing an example of a processing operation of the reply collection server as shown in FIG. 3.

Referring to FIG. 23, in the reply collecting server, the questionnaire collection service section 21 receives a reply from an audience terminal (step S231), and the collection middleware section 23 stores the reply onto a memory (not shown) (step S232). If the memory becomes full or insufficient, the stored data is written out to a separate file or the like in units of a predetermined size so as to save the memory.

The steps S231 and S232 are repeatedly performed until the preset reception time has been expired or a reception termination instruction has been received. When the reception is completed (YES in step S233), the data transmission middleware section 24 transmits collectively all the reply data stored in the memory to the reply processing server 3 (step S234). If all reply data cannot be transmitted at once, data may be divided by a transmittable size to enable the transmission of data in units of divided data. Also, when the stored data is written out to a separate file or the like to same the memory, the written data may be transferred back to the memory before transmitted to the reply processing server 3.

Figure 24:
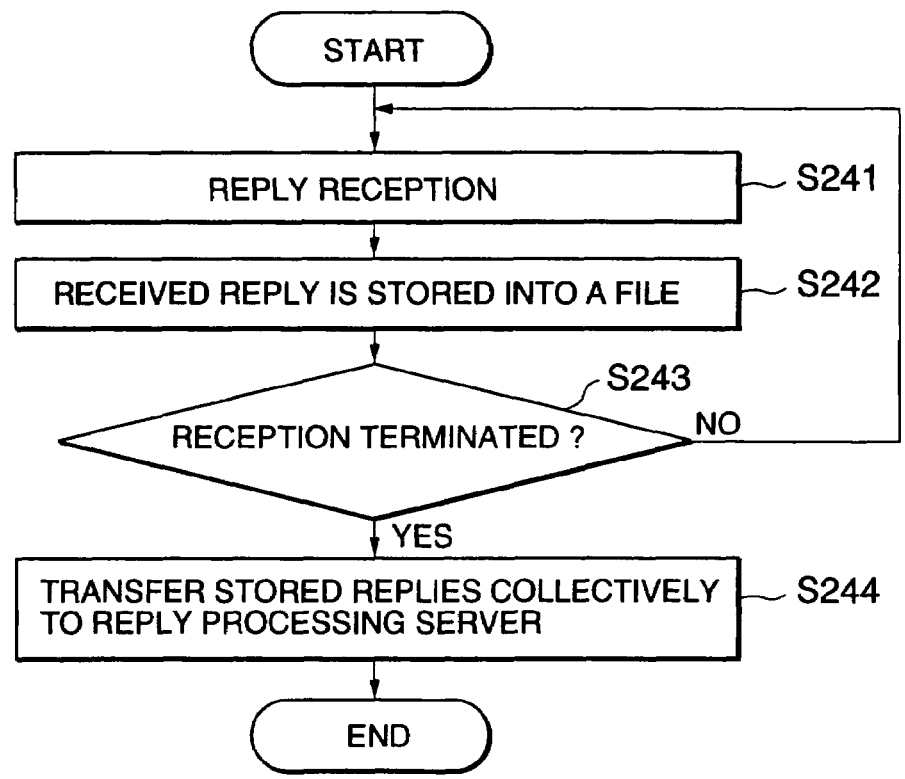
FIG. 24 is a flow chart showing another example of the processing operation of the reply collection server as shown in FIG. 3.

As shown in FIG. 24, the reply may be stored in a file made of a non-volatility recording medium (not shown) in place of the memory of FIG. 23. In FIG. 24, the other steps S241, S243, and S244 correspond to the steps S231, 233, and S234 of FIG. 23, respectively.

Figure 25:
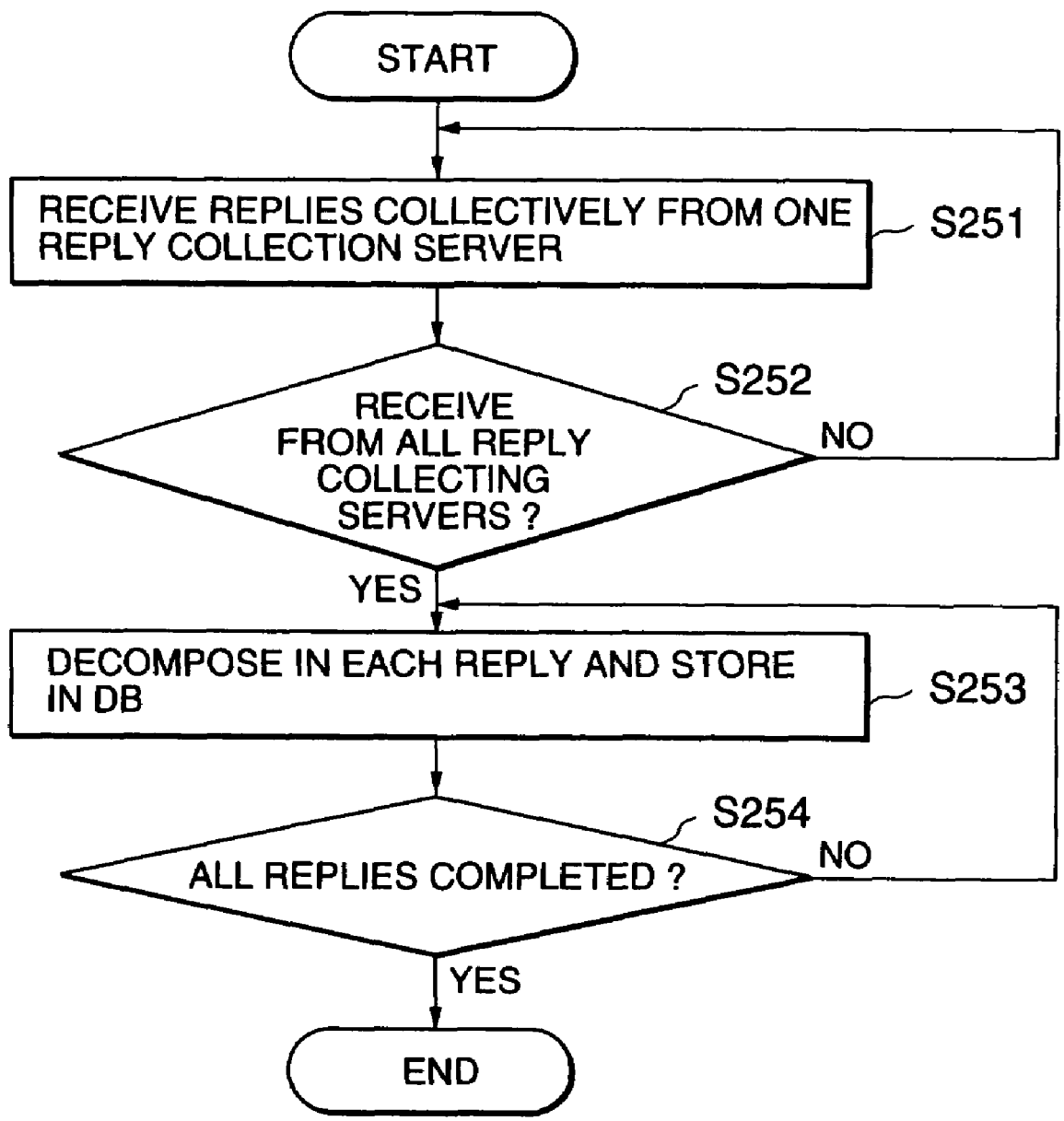
FIG. 25 is a flow chart showing an example of a processing operation of the reply processing server as shown in FIG. 5.

Referring to FIG. 25, in the reply processing server 3, the data receiving middleware section 31 sequentially receives collected data from the reply collecting servers 2-1 to 2-N. The collected data is temporarily stored in a memory or a file made of a relatively high-speed recording medium (not shown) or all collected data are stored as a series of binary data in the reply DB 34 (step S251). The data storing of the relatively high-speed recording medium and the relatively low-speed DB 34 may be performed in parallel. Alternatively, after the data storing of the relatively high-speed recording medium has been completed, the data storing of the DB 34 may be performed. In this manner, when the collected data have been received from all the reply collecting servers 2-1 to 2-N (YES in step S252), the collection service section 33 disassembles each collected data in units of one reply to store each reply of data into the DB 34 (step S253). The collection service section 33 repeatedly perform the step S253 until all replies have been processed.

In the case where the data receiving middleware section 31 and the collection service section 33 are allowed to operate in parallel, the data receiving operation of the data receiving middleware section 31 from the respective reply collecting servers 2-1 to 2-N is in some cases performed in parallel with the collected data storing operation of the collection service section 33 into the reply DB 34.

Next, assuming that the reply collecting servers and the reply processing server 3 are configured as shown in FIG. 3 and FIG. 5, respectively, another operation thereof will be described by referring to FIG. 41 and FIG. 42.

Figure 41:
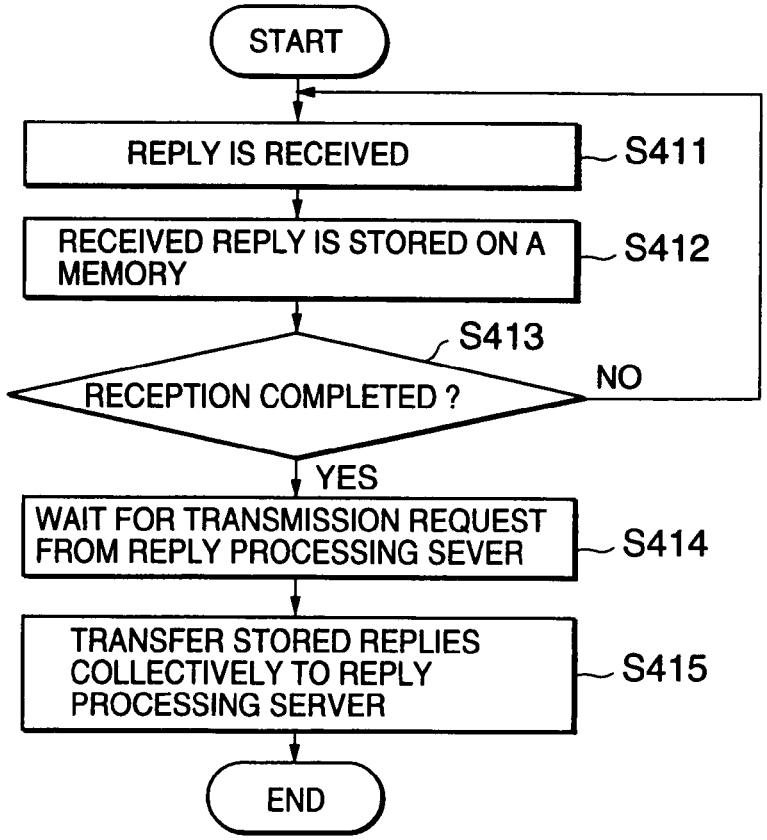
FIG. 41 is a flow chart showing still another example of a processing operation of the reply collection server as shown in FIG. 3.

FIG. 41 shows an operation of the reply collecting server, which is different from that of FIG. 23 in that reply data is sent to the reply processing server 3 at a data transmission request of the reply processing server 3 (steps S414 and S415). The other steps S411 to S413 correspond to the steps S231 to S233 of FIG. 23.

Figure 42:
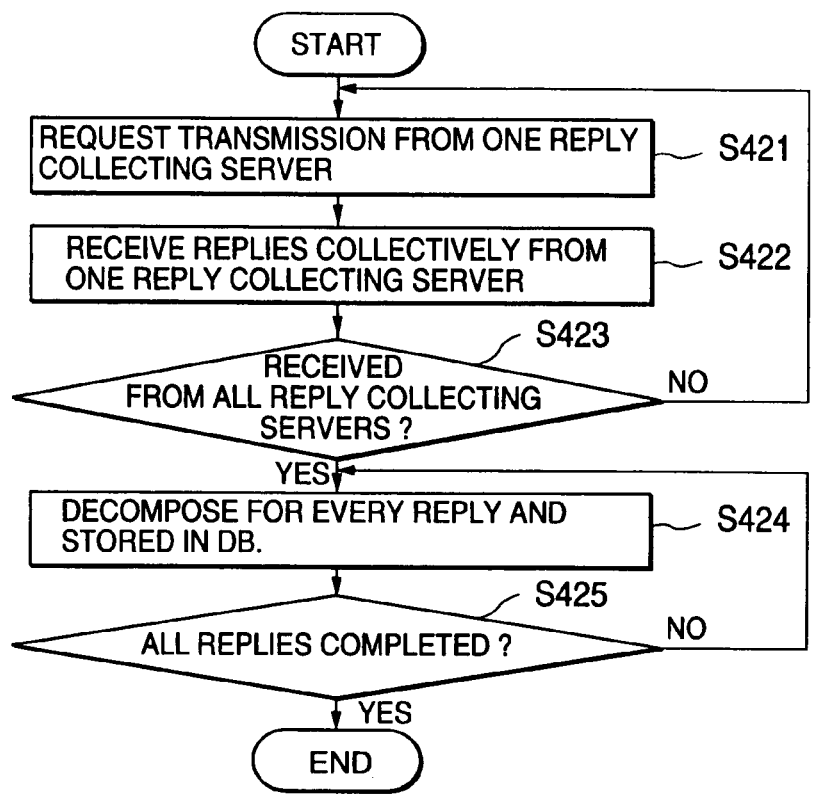
FIG. 42 is a flow chart showing still another example of a processing operation of the reply processing server as shown in FIG. 5.
Figure 43:
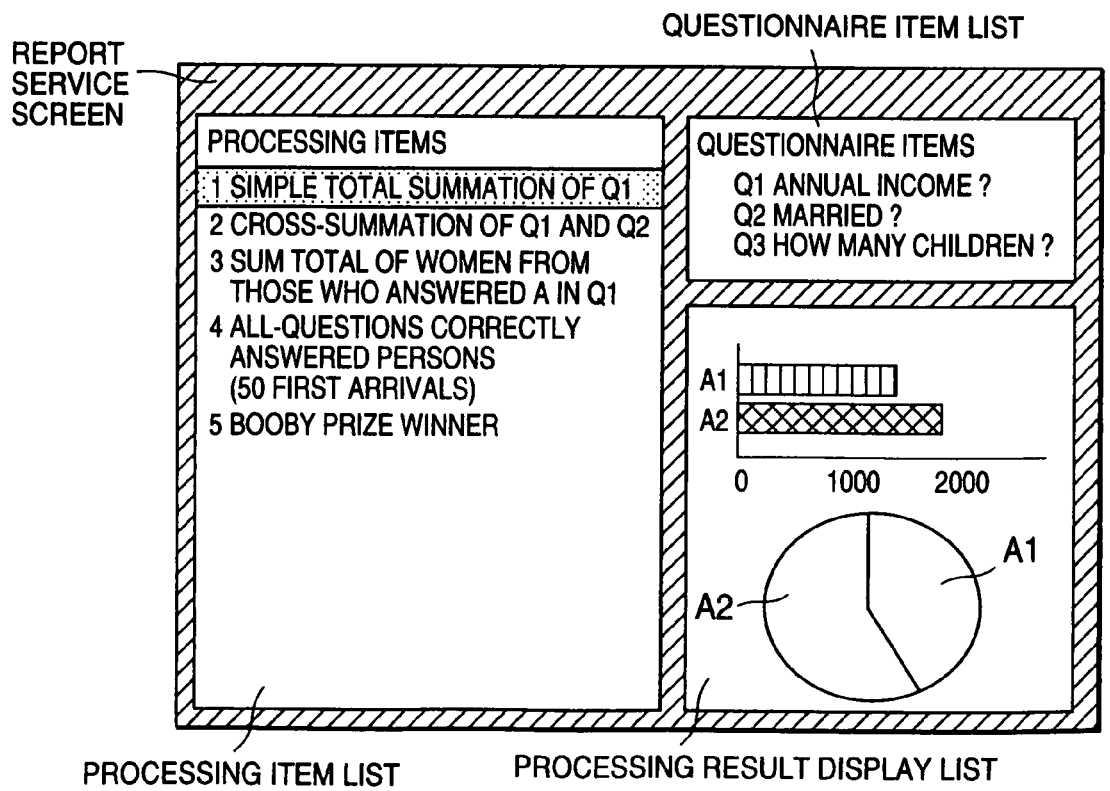
FIG. 43 is a diagram showing an example of a report service screen displayed according to a HTML document outputted by a report service section.

FIG. 42 shows the operation of the reply processing server 3, which is different from that of FIG. 25 in that a data transmission request is sequentially sent to the reply collecting servers 2-1 to 2-N (step S421). The other steps S422 to S425 correspond to the steps S251 to S254. In the operations shown in FIG. 41 and FIG. 42, each of the reply collecting servers 2-1 to 2-N transmits reply data collected from audience terminals to the reply processing server 3 in response to a transmission request received from the reply processing server 3. This allows the consumption of system resources on the side of the reply processing server 3 to be suppressed when the number of reply collecting servers increases.

Next, further still another example of the operation performed by a reply collecting server that is configured as shown in FIG. 3 will be described referring to FIG. 26. This example can effectively deal with occurrence of a memory failure in the reply collecting server.

Figure 26:
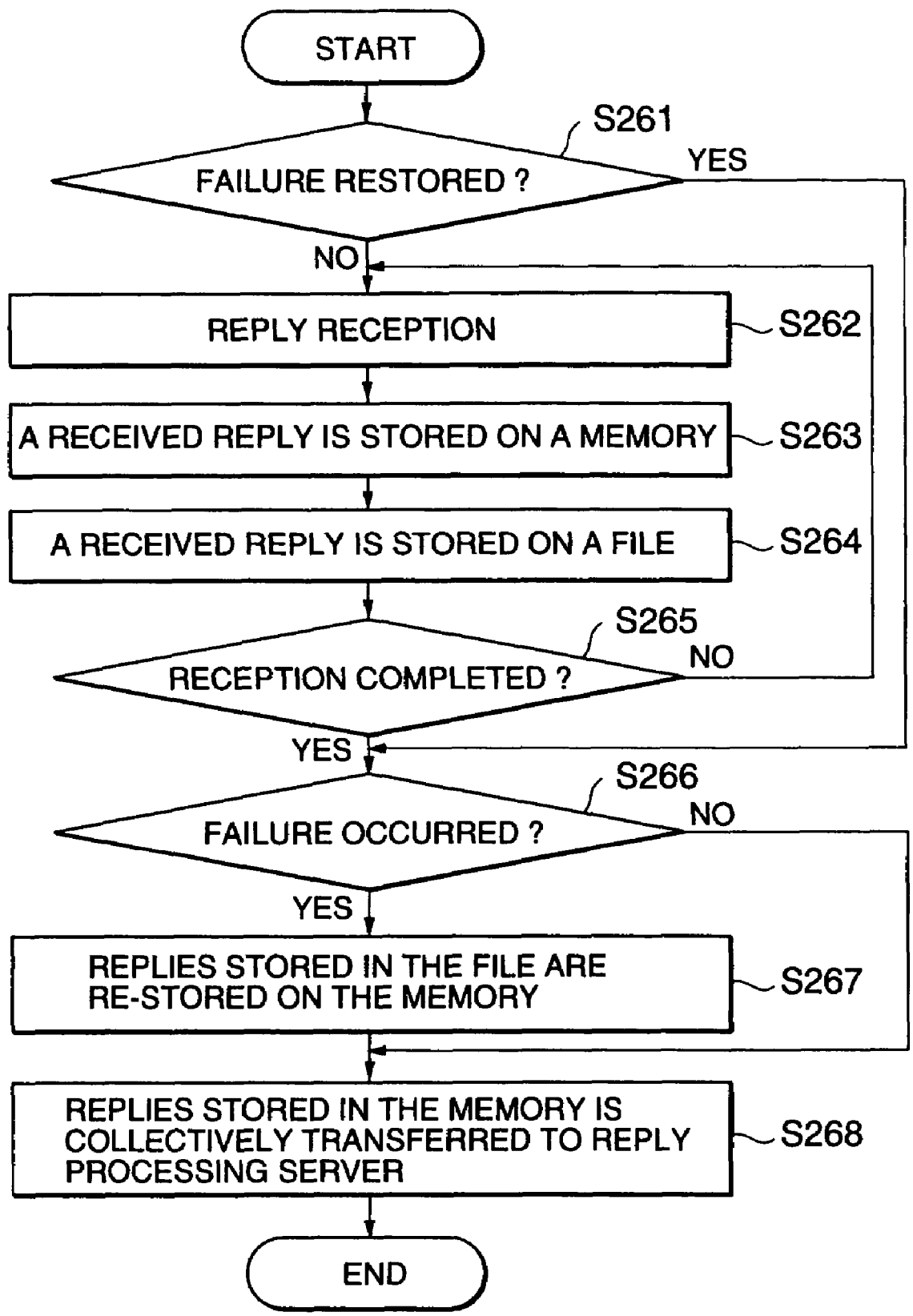
FIG. 26 is a flow chart showing an example of a processing operation of the reply collection server which is designed to cope with a memory failure.

Referring to FIG. 26, the reply collecting server determines whether it was started for the usual purpose, or it was started for the purpose of failure restoration at the time of starting (step S261).

When started for the usual purpose (NO of step S261), the following processing is performed each time a reply is received from an audience terminal. The questionnaire collection service section 21 receives a reply from an audience terminal (step S262). The reply collection middleware section 23 stores this received reply into a memory (not shown) and at the same time stores into a file made of a non-volatile memory (steps S263 and S264). If the memory becomes full or insufficient, the stored data is written out to a separate file or the like in units of a predetermined size so as to save the memory. The steps S262-S264 are repeatedly performed until the preset reception time has been expired or a reception termination instruction has been received. When the reception is completed (YES in step S265), it is determined whether a failure occurs (step S266).

On the other hand, when started for the purpose of failure restoration (YES in step S261), the above-mentioned collection processing (steps S262 to S265) is skipped, and the step S266 is processed.

In the step S266, it is determined whether a memory failure resulting in erasure of stored data occurs during reply collection. When it is determined that such a failure occurred (YES in step S266), the reply data stored in the file at the step S264 is re-stored in the memory (step S267). In addition, when started for the purpose of failure restoration, the judgment result of Step S266 shows YES.

After the step S267, the data transmission middleware section 24 transmits collectively the reply data stored in the memory to the reply processing server 3 (step S268). Also, when no failure occurs in the step S266, the step S268 is performed with skipping the step S267. If all reply data cannot be transmitted at once, data may be divided by a transmittable size to enable the transmission of data in units of divided data. Also, when the stored data is written out to a separate file or the like to same the memory, the written data may be transferred back to the memory before transmitted to the reply processing server 3.

Hereinafter, assuming that the reply collecting servers and the reply processing server 3 are configured as shown in FIG. 2 and FIG. 4, respectively, operations thereof will be described.

Figure 27:
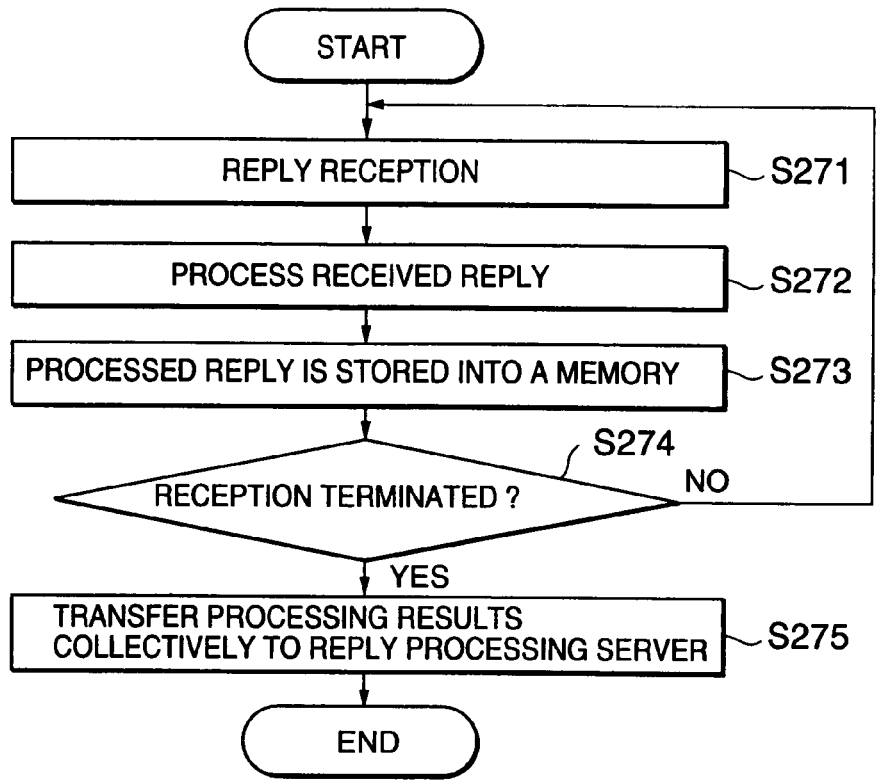
FIG. 27 is a flow chart showing an example of a processing operation of the reply processing server as shown in FIG. 2.

Referring to FIG. 27, in the reply collecting server, the questionnaire collection service section 21 receives a reply from an audience terminal (step S271), and the processing middleware section 22 processes the received reply using a predetermined processing method and stores the processed reply onto a memory (not shown) (steps S272 and S273). If the memory becomes full or insufficient, the stored data is written out to a separate file or the like in units of a predetermined size so as to save the memory.

The steps S271 to S273 are repeatedly performed until the preset reception time has been expired or a reception termination instruction has been received. When the reception is completed (YES in step S274), the data transmission middleware section 24 transmits collectively all the processed data stored in the memory to the reply processing server 3 (step S275). If all processed data cannot be transmitted at once, data may be divided by a transmittable size to enable the transmission of data in units of divided data. Also, when the stored data is written out to a separate file or the like to same the memory, the written data may be transferred back to the memory before transmitted to the reply processing server 3.

Figure 28:
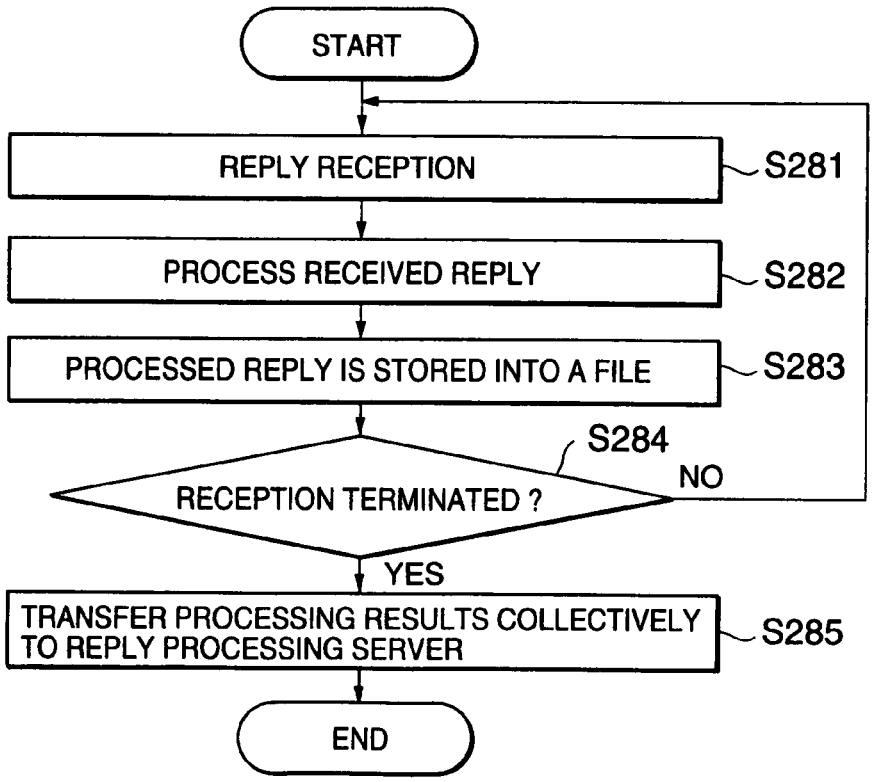
FIG. 28 is a flow chart showing another example of the processing operation of the reply processing server as shown in FIG. 2.

As shown in FIG. 28, the processed data may be stored in a file made of a non-volatility recording medium (not shown) in place of the memory of FIG. 23. In FIG. 28, the other steps S281, S282, S284 and S285 correspond to the steps S271, S272, S274, S275 of FIG. 27, respectively.

Figure 29:
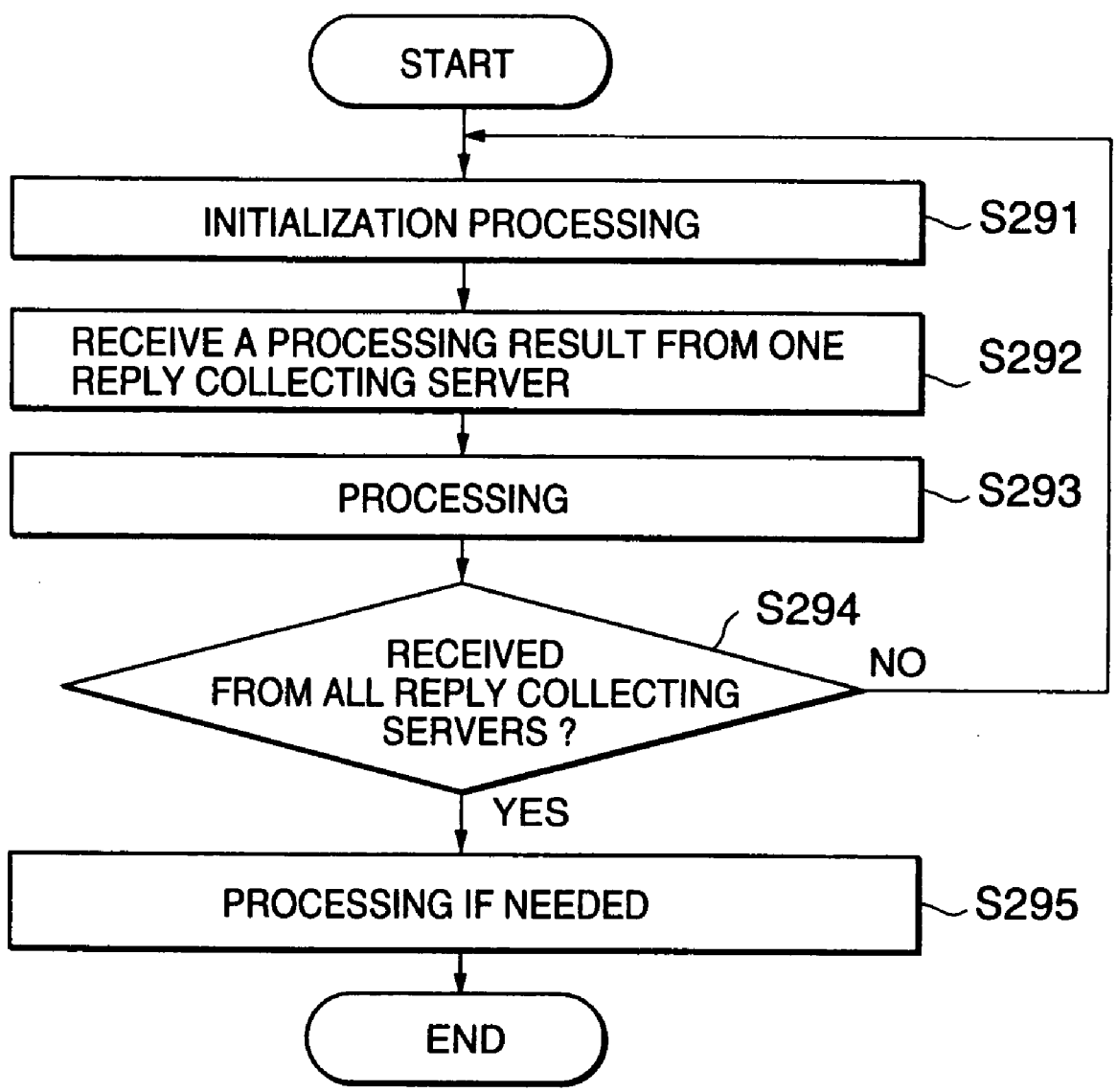
FIG. 29 is a flow chart showing an example of a processing operation of the reply processing server as shown in FIG. 4.

Referring to FIG. 29, initialization is performed depending on a predetermined processing method (step S291). Thereafter, each time the data receiving middleware section 31 receives processed data from the reply collecting servers 2-1 to 2-N, the processing service section 32 further processes the processed data (steps S292 and S293). In the step S292, the data receiving middleware section 31 temporarily stores the processed data in a memory or a file made of a relatively high-speed recording medium (not shown) or all processed data are stored as a series of binary data in the reply DB 34. In the step S293, the processing service section 32 can store, as necessary, the result data processed thereby into a memory, a file or the reply DB 34. In this manner, when the processed data have been received from all the reply collecting servers 2-1 to 2-N (YES in step S294), the processing service section 32 further processes the processed data obtained at the step S293 as necessary (step S295).

In the case where the data receiving middleware section 31 and the processing service section 32 are allowed to operate in parallel, the processed data collecting operation of the data receiving middleware section 31 is in some cases performed in parallel with the data processing operation of the processing service section 32.

Next, an example of the operation performed by a reply collecting server that is configured as shown in FIG. 2 will be described referring to FIG. 30. This example can effectively deal with occurrence of a memory failure in the reply collecting server.

Figure 30:
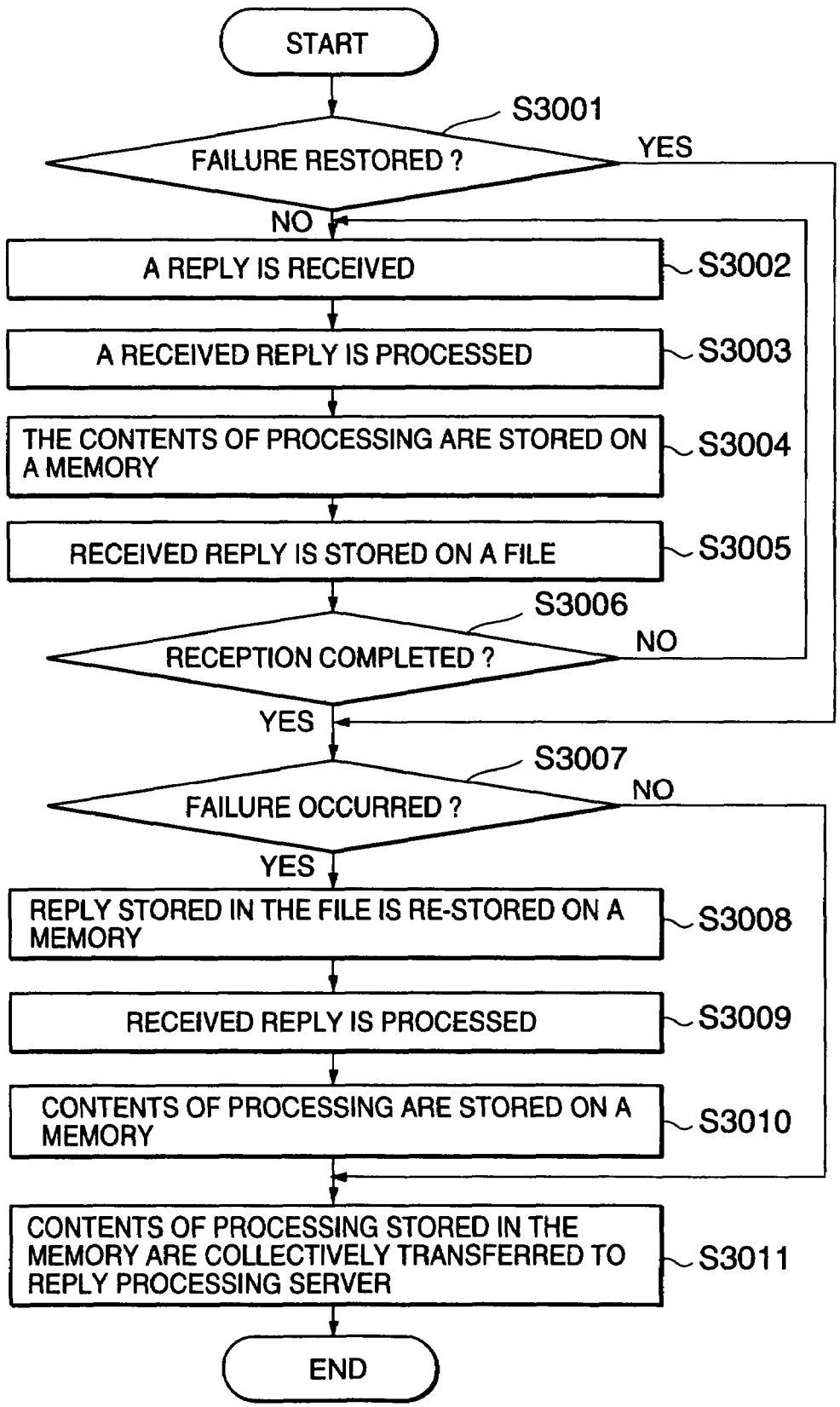
FIG. 30 is a flow chart showing another example of a processing operation of the reply collection server which is designed to cope with a memory failure.

Referring to FIG. 30, the reply collecting server determines whether it was started for the usual purpose, or it was started for the purpose of failure restoration at the time of starting (step S3001).

When started for the usual purpose (NO of step S3001), the following processing is performed each time a reply is received from an audience terminal. The questionnaire collection service section 21 receives a reply from an audience terminal (step S3001). The reply processing middleware section 22 processes the reply according to a predetermined processing method and stores its result into a memory while storing the reply data into a file made of a non-volatile memory (steps S3003-S3005). The steps S3002-S3005 are repeatedly performed until the preset reception time has been expired or a reception termination instruction has been received. When the reception is completed (YES in step S3006), it is determined whether a failure occurs (step S3007).

On the other hand, when started for the purpose of failure restoration (YES in step S3001), the above-mentioned collection processing (steps S3002 to S3006) is skipped, and the step S3007 is processed.

In the step S3007, it is determined whether a memory failure resulting in erasure of stored data occurs during reply collection and processing (steps S3002-S3006). When it is determined that such a failure occurred (YES in step S3007), the reply data already stored in the file at the step S3005 is re-stored in the memory (step S3008) and then is processed according to the predetermined processing method to be stored into the memory (steps S3008-S3010). The re-storing of reply data and the processing thereof may be performed by one operation. Alternatively, each reply may be re-stored into the memory and re-processed. When started for the purpose of failure restoration, the judgment result of Step S3007 shows YES.

After the step S3010, the data transmission middleware section 24 transmits collectively the processed data stored in the memory to the reply processing server 3 (step S3011). Also, when no failure occurs in the step S3007, the step S3011 is performed with skipping the steps S3008-S3010. If all processed data cannot be transmitted at once, data may be divided by a transmittable size to enable the transmission of data in units of divided data.

The operations of a reply collecting server and the reply processing server 3 will be described using more detailed examples.

EXAMPLE (1)

In a first example, each respondent is prompted to make a choice between A and B and a server side performs total summation to produce the number of respondents for each choice. Details will be described hereafter.

Figure 31:
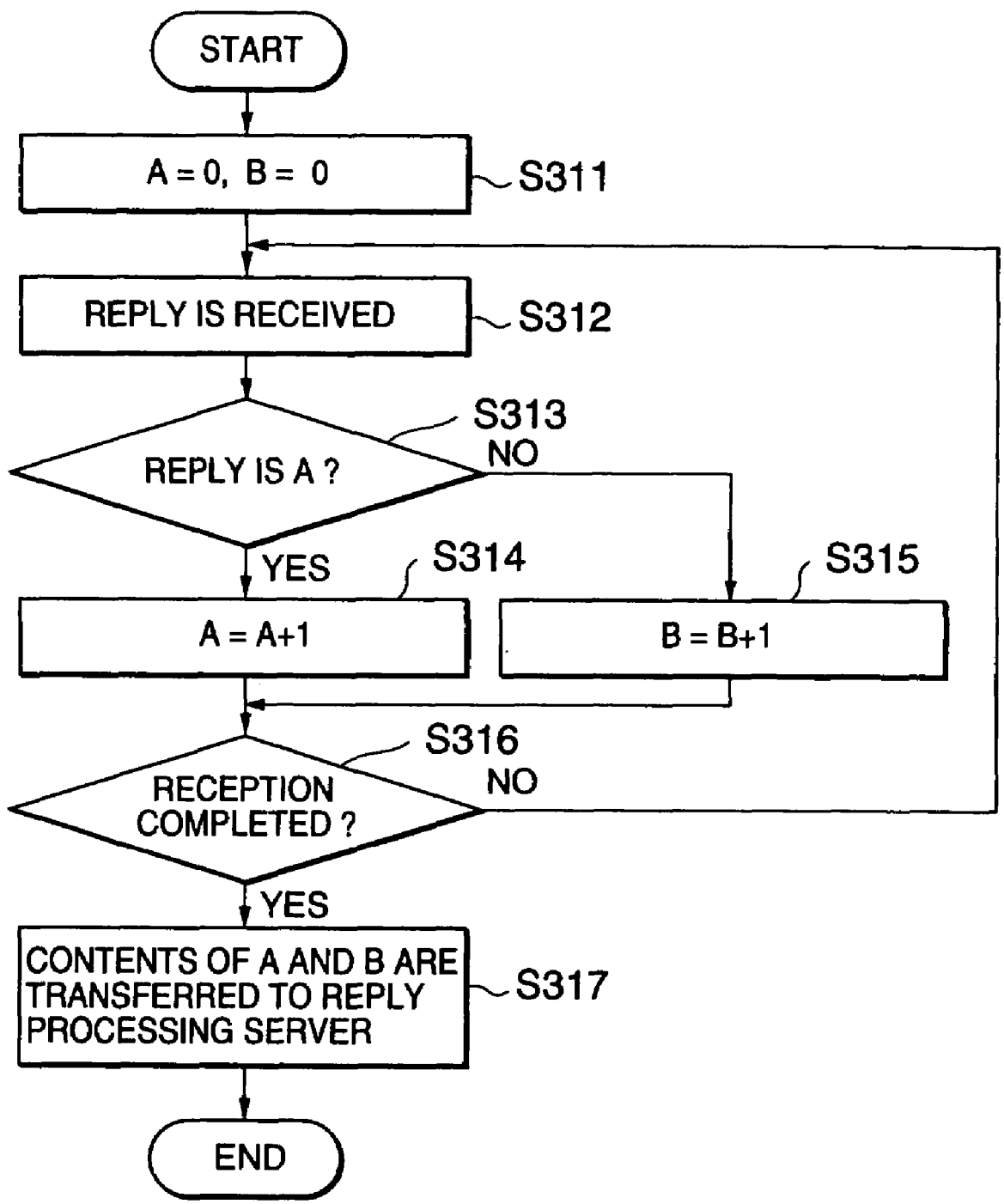
FIG. 31 is a flow chart showing an example of a processing operation of the reply collection server when the number of selections is summed for every choice.

Referring to FIG. 31, in a reply collecting server, variables A and B to be memorized in a memory are initialized to 0 on or before the receiving start time (step S311). When the reception starts, the questionnaire collection service section 21 receives replies (step S312). The reply processing middleware section 22 analyzes the reply choice of a received reply. If A is chosen, the variable A is incremented by one, and if B is chosen, the variable B is incremented by one (steps S313 to S315). The steps S312 to S315 are repeated until the reception is terminated. After the reception is terminated, the data transmitting middleware section 24 transmits the contents of the variables A and B to the reply processing server (step S317).

Figure 32:
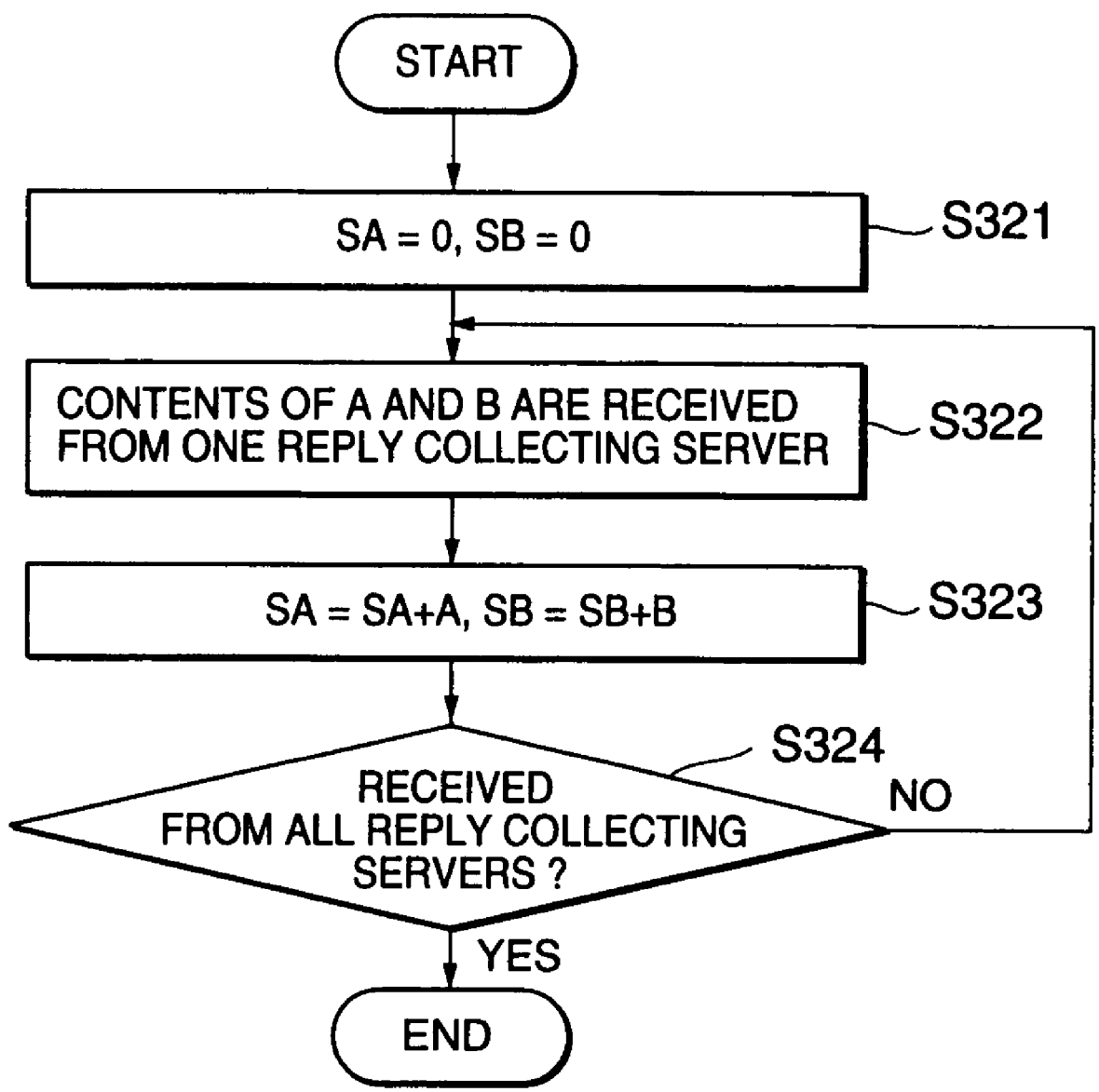
FIG. 32 is a flow chart showing an example of a processing operation of the reply processing server when the number of replies is summed for every choice.

Referring to FIG. 32, in the reply processing server 3, variables SA and SB are initialized to 0 on startup or before collecting the variables A and B from each reply collecting server (step S321). When collection is started, the variable A received from each of the reply collecting servers 2-1 to 2-N is added to the variable SA, and the variable B is added to the variable SB (steps S322 and S323). The steps S322 and S323 are repeated until the variables A and B have been received from all the reply collecting servers 2-1 to 2-N. The variable SA represents the number of respondents who gave the answer A from the answer choices, and the variable SB represents the number of respondents who gave the answer B from the answer choices.

EXAMPLE (2)

In a second example, each respondent is prompted to enter the age thereof and a server side performs total summation to produce the number of respondents for each of the under-20 age bracket A0, the 20-60 age bracket A20, and the over-60 age bracket A60. Details will be described hereafter.

Figure 33:
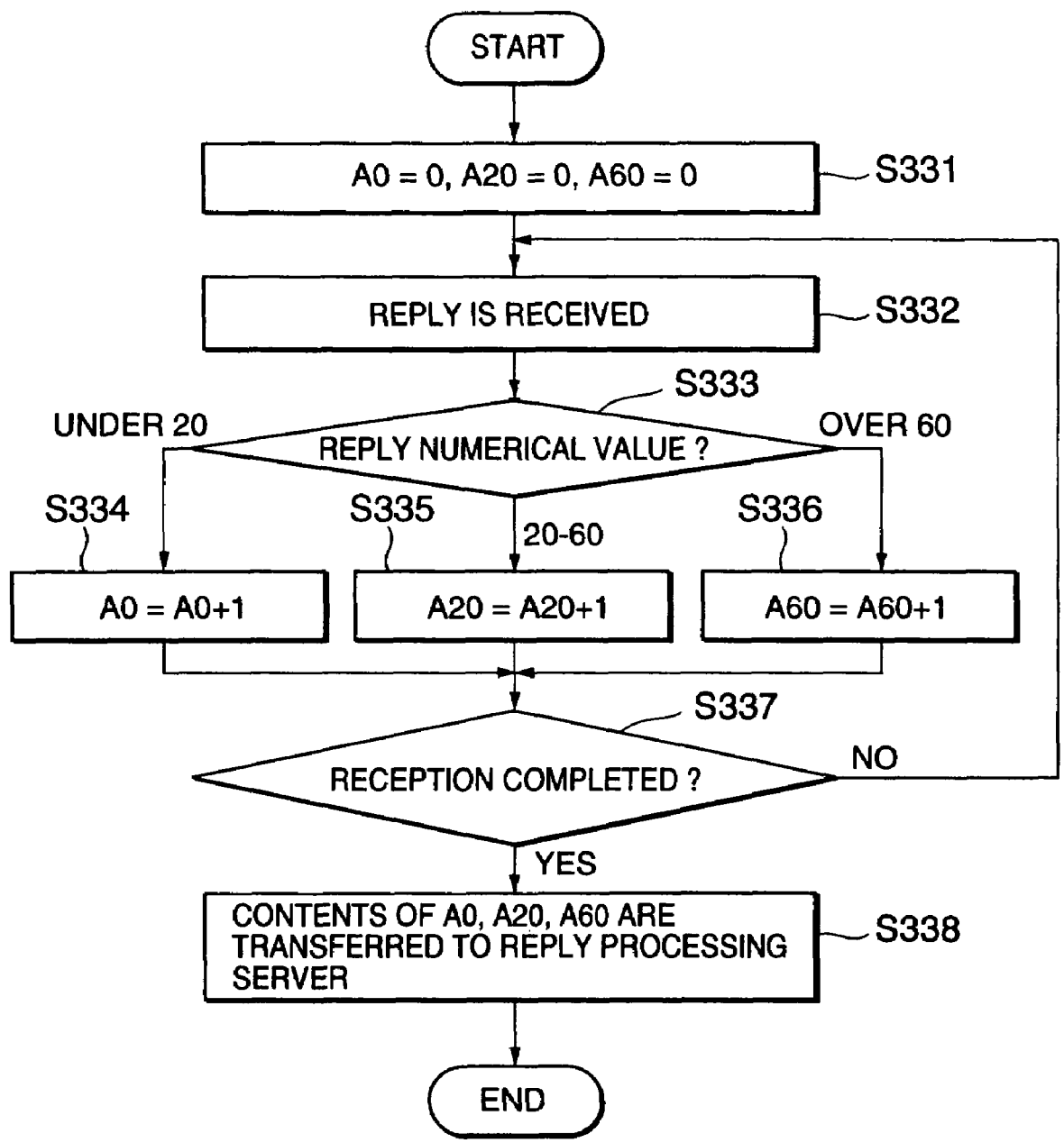
FIG. 33 is a flow chart showing an example of a processing operation of the reply collection server when the number of respondents is calculated for each of age groups which the respondents are divided into.

Referring to FIG. 33, in a reply collecting server, variables A0, A20 and A60 to be memorized in a memory are initialized to 0 on or before the receiving start time (step S331). When the reception starts, the questionnaire collection service section 21 receives replies (step S332). The reply processing middleware section 22 analyzes the contents of a received reply. If the age of the respondent is under 20, then the variable A0 is incremented by one, if over 20 but under 60, the variable A20 is incremented by one, and if over 60, the variable A60 is incremented by one (steps S333 to S336). The steps S332 to S336 are repeated until the reception is terminated. After the reception is terminated, the data transmitting middleware section 24 transmits the contents of the variables A0, A20 and A60 to the reply processing server (step S338).

Figure 34:
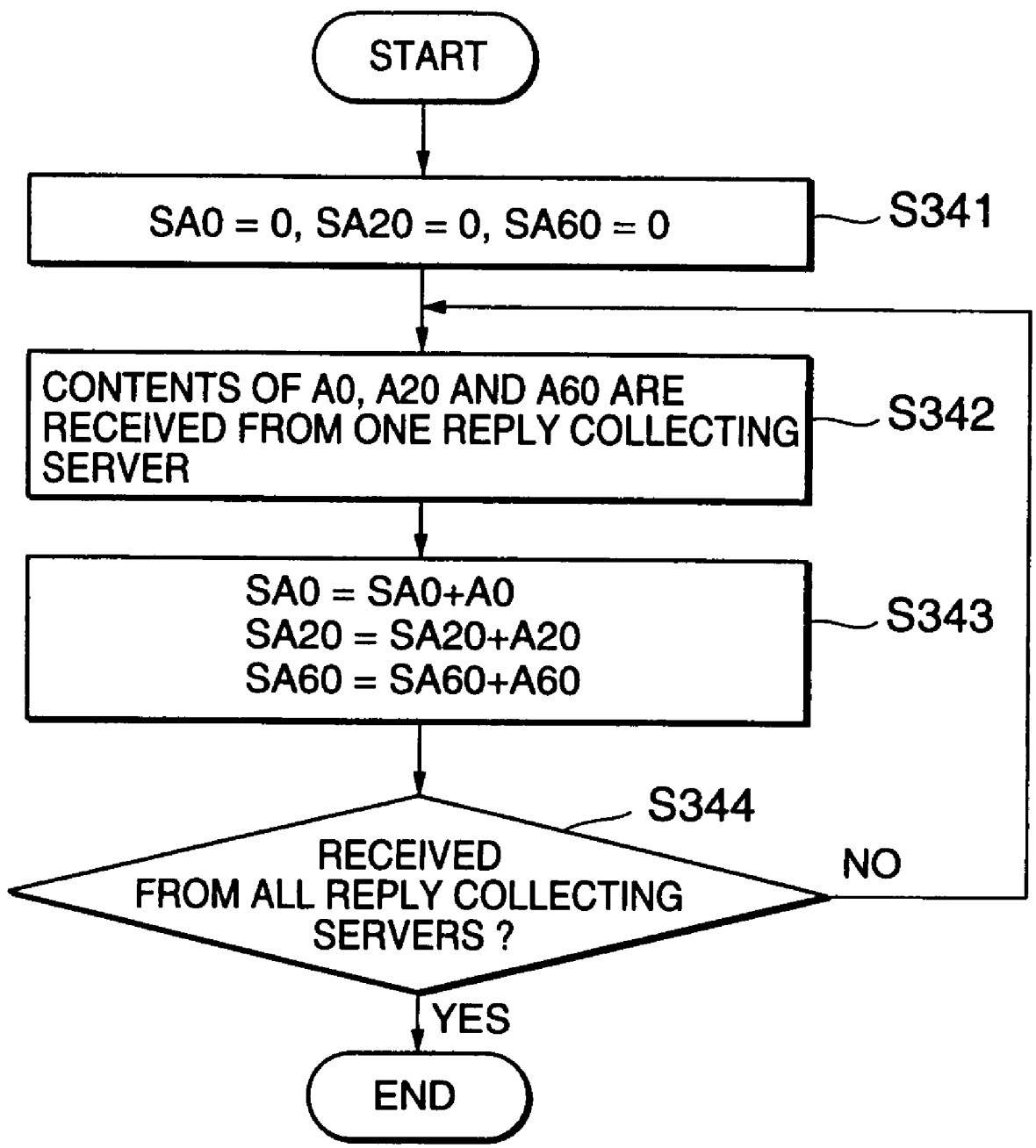
FIG. 34 is a flow chart showing an example of a processing operation of the reply processing server when the number of respondents is calculated for each of age groups which the respondents are divided into.

Referring to FIG. 34, in the reply processing server 3, variables SA0, SA20 and SA60 are initialized to 0 on startup or before collecting the variables A0, A20 and A60 from each reply collecting server (step S341). When collection is started, the data receiving middleware section 31 collects the variables A0, A20 and A60 from each of the reply collecting servers 2-1 to 2-N (step S342) and, in parallel with the collection operation, the processing service section 32 adds the variable to the variable SAO, the variable A20 to the variable SA20, and the variable A60 to the variable SA60 (step S343). The steps S342 and S343 are repeated until the variables A0, A20 and A60 have been received from all the reply collecting servers 2-1 to 2-N. The variable SAO represents the number of respondents who are under 20 years old, and the variable SA20 represents the number of respondents who are not under 20 but under 60 years old, and the variable SA60 represents the number of respondents who are over 60 years old. These resultant values are output through the report service section 35.

EXAMPLE (3)

In a third example, among respondents, the top-ten arrivals who earlier sent replies to the server side are extracted as winners. Here, it is assumed that a reply includes a user identifying field such as a user's name, address and the like.

Figure 35:
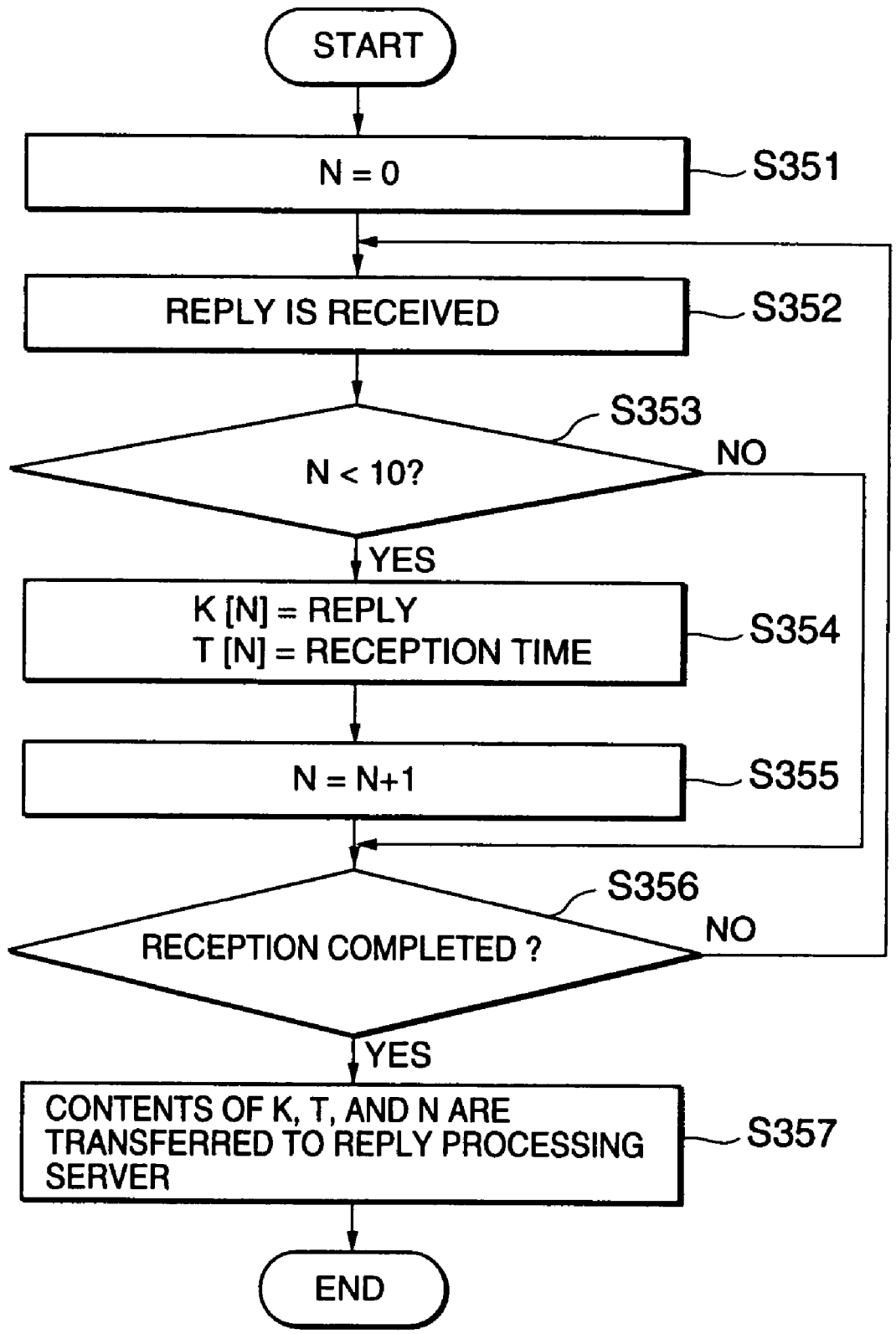
FIG. 35 is a flow chart showing an example of a processing operation of the reply collection server when ten first arrivals are chosen from respondents.

Referring to FIG. 35, in the reply collecting server, variable N is initialized to 0 on or before the receiving start time (step S351). When the reception starts, the questionnaire collection service section 21 receives replies (step S352). The reply processing middleware section 22 analyzes received replies and determines whether N is smaller than 10 (step S353). If N is smaller than 10 (YES in step s353), the received reply is stored in an array variable K[N] and the reception time thereof is stored in an array variable T[N] (step S354) and then the variable N is incremented (step S355). The steps S352-S355 are repeatedly performed until the reception is terminated. When the reception has been terminated (YES in step S356), the data transmitting middleware section 24 transmits the array variables K[0]-K[N−1], T[0]-T[N−1] and the variable N to the reply processing server 3 (step S357).

Figure 36:
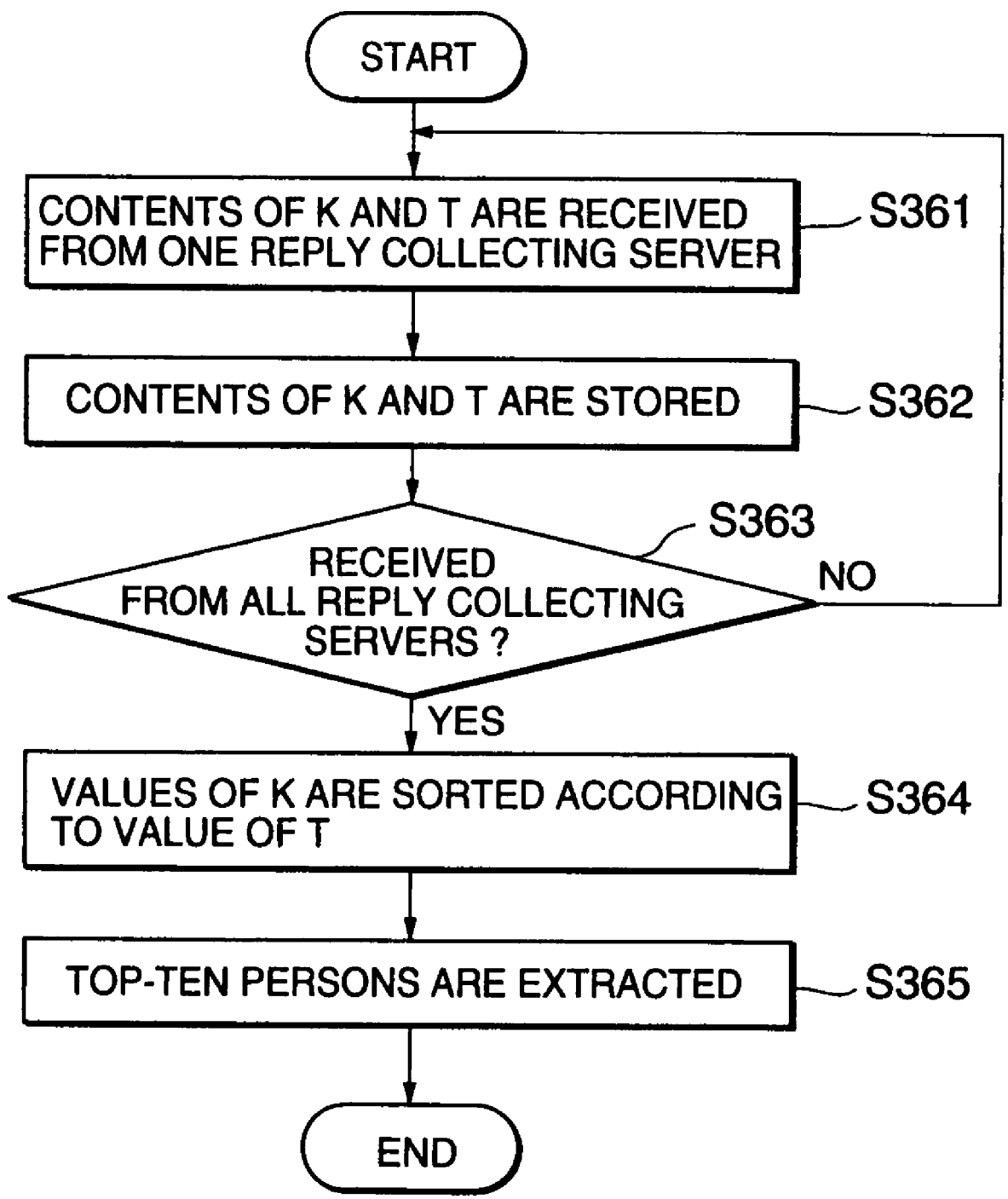
FIG. 36 is a flow chart showing an example of a processing operation of the reply processing server when ten first arrivals are chosen from the respondents.

Referring to FIG. 36, the data receiving middleware section 31 collects the variables K, T and N from each of the reply collecting servers 2-1 to 2-N (step S361). The array variables K and T are consecutively stored as a record onto a sufficiently large array (step S362). The steps S361 and S362 are repeated until the variables have been received from all the reply collecting servers 2-1 to 2-N.

The reply processing service section 32 sorts the stored array according to the value of T (reception time) to produce a sorted list of the array variable K (step S364). Then, the top-ten arrays K of the sorted list, that is, ten replies received earlier, are outputted through the report service section 35 (step S365). In this manner, a winner announcement is made.

EXAMPLE (4)

In a fourth example, an auction system is implemented, where a reply including the highest nominal price is determined out of received replies each including a price input field.

Figure 37:
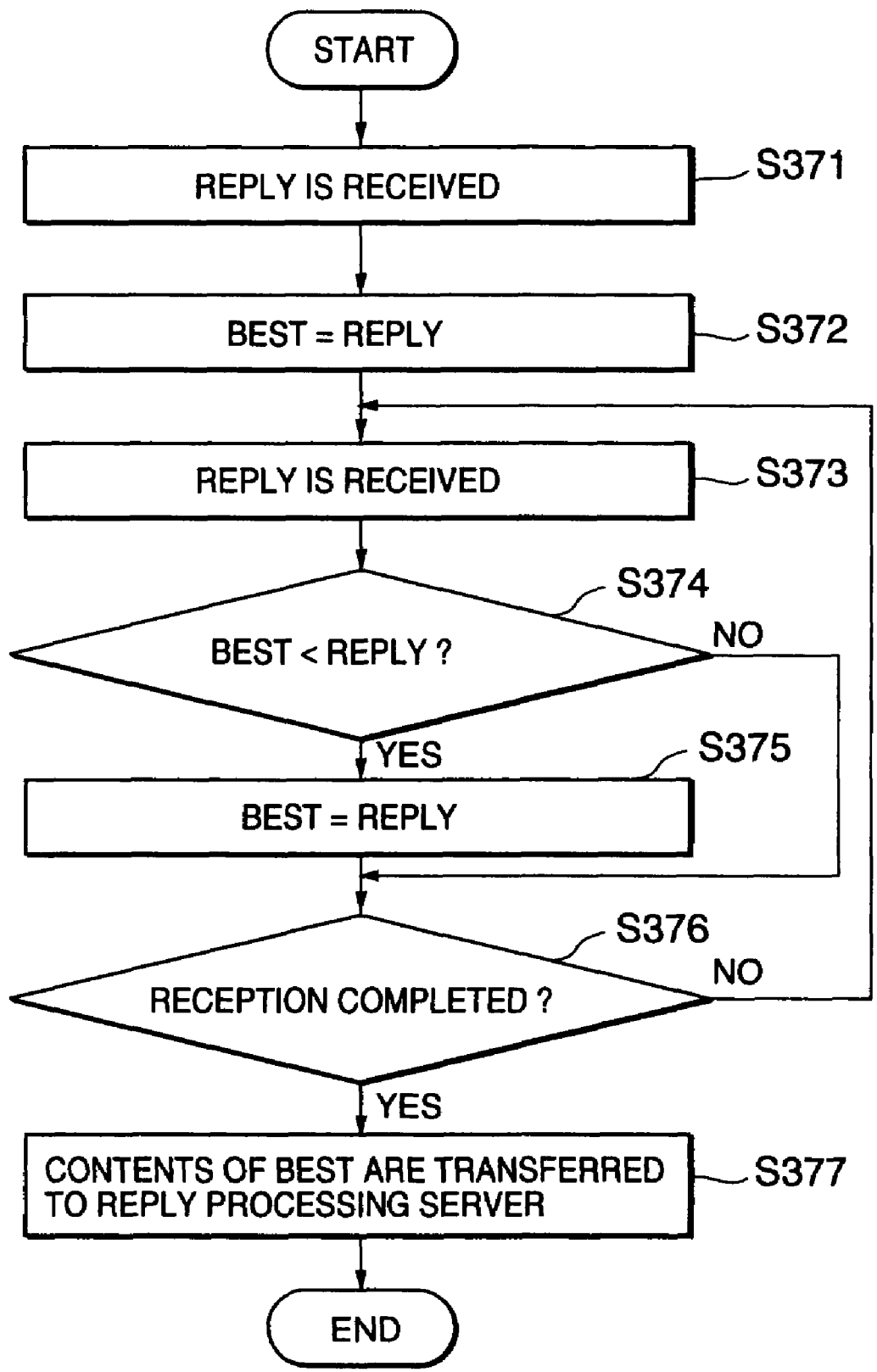
FIG. 37 is a flow chart showing an example of a processing operation of the reply collection server when an auction is performed.

Referring to FIG. 37, in the reply collecting server, the first reply received at the questionnaire collection service section 21 after the reception starts, and the price of the first reply is stored as an initial value invariable BEST (steps S371 and S372). Here, the variable BEST is stored in a memory. Thereafter, the questionnaire collection service section 21 receives a reply (step S373) and the processing middleware section 22 compares the received reply to the variable BEST (step S374). If the BEST is lower than the receive reply (YES in step S374), then the received reply is overwritten onto the variable BEST (step S375). If the BEST is not lower than the receive reply (NO in step S374), then the BEST is not changed. The steps S373 to S375 are repeatedly performed until the reception has been terminated. When the reception has been terminated (YES in step S376), the data transmission middleware section 24 transmits the contents of the variable BEST to the reply processing server 3 (step S377).

Figure 38:
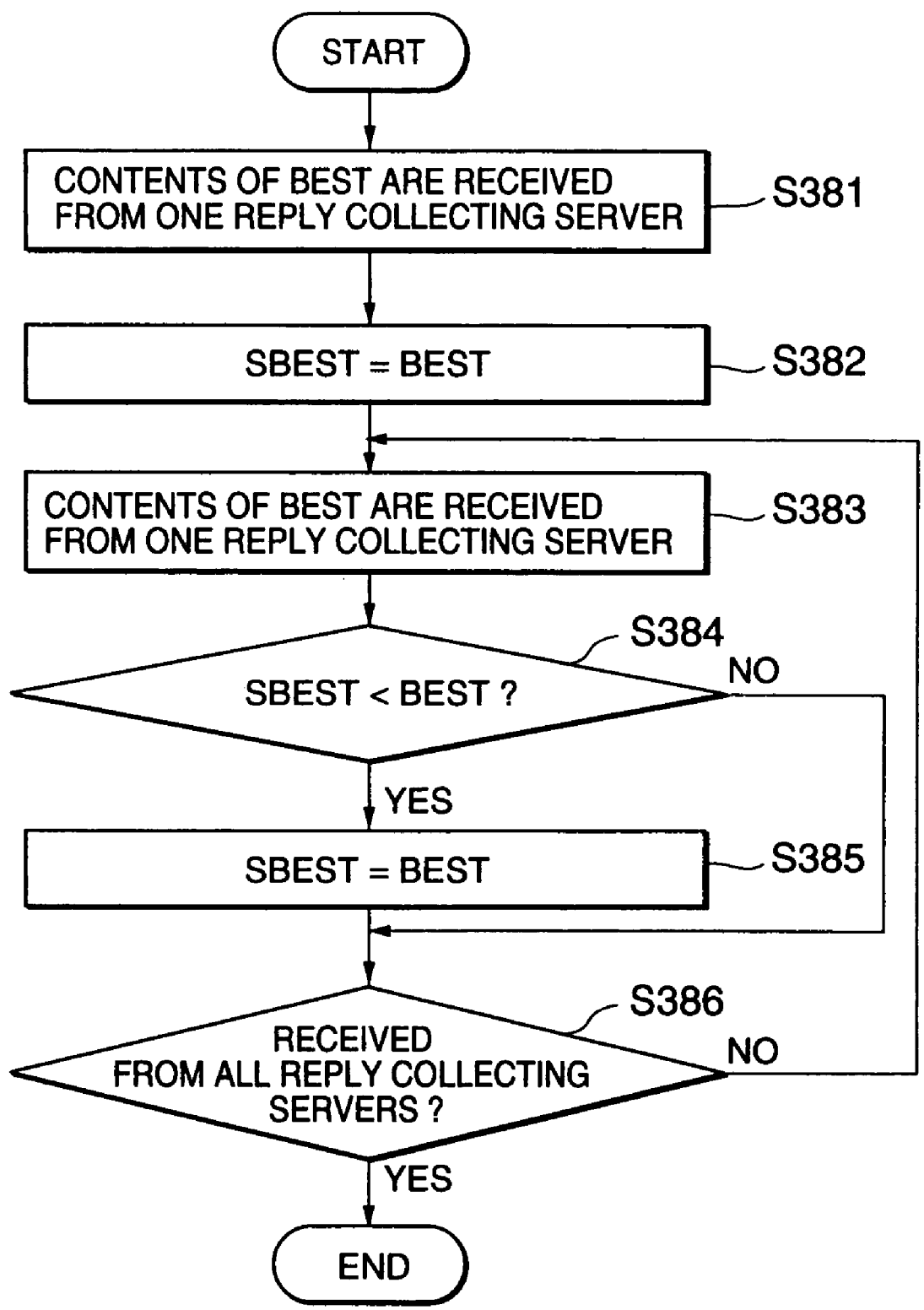
FIG. 38 is a flow chart showing an example of a processing operation of the reply processing server when an auction is performed.

Referring to FIG. 38, in a reply processing server, the price of the variable BEST first collected by the data receiving middleware section 31 is stored into a variable SBEST (steps S381 and S382). Here, SBEST is stored in a memory. The data receiving middleware section 31 receives the variable BEST from each of the reply collecting servers 2-1 to 2-N (step S383). The processing service section 32 compares the BEST with the SBEST (step S384). If SBEST is lower than BEST (YES in step S384), then the BEST is set to the SBEST (sep S385). If SBEST is not lower than BEST (NO in step S384), the SBEST is not changed. The steps S383-S385 are repeatedly performed until the collection from all reply collecting servers has been completed.

Accordingly, the variable SBEST at the time of collection being completed indicates the highest nominal price in this auction.

EXAMPLE (5)

In a fifth example, ten replies are chosen from all respondents by lot. Lots shall be cast regardless of the contents of reply data.

Figure 39:
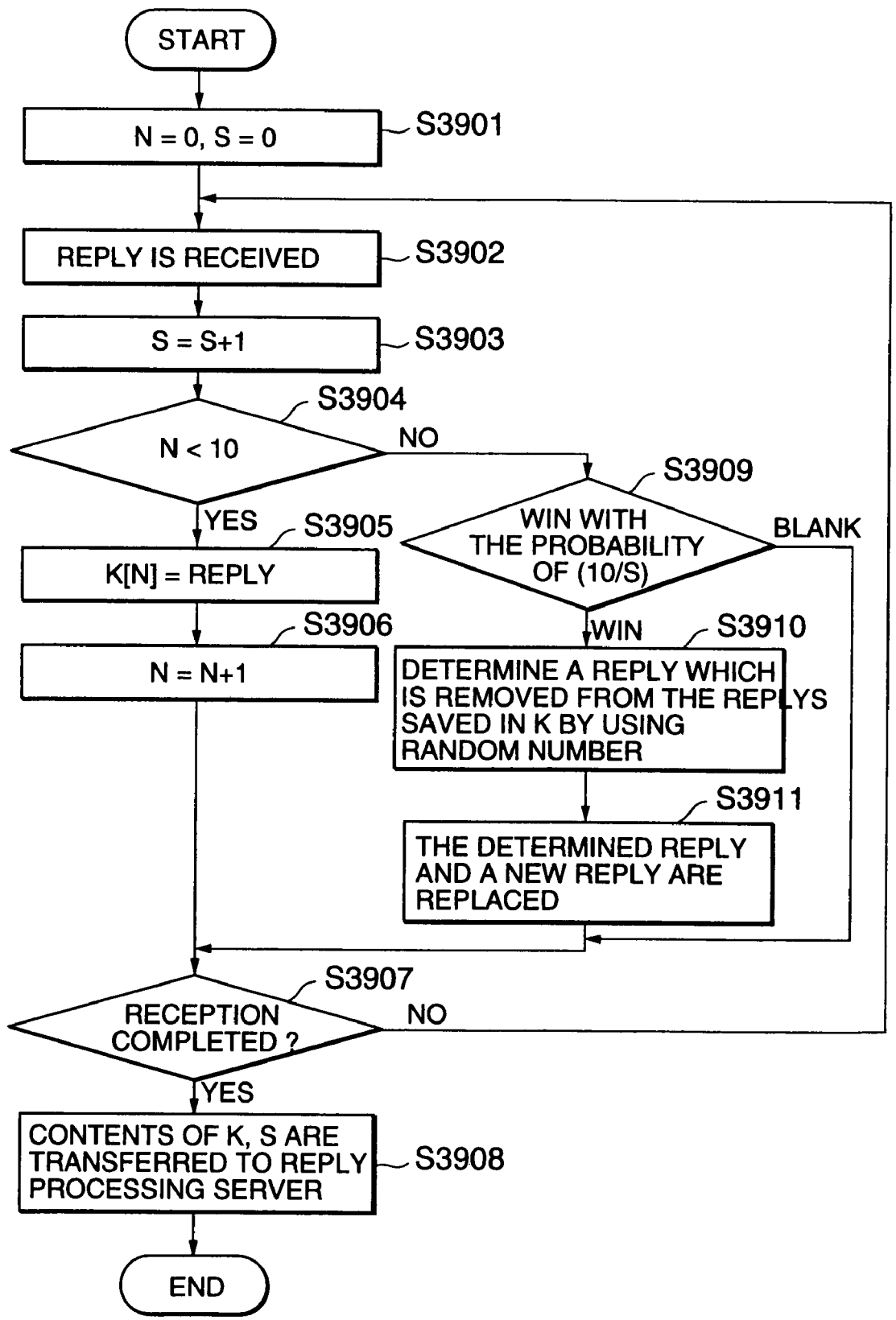
FIG. 39 is a flow chart showing an example of a processing operation of the reply collecting server when drawing lots.

Referring to FIG. 39, in the reply collecting server, variables N and S are initialized to 0 on or before the receiving start time (step S3901). When the reception starts, the questionnaire collection service section 21 receives replies (step S3902) and the variable S is incremented by one (step S3903). The reply processing middleware section 22 analyzes received replies and determines whether N is smaller than 10 (step S3904). If N is smaller than 10 (YES in step S3904) the received reply is additionally stored in an array variable K[N] (step S3905) and the variable N is incremented by one (step S3906).

If N is not smaller than 10 (NO in step S3904), then rely replacement is performed with the probability of 10/S (step S3909). More specifically, when it won, one of the replies stored in the array variable K is randomly determined to be replaced using a random number (step S3910) and the determined reply in the array variable K is replaced with the received reply (step S3911).

The steps S3902-S3911 are repeatedly performed until the reception is terminated. When the reception has been terminated (YES in step S3907), the data transmitting middleware section 24 transmits the array variable K and the variable S to the reply processing server 3 (step S3908).

Figure 40:
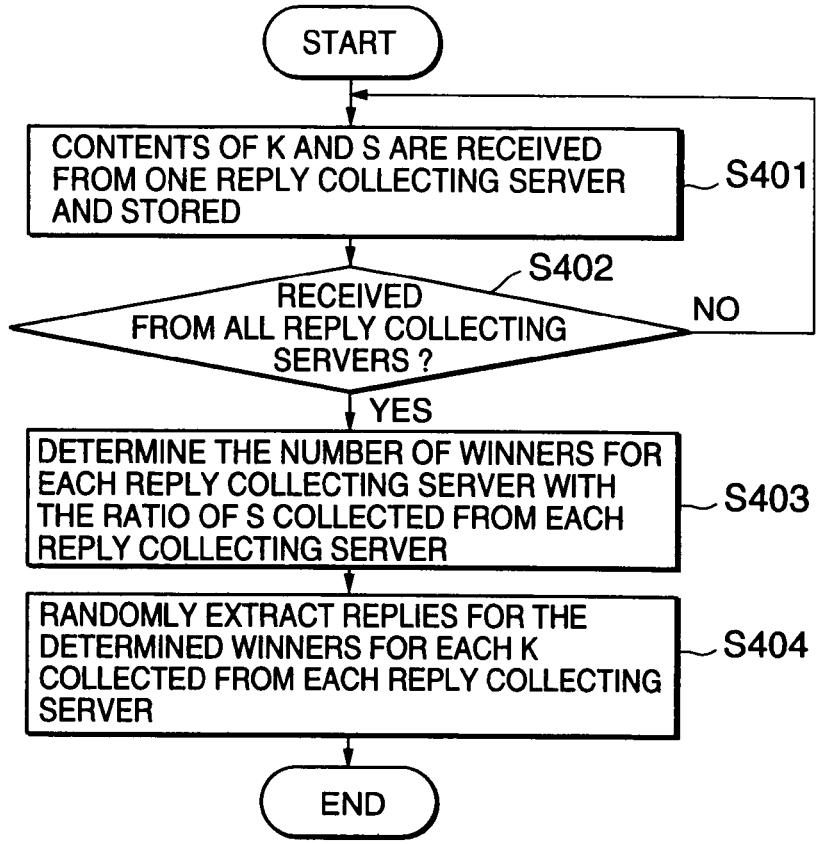
FIG. 40 is a flow chart showing an example of a processing operation of the reply processing server when drawing lots.

Referring to FIG. 40, the data receiving middleware section 31 receives the array variable K and the variable S from each of the reply collecting servers 2-1 to 2-N and then stores them onto the memory (step S401). When having received them from all the reply collecting servers 2-1 to 2-N (YES in step S402), the reply processing service section 32 determines the number of winners for each replay collecting server, which is calculated by dividing (10×S received from each replay collecting server) by the sum of variables S from all the reply collecting servers 2-1 to 2-N. Then, the reply processing service section 32 randomly determines winner replies by the determined number of winners from all received replies of the reply collecting servers 2-1 to 2-N. Ten respondents determined in above way become the final winners (or finally winning replies). If the number of winners for each replay collecting server is not an integer, it should be adjusted into integer number by dropping the fractional portion thereof or rounding off it to the nearest integer.

Step S67: Report Service

Returning to FIG. 6, in step S67, the report service section 35 is operating on the WEB server 36, for example, to receive a report output request of a user using the communication function of a WEB browser or an external computer. As for the questionnaire items already processed by the reply processing service section 32, the report service section 35 receives data from the reply processing service section 32, and converts its format into HTML as shown in FIG. 23 or XML as shown in FIG. 24 to output it in the converted form. On the other hand, as for the questionnaire items of the replies which are just stored in the collection database 34, format conversion of all or some of data into HTML or XML is carried out, and outputted. Alternatively, the replies stored in the reply database 34 are processed according to a processing method instructed by a person in charge using the reply processing service section 32 and then are outputted in the HTML or XML format.

In the first embodiment and examples as described above, the case where the simultaneous multiple-access processing server for interactive program is constructed is described. However, the first embodiment can be applied to the case where a simultaneous multiple-access processing server for WEB shopping, and the like, is constructed.

Second Embodiment

Figure 45:
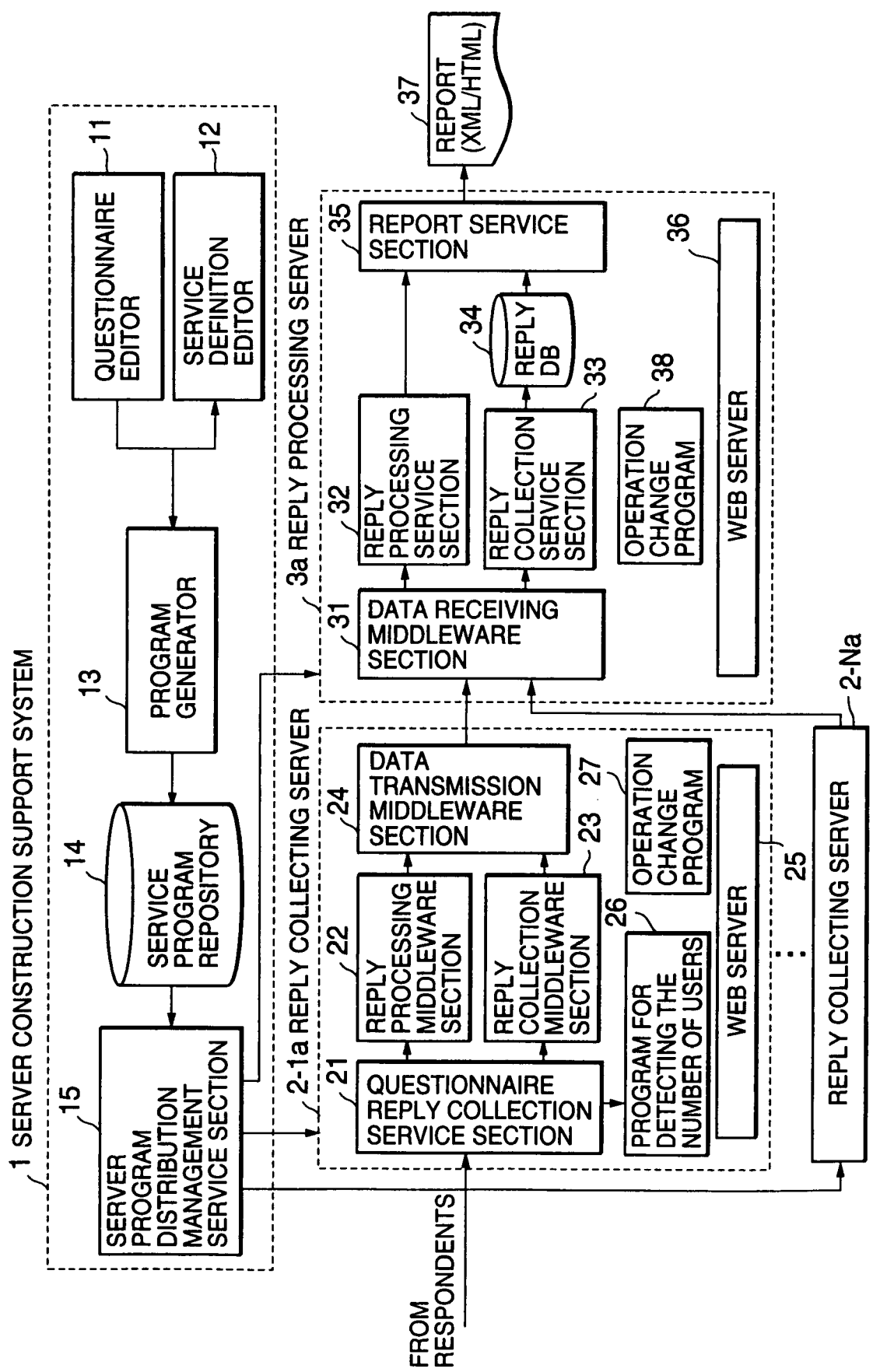
FIG. 45 is a block diagram showing a server system employing a server construction support system according to a second embodiment of the present invention.

Referring to FIG. 45, a server construction support system 1 according to a second embodiment of the present invention supports construction of a plurality of reply collecting servers 2-1a to 2-Na and a reply processing server 3a. Each of the reply collecting servers 2-1a to 2-Na is further provided with a users-number change detecting program 26 and an operation change program 27 which are stored in a memory (not shown). The other blocks 21-25 are the same as those of the first embodiment as shown in FIG. 1. The reply processing server 3a is further provided with an operation change program 38. The other blocks 31-36 are the same as those of the first embodiment as shown in FIG. 1.

The service definition editor 12 calculates the values of constraints for each of presumed cases of numbers of audiences. The program generator 13 generates an operation defining file for each presumed case to distribute them to the reply collecting servers 2-1a to 2-Na and the reply processing server 3a.

In each of the reply collecting servers 2-1a to 2-Na, the users-number change detecting program 26 is operating to perform total summation of the number of user replies in processing at intervals of a unit time (e.g. 1 minutes). The operation change programs 27 and 38 are operating to receive a change in the number of users obtained by the users-number change detecting program 26 to compare it with a predetermined number of users, and thereby change an operation status of the server itself to an operation status suitable for the detected number of users.

For example, the service definition editor 12 previously calculates the values of constraints in the following cases:
(1) the number of user replies per unit time (e.g. 1 minute) is less than 10,000;
(2) the number of user replies per unit time is not less than 10,000 and less than 50,000; and
(3) the number of user replies per unit time is not less than 50,000.

The program generator 13 generates operation defining files for each of the above cases and distributes them to the reply collecting servers 2-1a to 2-Na and the reply processing server 3a.

The respective reply collecting servers 2-1a to 2-Na and reply processing (summation) server 3 can know the number of user replies in the whole system through the users-number change detecting program 26.

Each of the operation change programs 27 and 38 compares the current number of users per unit time detected by the users-number change detecting program 26 with the number of users to be defined by each of the above-mentioned three cases (1), (2) and (3). The operation change program controls the operation of a server program according to an operation defining file determined depending on a current case. More specifically, if the number of user replies is less than 10,000, an operation defining file corresponding to the operation status defined by the case (1) is used. If the number of user replies is not less than 10,000 and less than 50,000, an operation defining file corresponding to the operation state defined by the case (2) is used. If the number of user replies is not less than 50,000, an operation defining file corresponding to the operation state defined by the case (3) is used.

In the second embodiment, an operation defining file for every case is generated. A server program may be generated for every case. Also, in this embodiment, the users-number change detecting program 26 is provided in the reply collecting servers 2-1$a$ to 2-Na. Alternatively, in addition to the reply collecting servers 2-1$a$ to 2-Na, a load balancer (not shown) may be provided separately, which distributes replies and information received from users among the reply collecting servers 2-1$a$-2-Na. The users-number change detecting program 26 can be implemented on the load balancer. Further, the operation change programs 27 and 38 may be implemented outside the reply collecting servers 2-1$a$ to 2-Na, for example, on the server program distribution management service section 15.

According to the second embodiment, not only an operation change in a sever but also a change of a service menu presented to accessing users can be made. The following example may be implemented in a WEB site to provide an accessing user with two patterns of site menu, which is selected depending on the number of accessing users.

The site menu displaying mode is defined depending on the number of accessing users as follows:
1) when there are many accesses per unit time, only easy-to-process services are displayed in the site menu; and
(2) when there are few accesses per unit time, all services are displayed in the site menu.

Since an increase or decrease in the number of users can be detected by the users-number change detecting program 26, the Web server 25 can switch between the above operations (1) and (2) depending on the detected number of users.

Third Embodiment

Figure 46:
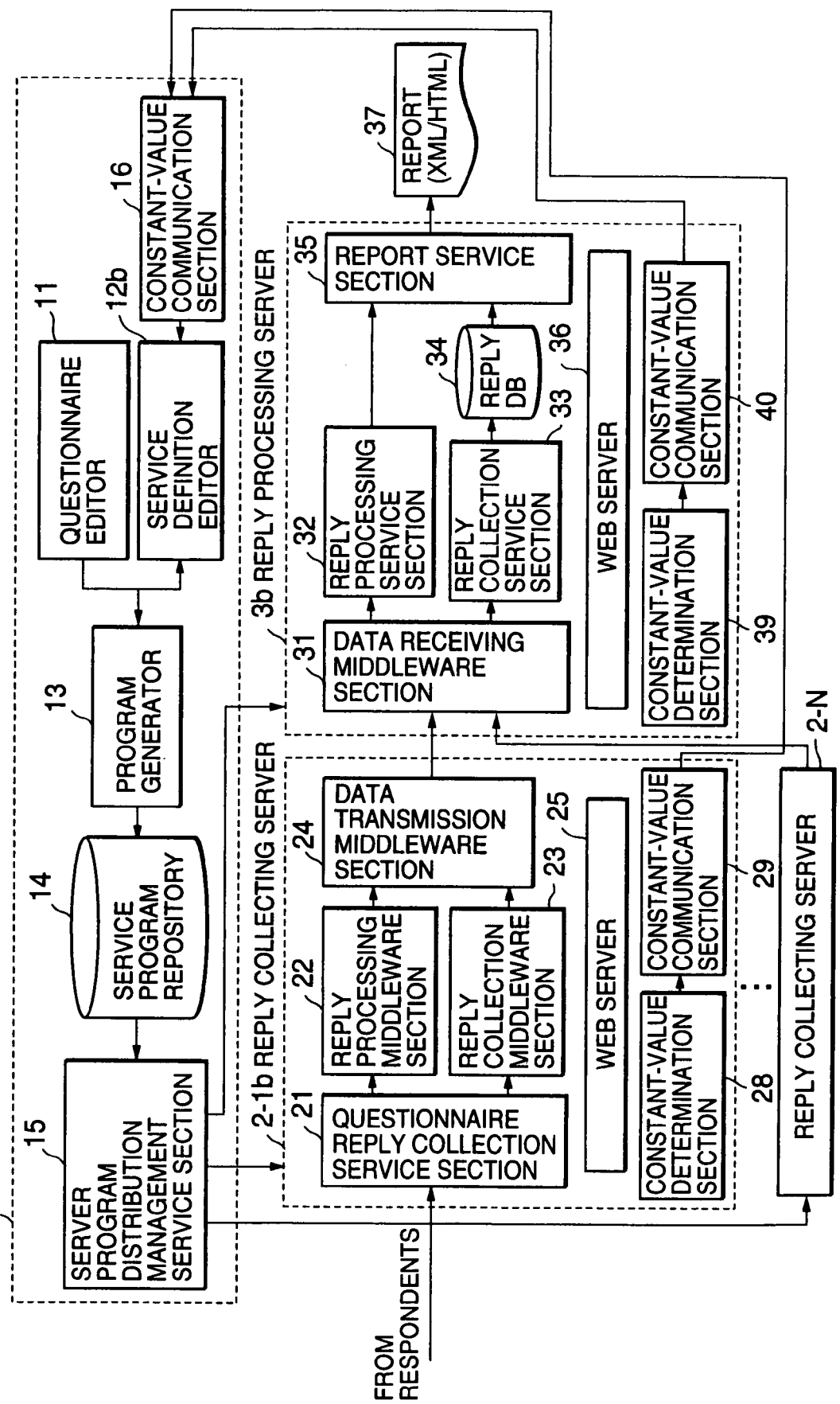
FIG. 46 is a block diagram showing a server system employing a server construction support system according to a third embodiment of the present invention.

Referring to FIG. 46, a server construction support system 1$b$ according to a third embodiment of the present invention supports construction of a plurality of reply collecting servers 2-1$b$, 2-2 to 2-N and a reply processing server 3$b$. The server construction support system 1$b$ is further provided with a service definition editor 12$b$ and a constant-value communication section 16. The other blocks 11, 13-15 are the same as those of the first embodiment as shown in FIG. 1. The reply processing server 3$b$ is further provided with a constant-value determination section 39 and a constant-value communication section 40.

Only the reply collecting servers 2-1$b$ is further provided with a constant-value determination section 28 and a constant-value communication section 29. The other blocks 21-25 of the reply collecting servers 2-1$b$ and the other reply collecting servers 2-2 to 2-N are the same as those of the first embodiment as shown in FIG. 1. In this embodiment, it is assumed that all the reply collecting servers 2-1$b$, 2-2 to 2-N have the same performance. In the case where each reply collecting server has a difference performance, each of the reply collecting servers 2-1$b$, 2-2 to 2-N may be provided with the constant-value determination section 28 and the constant-value communication section 29.

The constant-value determination section 28 has a function of determining a predetermined constant value directly by measurement, or indirectly by calculation based on measured values. Here, a constant value to be determined is a value which depends on the reply collecting server 2-1$b$ among the constant values used in the expressions held by the service definition editor 12$b$ to determine the values of the constraints. Such expressions are, as described before, predetermined for every combination of a processing method and a constraint with unknown value, these expressions including the expressions (7), (12), (19), (24), (28), (30) and the like. For example, Ta and Ca of the expression (7) are constant values to be determined by the constant-values determination section 28.

The constant-value communications section 29 has a function of transmitting the constant values determined by the constant-value determination section 28 to the server construction support system 1$b$.

The constant-value determination section 39 has a function of determining a predetermined constant value directly by measurement, or indirectly by calculation based on measured values. Here, a constant value to be determined is a value which depends on the reply processing server 3$b$ among the constant values used in the expressions held by the service definition editor 12$b$ to determine the values of the constraints. Such expressions are, as described before, predetermined for every combination of a processing method and a constraint with unknown value, these expressions including the expressions (7), (12), (19), (24), (28), (30) and the like. For example, No, Np, $B_1$ and so on of the expression (12) are constant values to be determined by the constant-value determination section 39.

The constant-value communications section 40 has a function of transmitting the constant values determined by the constant-value determination section 39 to the server construction support system 1$b$.

The constant-value communications section 16 has functions of receiving the constant values from the constant-value communications section 29 and/or the constant-value communications section 40 and transferring them to the service definition editor 12$b$.

The service definition editor 12$b$ has a function of calculating the value of a constraint given no value in the service definition editor screen 91 (see FIG. 9) based on a corresponding expression of the expressions currently held therein and the constant values transferred from the constant-value communications section 16. The other functions is the same as those of the service definition editor 12 as shown in FIG. 1.

An operation of the third embodiment will be described hereafter. Here, only portions of the operation different from the first embodiment will be provided.

Figure 47:
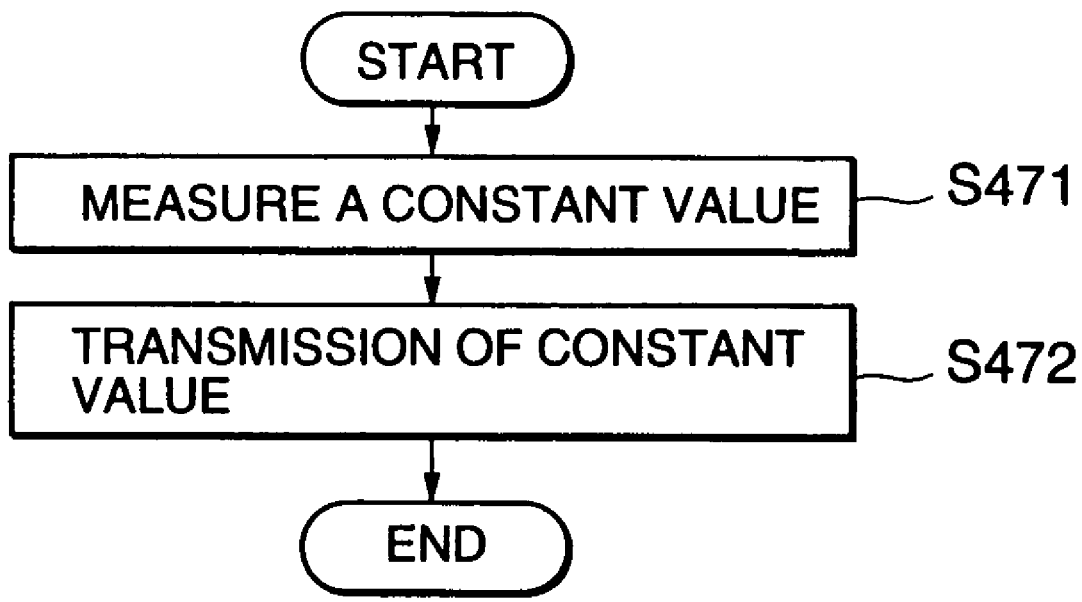
FIG. 47 is a flow chart showing a schematic operation of a constant-value determination section and a constant-value communication section in a reply collection server or a reply processing server in the third embodiment.

Referring to FIG. 47, the constant-value determination section 28 of the reply collecting server 2-1$b$ determines a predetermined constant value according to predetermined timing directly by measurement or indirectly by calculation based on measured values (step S471). The predetermined timing is when setting the reply collecting server 2-1$b$ or when an instruction is received from an administrator due to a change in operation circumstance. Here, a constant value to be determined is a value which depends on the reply collecting server 2-1$b$ among the constant values used in the expressions held by the service definition editor 12$b$ to determine the values of the constraints. For example, the file writing rate on the reply collecting server 2-1$b$ may be used as a constant value to be determined. When a file writing rate is needed to determine another constant value, an actual file writing operation is repeatedly performed a predetermined number of times and an average time thereof may be used as the constant value of file writing rate. Alternatively, a storing time required for storing a predetermined length of characters into a memory on the reply collecting server 2-1$b$ may be used as the constant value. When a character storing time is needed to determine another constant value, an actual character storing operation is repeatedly performed a predetermined number of times and an average time thereof may be used as the constant value of character storing time. If necessary, a record reading rate or writing rate on the database or a processing rate of an algorithm may be also used as a constant value by measurement or calculation.

After the above-described step S471 is completed, the constant-value communications section 29 transmits each constant value determined by the constant-value determination section 28 to the server construction support system 1b (step S472).

Similarly, referring to FIG. 47, the constant-value determination section 39 of the reply processing server 3 determines a predetermined constant value according to predetermined timing directly by measurement or indirectly by calculation based on measured values (step S471). The predetermined timing is when setting the reply collecting server 2-1b or when an instruction is received from an administrator due to a change in operation circumstance. Here, a constant value to be determined is a value which depends on the reply processing server 3 among the constant values used in the expressions held by the service definition editor 12b to determine the values of the constraints. For example, the file writing rate on the reply processing server 3 may be used as a constant value to be determined. When a file writing rate is needed to determine another constant value, an actual file writing operation is repeatedly performed a predetermined number of times and an average time thereof may be used as the constant value of file writing rate. Alternatively, a storing time required for storing a predetermined length of characters into a memory on the reply processing server 3 may be used as the constant value. When a character storing time is needed to determine another constant value, an actual character storing operation is repeatedly performed a predetermined number of times and an average time thereof may be used as the constant value of character storing time. If necessary, a record reading rate or writing rate on the database or a processing rate of an algorithm may be also used as a constant value by measurement or calculation.

After the above-described step S471 is completed, the constant-value communications section 40 transmits each constant value determined by the constant-value determination section 39 to the server construction support system 1b (step S472).

Figure 48:
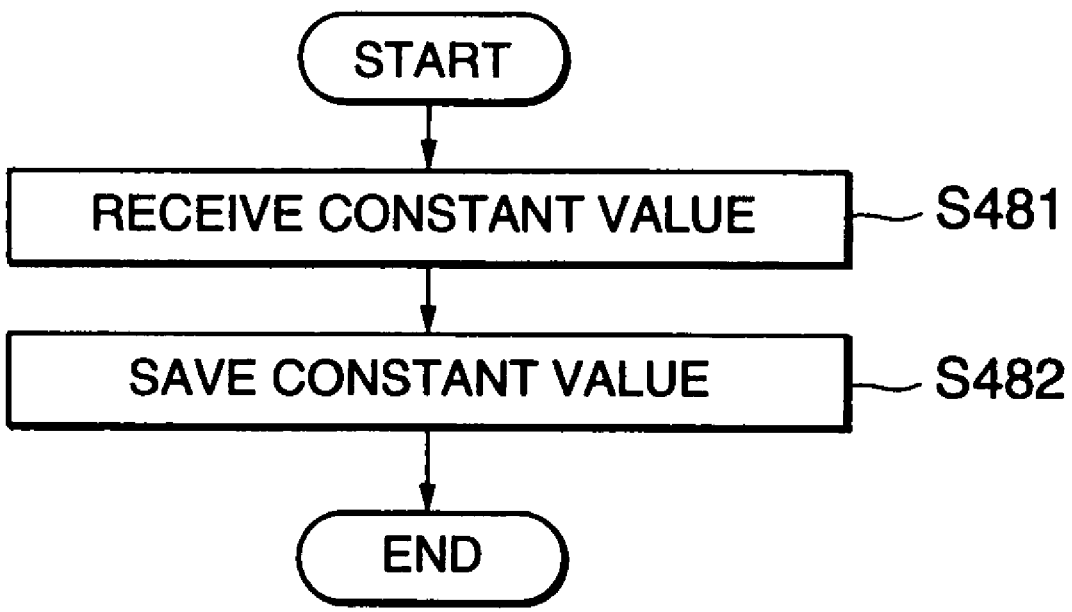
FIG. 48 is a flow chart showing a schematic operation of a service definition editor and a constant-value communication section in the server construction support system according to the third embodiment.

Referring to FIG. 48, the constant-value communication section 16 in the server construction support system 1b receives constant values from the constant-value communication section 29 and the constant-value communication section 40 and transfers them to the service definition editor 12b (step S481). The service definition editor 12b saves the received constant value transferred from the communications section 16 (step S482).

Thereafter, when a user instructs the service definition editor 12b to calculate the value of a constraint which is currently blank on the service definition editor screen 91 (see FIG. 9), the service definition editor 12b determines the value of the constraint which is blank using a corresponding expression of the expressions existing for every combination of the processing method and an unknown value type. For example, when the input fields of the service definition editor screen 91 are filled as shown in FIG. 9, the expressions (7) and (12) are used with substituting the constant values held in the step S482 into respective ones of the constants Ta, Ca, No, Np, and $B_1$ contained in the expression (7) and (12). In this way, the values of constraints which are blank are determined using constant values determined directly or indirectly based on actual measured values. Accordingly, the value of each constraint can be set to an appropriate value.

Fourth Embodiment

Figure 49:
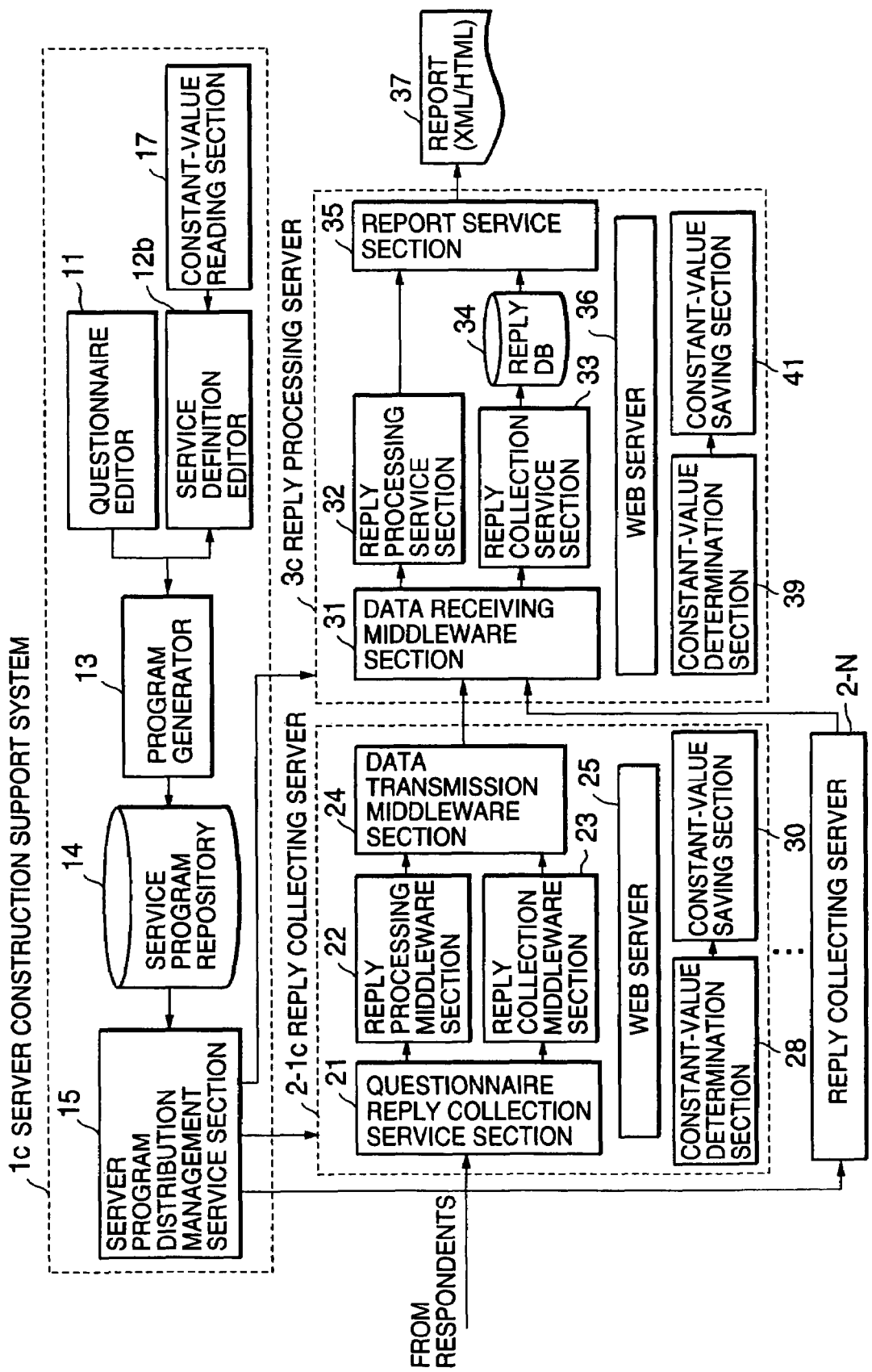
FIG. 49 is a block diagram showing a server system employing a server construction support system according to a fourth embodiment of the present invention.

Referring to FIG. 49, a server construction support system 1c according to a fourth embodiment of the present invention supports construction of a plurality of reply collecting servers 2-1c, 2-2 to 2-N and a reply processing server 3c. The server construction support system 1c is further provided with a constant-value reading section 17. The other blocks 11, 12b, 13-15 are the same as those of the third embodiment as shown in FIG. 46. The reply processing server 3c is further provided with a constant-value saving section 41. The other blocks 31-36, 39 are the same as those of the third embodiment as shown in FIG. 46.

Only the reply collecting servers 2-1c is further provided with a constant-value saving section 30. The other blocks 21-25, 28 of the reply collecting servers 2-1b and the other reply collecting servers 2-2 to 2-N are the same as those of the third embodiment as shown in FIG. 46.

The respective constant-value saving sections 30 and 41 store the constant values each determined by the constant-value determination sections 28 and 39 onto a file such as a non-volatile memory or a flexible disk. The constant-value reading section 17 of the server construction support system 1c is capable of reading the constant values stored in the file to transfer them to the service definition editor 12b.

An operation of the fourth embodiment will be described hereafter.

Figure 50:
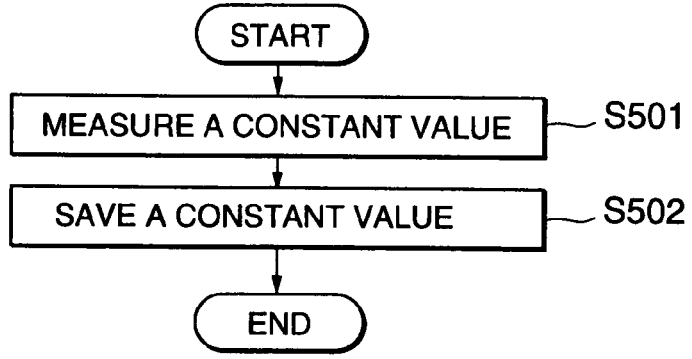
FIG. 50 is a flow chart showing a schematic operation of a constant-value determination section and a constant-value storing section in a reply collection server or a reply processing server in the fourth embodiment.

Referring to FIG. 50, the constant-value determination section 28 of the reply collecting server 2-1c determines a predetermined constant value according to predetermined timing directly by measurement or indirectly by calculation based on measured values (step S501). After the above-described step S501 is completed, the constant-value saving section 30 stores the constant values each determined by the constant-value determination section 28 onto the file (step S502). Thereafter, an administrator goes to the location of the server construction support system 1c with the file such as a flexible disk storing the constant values depending on the reply collecting server 2-1c, and then inserts the file into the constant-value reading section 17.

Figure 51:
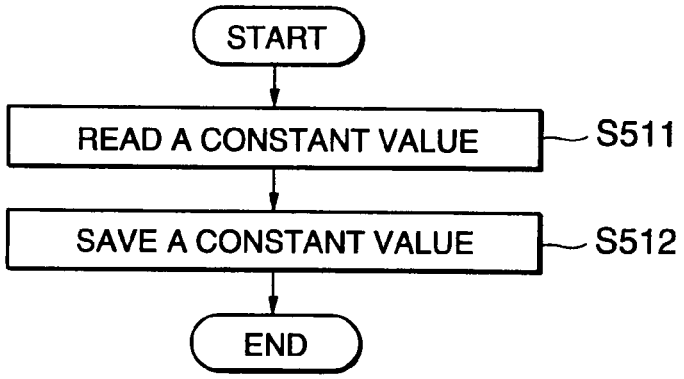
FIG. 51 is a flow chart showing a schematic operation of a service definition editor and a constant-value reading section in the server construction support system according to the fourth embodiment.

Referring to FIG. 51, the constant-value reading section 17 in the server construction support system 1c reads out the constant values from the file and transfers them to the service definition editor 12b (step S511). The service definition editor 12b saves the received constant values transferred from the constant-value reading section 17 (step S512).

Similarly, referring to FIG. 50, the constant-value determination section 39 of the reply processing server 3c determines a predetermined constant value according to predetermined timing directly by measurement or indirectly by calculation based on measured values (step S501). After the above-described step S501 is completed, the constant-value saving section 41 stores the constant values each determined by the constant-value determination section 39 onto the file (step S502). Thereafter, an administrator goes to the location of the server construction support system 1c with the file such as a flexible disk storing the constant values depending on the reply processing server 3c, and then inserts the file into the constant-value reading section 17.

The constant-value reading section 17 in the server construction support system 1c, as shown in FIG. 51, reads out the constant values depending on the reply processing server 3c from the file and transfers them to the service definition editor 12b (step S511). The service definition editor 12b saves the received constant values transferred from the constant-value reading section 17 (step S512).

After the constant values which are dependent on the reply collecting server 2-1c and the reply processing server 3c have been saved in the service definition editor 12b, an administrator or the like instructs the service definition editor 12b to obtain the value of a constraint corresponding to a blank input field on the service definition editor screen 91 (see FIG. 9). This causes the service definition editor 12b to calculate the value of the constraint corresponding to the blank input field in a similar manner to the third embodiment of FIG. 46.

Figure 52:
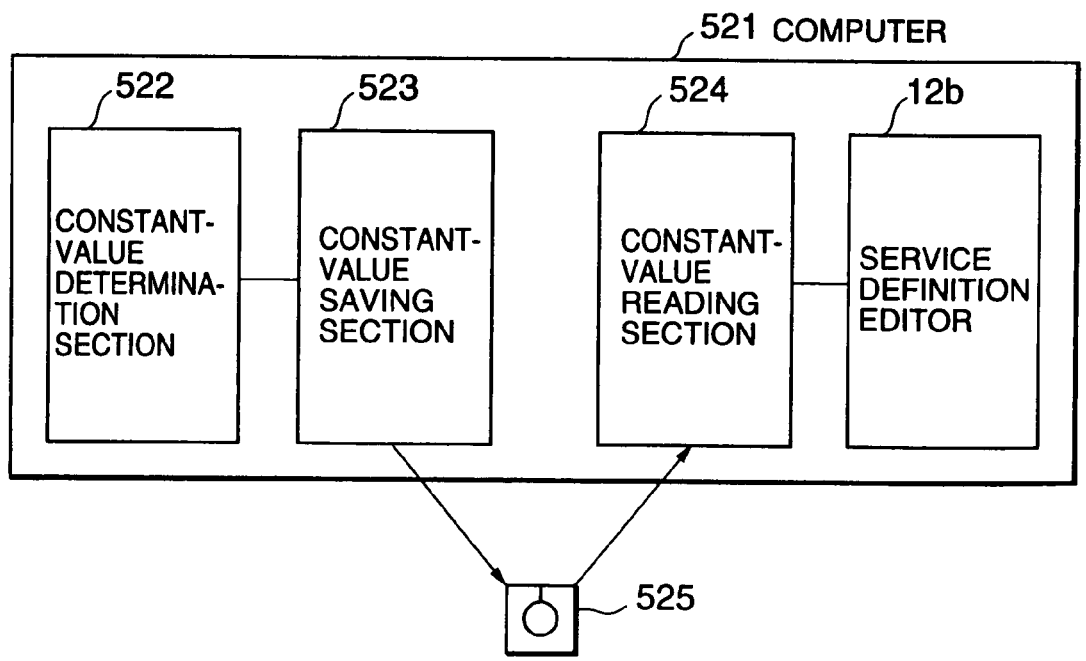
FIG. 52 is a block diagram showing a computer system implementing the server system as shown in FIG. 49.

As shown in FIG. 52, the server construction support system 1c, the reply collecting server 2-1c, and the reply processing server 3c as shown in FIG. 49 can be implemented in one computer 521. In FIG. 52, a constant-value determination section 522 corresponds to the constant-value determination section 28 of the reply collecting server 2-1c and the constant-value determination section 39 of the reply processing server 3. A constant-value saving section 523 corresponds to the constant-value saving section 30 of the reply collecting server 2-1c and the constant-value saving section 41 of the reply processing server 3. A constant-value reading section 524 corresponds to the constant-value reading section 17 of the server construction support system 1c.

The constant-value determination section 522 determines constant values depending on respective ones of the reply collecting server 2-1c and the reply processing server 3c directly by measurement or indirectly by calculation based on measured values. The constant-value saving section 523 stores the constant values onto a recording medium 525 such as a flexible disk. Thereafter, an administrator instructs the constant-value reading section 524 to read out the constant values from the recording medium 525. The constant-value reading section 524 transfers the read constant values depending on the reply collecting server 2-1c and the reply processing server 3c to the service definition editor 12b. The service definition editor 12b saves the received constant values transferred from the constant-value reading section 524.

Thereafter, an administrator or the like instructs the service definition editor 12b to obtain the value of a constraint corresponding to a blank input field on the service definition editor screen 91 (see FIG. 9). This causes the service definition editor 12b to calculate the value of the constraint corresponding to the blank input field as described before.

Figure 53:
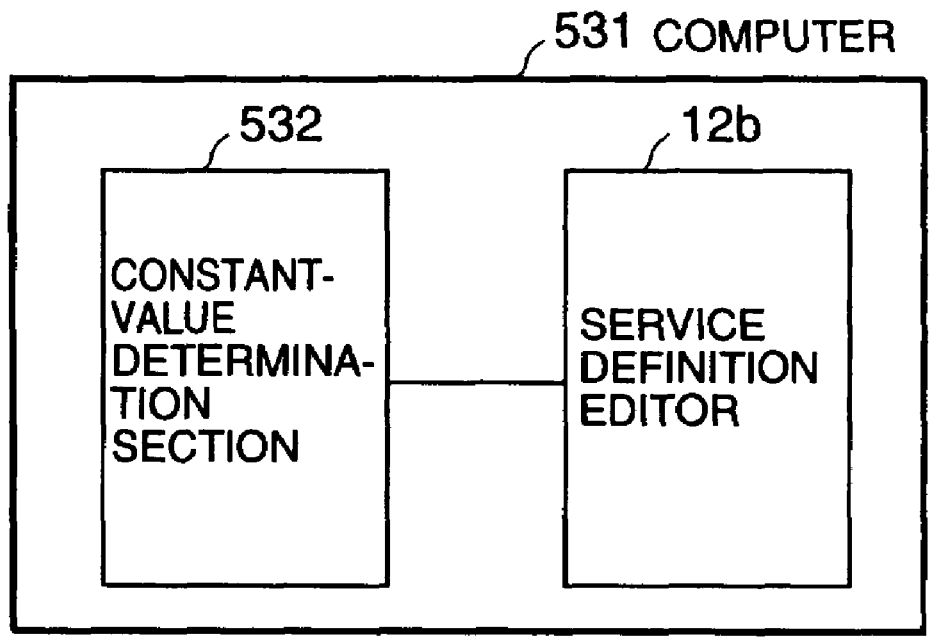
FIG. 53 is a block diagram showing a computer system implementing the server system as shown in FIG. 49 for explanation of another constant-value transferring method.
Figure 54:
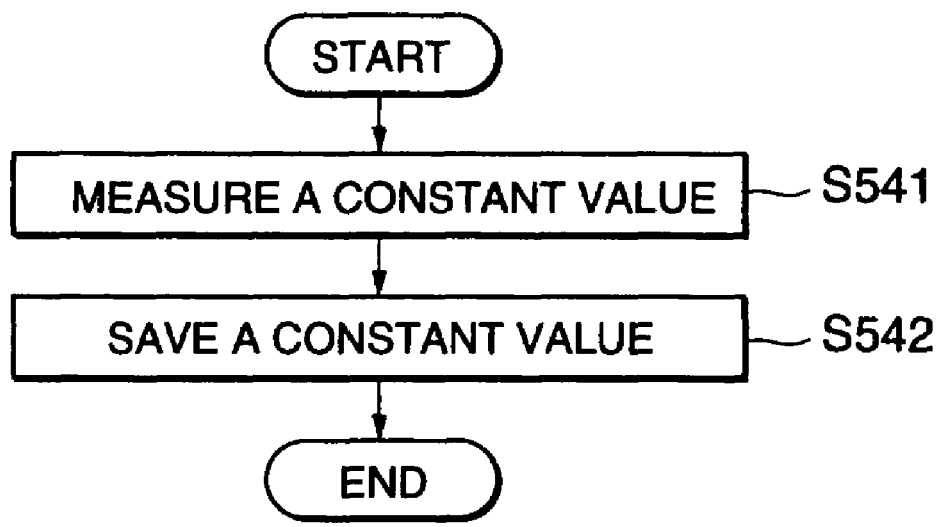
FIG. 54 is a flow chart showing an example of a processing operation of a service definition editor and a constant-value determination section in the computer system as shown in FIG. 53.

As shown in FIG. 53, the server construction support system 1c, the reply collecting server 2-1c, and the reply processing server 3c as shown in FIG. 49 can be implemented in one computer 531. In this system, as shown in FIG. 54, another method of transferring constant values can be implemented.

The constant-value determination section 532 determines constant values depending on respective ones of the reply collecting server 2-1c and the reply processing server 3c directly by measurement or indirectly by calculation based on measured values (step S541). The determined constant values are transferred to the service definition editor 12b, which saves the constant values transferred from the constant-value reading section 532 (step S542).

Thereafter, an administrator or the like instructs the service definition editor 12b to obtain the value of a constraint corresponding to a blank input field on the service definition editor screen 91 (see FIG. 9). This causes the service definition editor 12b to calculate the value of the constraint corresponding to the blank input field as described before.

The invention claimed is:

1. A system implemented in a computer for supporting construction of a server, comprising:
   a reply field definition section for defining a question and a reply form to the question; and
   a service method definition section for defining a processing method indicating how to process replies from respondents to the question defined by the reply field definition section and, when having the server collect and process replies received from the respondents, defining each value of a portion of a plurality of types of constraints and selecting one from a plurality of prepared mathematical expressions, which correspond to respective combinations of processing methods and types of value-undefined constraints among the plurality of types of constraints, wherein a selected mathematical expression corresponds to a combination of the processing method defined and the type of each of a value-undefined portion of constraints other than the value-defined portion of constraints, wherein each of the prepared mathematical expressions is used to obtain a value of each of the value-undefined portion of constraints, wherein the selected mathematical expression is used to obtain the value of each of the value-undefined portion of constraints,
   wherein the plurality of types of constraints includes at least one of collection time permissible for reply collection, processing time permissible for reply processing, an expected number of replies received from respondents, a processing method for replies, a reply form to a question, and a number of servers to be used for reply collection,
   wherein the plurality of prepared mathematical expressions is obtained by use of:
   a first mathematical model:

$$Pt(Uf) + \sum_{k=1}^{Lr} Ps_k(Uf) \leq Rr, \text{ and}$$

a second mathematical model:

$$Nc(M) + \sum_{k=1}^{Lr} Nt_k(M) + \sum_{k=1}^{Lr} Pb_k(M) \leq Rs,$$

wherein Pt(x) is a time function required for collection per one reply in a reply collecting server, Uf is the number of audiences per one reply collecting server, Ps(x) is a time function required for processing per one reply collecting server, Rr is collection time permissible for collection, Lr is the number of processing items, Nc(x) is a network connection time function, M is the number of reply collecting sewers to be used, Nt(x) is a network data transmission time function, Pb(x) is a time function required for processing by a reply processing server, and Rs is permissible time required for processing from the completion of collection registration to the completion of processing.

2. A system according to claim 1, wherein, when the other portion of constraints includes a plurality of types of constraints, the service method definition section obtains combinations of possible values of the plurality of types of constraints.

3. A system according to claim 2, wherein the service method definition section presents a value of each of the other portion of constraints.

4. A system according to claim 3, wherein, when combinations of possible values of the plurality of types of constraints are presented, the service method definition section presents a choice of said combinations.

5. A system according to claim 2, wherein, when a plurality of combinations of possible values of the plurality of types of constraints is presented, the service method definition section selects and presents one of said combinations according to a predetermined rule.

6. A system according to claim 1, further comprising:
a program generator for automatically generating operation definition information based on the reply form to the question defined by the reply field definition section, the processing method for replies to the question defined by the service method definition section, the values of the portion of the constraints, and the values of the other portion of the constraints obtained by the service method definition section, wherein the operation definition information allows a prepared server program to collect the replies from the respondents and process collected replies; and
a transmission manager for transmitting the operation definition information to as many servers as defined or obtained as one of the constraints,
wherein the operation definition information includes a reply form to the question and a processing method of replies to the question, and
the server program is a program which collects and processes replies received from the respondents based on the reply form and the processing method both included in the operation definition information.

7. A system according to claim 1, wherein the server comprises: a constant determination section for determining at least one constant value dependent on the server itself by actual measurement; and a first communication section for transmitting said at least one constant value to the system,
wherein the system further comprises a second communication section for receiving said at least one constant value from the server,
wherein the service method definition section uses said at least one constant value dependent on the server, received by the second communication section, to define the values of the other portion of the constraints.

8. A method implemented by a computer for supporting construction of a server, comprising:
defining a question and a reply form to the question;
defining a processing method indicating how to process replies from respondents to the question;
defining a processing method indicating how to process replies from respondents to the question defined and, when having the server collect and process replies received from the respondents, defining each value of a portion of a plurality of types of constraints and selecting one from a plurality of prepared mathematical expressions, which correspond to respective combinations of processing methods and types of value-undefined constraints among the plurality of types of constraints, wherein a selected mathematical expression corresponds to a combination of the processing method defined and the type of each of a value-undefined portion of constraints other than the value-defined portion of constraints, wherein each of the prepared mathematical expressions is used to obtain a value of each of the value-undefined portion of constraints, wherein the selected mathematical expression is used to obtain the value of each of the value-undefined portion of constraints,
wherein the plurality of types of constraints includes at least one of collection time permissible for reply collection, processing time permissible for reply processing, an expected number of replies received from respondents, a processing method for replies, a reply form to a question, and a number of servers to be used for reply collection,
wherein the plurality of prepared mathematical expressions is obtained by use of:
a first mathematical model:

$$Pt(Uf) + \sum_{k=1}^{Lr} Ps_k(Uf) \le Rr, \text{ and}$$

a second mathematical model:

$$Nc(M) + \sum_{k=1}^{Lr} Nt_k(M) + \sum_{k=1}^{Lr} Pb_k(M) \le Rs,$$

wherein $Pt(x)$ is a time function required for collection per one reply in a reply collecting server, $Uf$ is the number of audiences per one reply collecting server, $Ps(x)$ is a time function required for processing per one reply collecting server, $Rr$ is collection time permissible for collection, $Lr$ is the number of processing items, $Nc(x)$ is a network connection time function, $M$ is the number of reply collecting servers to be used, $Nt(x)$ is a network data transmission time function, $Pb(x)$ is a time function required for processing by a reply processing server, and $Rs$ is permissible time required for processing from the completion of collection registration to the completion of processing.

9. A method according to claim 8, further comprising:
automatically generating operation definition information based on the reply form to the question defined, the processing method for replies to the question defined, the values of the portion of the constraints, and the values of the other portion of the constraints obtained, wherein the operation definition information allows a prepared server program to collect the replies from the respondents and process collected replies; and
transmitting the operation definition information to as many servers as defined or obtained as one of the constraints,
wherein the operation definition information includes a reply form to the question and a processing method of replies to the question, and
the server program is a program which collects and processes replies received from the respondents based on the reply form and the processing method both included in the operation definition information.

10. A method according to claim 8, wherein the server comprises:
a constant determination section for determining at least one constant value dependent on the server itself by actual measurement; and a first communication section for transmitting said at least one constant value to the system, the method further comprising:
receiving said at least one constant value from the server, wherein said at least one constant value dependent on the server is used to define the values of the other portion of the constraints.

11. A computer readable medium having stored therein a program instructing a computer to implement a server construction supporting system, the program comprising:
defining a question and a reply form to the question;
defining a processing method indicating how to process replies from respondents to the question;
defining a processing method indicating how to process replies from respondents to the question defined and, when having the server collect and process replies received from the respondents, defining each value of a portion of a plurality of types of constraints and selecting one from a plurality of prepared mathematical expressions, which correspond to respective combinations of processing methods and types of value-undefined constraints among the plurality of types of constraints, wherein a selected mathematical expression corresponds to a combination of the processing method defined and the type of each of a value-undefined portion of constraints other than the value-defined portion of constraints, wherein each of the prepared mathematical expressions is used to obtain a value of each of the value-undefined portion of constraints, wherein the selected mathematical expression is used to obtain the value of each of the value-undefined portion of constraints,
wherein the plurality of types of constraints includes at least one of collection time permissible for reply collection, processing time permissible for reply processing, an expected number of replies received from respondents, a processing method for replies, a reply form to a question, and a number of servers to be used for reply collection,
wherein the plurality of prepared mathematical expressions is obtained by use of:
a first mathematical model:

$$Pt(Uf) + \sum_{k=1}^{Lr} Ps_k(Uf) \le Rr, \text{ and}$$

a second mathematical model:

$$Nc(M) + \sum_{k=1}^{Lr} Nt_k(M) + \sum_{k=1}^{Lr} Pb_k(M) \le Rs,$$

wherein $Pt(x)$ is a time function required for collection per one reply in a reply collecting server, $Uf$ is the number of audiences per one reply collecting server, $Ps(x)$ is a time function reciuired for processing per one reply collecting server, $Rr$ is collection time permissible for collection, $Lr$ is the number of processing items, $Nc(x)$ is a network connection time function, $M$ is the number of reply collecting servers to be used, $Nt(x)$ is a network data transmission time function, $Pb(x)$ is a time function reciuired for processing by a reply processing server, and $Rs$ is permissible time required for processing from the completion of collection registration to the completion of processing.

12. A computer readable medium according to claim 11, further comprising:
automatically generating operation definition information based on the reply form to the question defined, the processing method for replies to the question defined, the values of the portion of the constraints, and the values of the other portion of the constraints obtained, wherein the operation definition information allows a prepared server program to collect the replies from the respondents and process collected replies; and
transmitting the operation definition information to as many servers as defined or obtained as one of the constraints,
wherein the operation definition information includes a reply form to the question and a processing method of replies to the question, and
the server program is a program which collects and processes replies received from the respondents based on the reply form and the processing method both included in the operation definition information.

13. A computer readable medium according to claim 11, wherein the server composes: a constant determination section for determining at least one constant value dependent on the server itself by actual measurement; and a first communication section for transmitting said at least one constant value to the system, the program further comprising:
receiving said at least one constant value from the server, wherein said at least one constant value dependent on the server is used to define the values of the other portion of the constraints.

* * * * *